US010223982B2

(12) United States Patent
Nakajima et al.

(10) Patent No.: US 10,223,982 B2
(45) Date of Patent: Mar. 5, 2019

(54) DISPLAY APPARATUS AND METHOD OF DRIVING THE SAME

(71) Applicant: Japan Display Inc., Tokyo (JP)

(72) Inventors: Yoshiharu Nakajima, Tokyo (JP); Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/655,246

(22) Filed: Jul. 20, 2017

(65) Prior Publication Data

US 2017/0316745 A1 Nov. 2, 2017

Related U.S. Application Data

(63) Continuation of application No. 14/790,196, filed on Jul. 2, 2015, now Pat. No. 9,734,769.

(30) Foreign Application Priority Data

Jul. 4, 2014 (JP) .................................. 2014-139107

(51) Int. Cl.
*G06F 3/044* (2006.01)
*G09G 3/34* (2006.01)
*G06F 3/041* (2006.01)

(52) U.S. Cl.
CPC ............. *G09G 3/344* (2013.01); *G06F 3/044* (2013.01); *G06F 3/0412* (2013.01); *G06F 3/0416* (2013.01)

(58) Field of Classification Search
CPC ...... G06F 3/044; G06F 3/0412; G06F 3/0416; G09G 3/344
See application file for complete search history.

(56) References Cited

U.S. PATENT DOCUMENTS 7,961,171 B2 6/2011 Miyasaka et al.
8,477,105 B2 7/2013 Haga et al.
(Continued)

FOREIGN PATENT DOCUMENTS

CN 201207484 2/2012
CN 101261553 4/2013
(Continued)

OTHER PUBLICATIONS

Japanese Office Action dated May 8, 2018 in corresponding Japanese Application No. 2017-146071.
(Continued)

*Primary Examiner* — Jennifer Mehmood
*Assistant Examiner* — James S Nokham
(74) *Attorney, Agent, or Firm* — K&L Gates LLP

(57) ABSTRACT

In a display apparatus provided with an electrophoresis layer, such a display apparatus as to improve the response performance of a touch detection is provided. A driving unit included in a display apparatus alternately repeats a display driving process for supplying a first driving signal to a driving electrode disposed in a selected partial display region and a detection driving process for supplying a second driving signal to a driving electrode disposed in another selected partial display region while successively cyclically changing the partial display region and successively cyclically changing another partial detection region. Moreover, in the detection driving process, a touch detection unit included in the display apparatus detects an input position at another selected partial detection region based on an electrostatic capacitance of the driving electrode disposed at another selected detection region.

9 Claims, 35 Drawing Sheets

(56) References Cited

U.S. PATENT DOCUMENTS

| | | |
|---|---|---|
| 8,659,573 B2 | 2/2014 | Haga et al. |
| 8,736,556 B2 | 5/2014 | Park et al. |
| 8,803,838 B2 | 8/2014 | Haga et al. |
| 9,092,105 B2 | 7/2015 | Furutani et al. |
| 9,304,639 B2 | 4/2016 | Ishizaki et al. |
| 9,477,341 B2 | 10/2016 | Furutani et al. |
| 9,626,060 B2 | 4/2017 | Ishizaki et al. |
| 9,746,958 B2 | 8/2017 | Furutani et al. |
| 2005/0041004 A1 | 2/2005 | Gates et al. |
| 2006/0181504 A1 | 8/2006 | Kawai |
| 2009/0256868 A1 | 10/2009 | Low et al. |
| 2011/0109592 A1 | 5/2011 | Kurokawa et al. |
| 2013/0147724 A1* | 6/2013 | Hwang ............... G06F 3/0412 345/173 |
| 2013/0293507 A1* | 11/2013 | Singh ................. G06F 3/044 345/174 |
| 2014/0132534 A1* | 5/2014 | Kim .................... G06F 3/0412 345/173 |
| 2015/0062062 A1* | 3/2015 | Han .................... G06F 3/0412 345/174 |
| 2017/0177133 A1 | 6/2017 | Ishizaki et al. |
| 2017/0322668 A1 | 11/2017 | Furutani et al. |

FOREIGN PATENT DOCUMENTS

| | | |
|---|---|---|
| JP | 2006-227249 | 8/2006 |
| JP | 2008-134600 | 6/2008 |
| JP | 2009-258735 | 11/2009 |
| JP | 2011014109 | 1/2011 |
| JP | 2011-118888 | 6/2011 |
| JP | 2011221114 | 11/2011 |
| JP | 2014-029546 | 2/2014 |
| JP | 2014-041603 | 3/2014 |
| JP | 2014-109904 | 6/2014 |
| TW | 201207484 | 2/2012 |

OTHER PUBLICATIONS

Taiwainese Office Action dated Mar. 1, 2016 in corresponding Taiwanese Application No. 104118200.

Japanese Office Action dated Oct. 9, 2018 in corresponding Japanese Application No. 2017-146071.

* cited by examiner

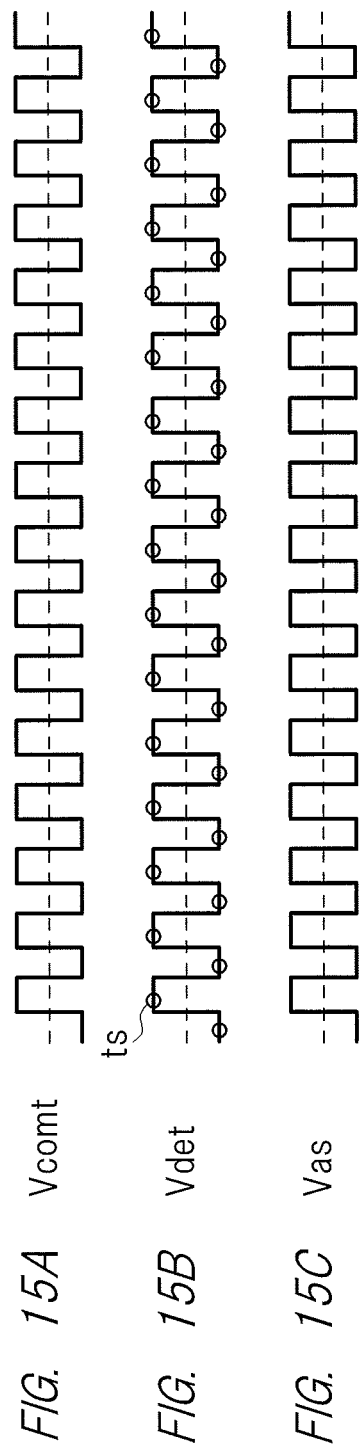

FIG. 20
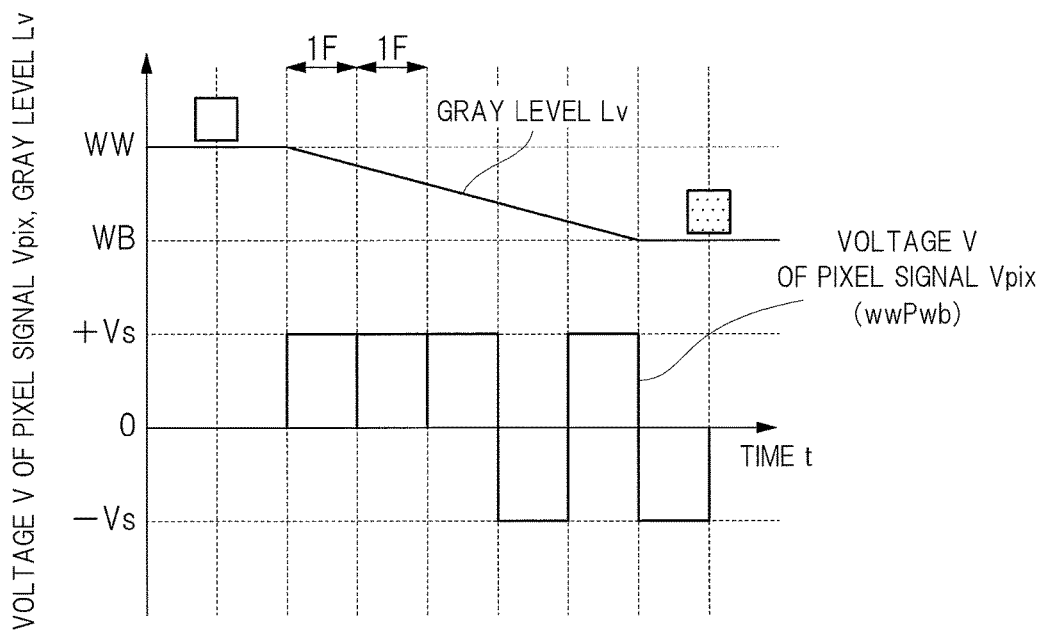
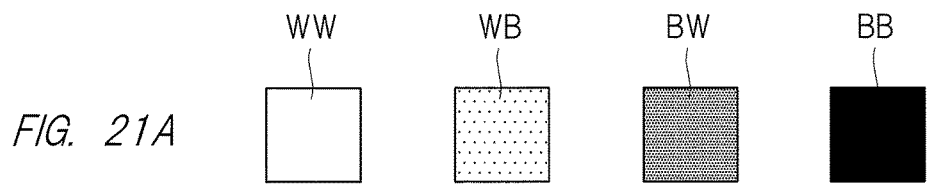
FIG. 21A
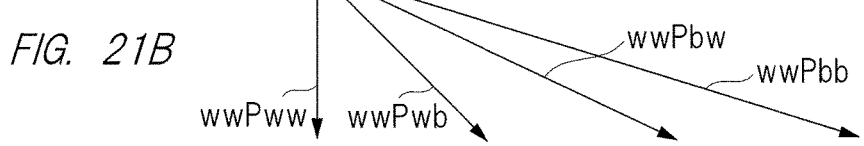
FIG. 21B
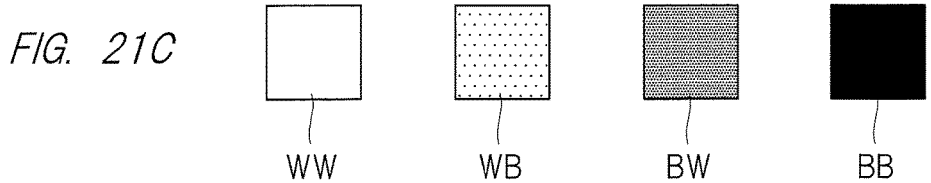
FIG. 21C

DISPLAY APPARATUS AND METHOD OF DRIVING THE SAME

CROSS REFERENCES TO RELATED APPLICATIONS

The present application claims priority to U.S. patent application Ser. No. 14/790,196, filed on Jul. 2, 2015, which claims priority to Japanese Priority Patent Application JP 2014-139107 filed in the Japan Patent Office on Jul. 4, 2014, the entire content of which is hereby incorporated by reference.

BACKGROUND

The present invention relates to a display apparatus and a method of driving the same. More particularly, the present invention relates to a display apparatus provided with an electrophoresis layer and a method of driving the display apparatus.

A display apparatus provided with, for example, an electrophoresis layer containing electrophoretic particles functioning as charging particles as a display layer for displaying an image has been proposed. Such a display apparatus includes: for example, an array substrate; a facing substrate disposed so as to face the array substrate; and an electrophoresis layer sandwiched between the array substrate and the facing substrate. On the array substrate, for example, a thin film transistor (TFT) functioning as a switching element is formed.

In such a display apparatus, an electric field is formed in the electrophoresis layer by, for example, applying a voltage between a pixel electrode formed on each pixel and a driving electrode commonly formed for a plurality of pixels in each of the plurality of the pixels. At this time, the electrophoretic particles functioning as the charged particles are moved in the direction of the electric field or in the direction opposite to the direction of the electric field, so that an image is displayed on each of the plurality of the pixels.

For example, Japanese Patent Application Laid-Open Publication No. 2006-227249 (Patent Document 1), Japanese Patent Application Laid-Open Publication No. 2009-258735 (Patent Document 2) and Japanese Patent Application Laid-Open Publication No. 2014-029546 (Patent Document 3) have described a technique in which a display apparatus is provided with an electrophoresis layer as a display layer for displaying an image.

SUMMARY

It is considered that an input device referred to as a touch panel or a touch sensor is provided on a display surface side of such a display apparatus provided with the electrophoresis layer, and that, when an input operation is performed by making an input tool such as a finger or a touch pen contact with the touch panel, an input position is detected. Moreover, as one of detection systems for detecting the contact position at which a finger or others is made in contact with the input device, it is considered that an electrostatic capacitance system is used. In the input device using the electrostatic capacitance system, a plurality of capacitive elements each formed of paired electrodes that are disposed so as to face each other and so as to interpose a dielectric layer therebetween, that is, formed of a driving electrode and a detection electrode, are formed inside a surface of the input device. Moreover, when an inputting operation is performed by making the input tool such as a finger, a touch pen or others contact with the capacitive element, a capacitance is added to the capacitive element so as to change the detection capacitance, so that the input position is detected by utilizing the manner.

However, when the input device is externally attached onto the display surface side of the display apparatus, the driving electrodes for use in displaying an image cannot be used also as the electrodes for use in detecting the input position. For this reason, electrodes for use in detecting the input position have to be provided on the display surface side of the display apparatus separately from the driving electrodes for displaying the image.

Moreover, the display apparatus provided with the electrophoresis layer has a slower display-rewriting speed and a larger ratio of a frequency for repeating the touch detection with respect to a frequency for rewriting the display than those of a liquid crystal display apparatus. Therefore, in the display apparatus provided with the electrophoresis layer, it becomes more difficult to improve a response performance of the touch detection than the liquid crystal display apparatus.

The present invention has been made to solve the problems of a conventional technique as described above, and an object of the present invention is to provide a display apparatus provided with an electrophoresis layer in which a driving electrode for use in displaying an image can be also operated as an electrode for detecting an input position so as to improve a response of a touch detection.

The typical ones of the inventions disclosed in the present application will be briefly described as follows.

A display apparatus as one aspect of the present invention includes: a first substrate; a second substrate that is disposed so as to face the first substrate; an electrophoresis layer sandwiched between the first substrate and the second substrate; a plurality of first electrodes formed in a first region on a first main surface of the first substrate; a plurality of second electrodes formed in a second region on a second main surface of the second substrate; a first driving unit for supplying a first driving signal and a second driving signal to the plurality of the second electrodes; and a first detection unit for detecting an input position based on an electrostatic capacitance of each of the plurality of the second electrodes. The first region is divided into a first plural number of first partial regions, and the second region is divided into a second plural number of second partial regions, the second plural number being smaller than the first plural number. Any one or more of the plurality of the first electrodes is disposed in each of the first plural number of the first partial regions, any one or more of the plurality of the second electrodes is disposed in each of the first plural number of the first partial regions, and any one or more of the plurality of the second electrodes is disposed in each of the second plural number of the second partial regions. The first driving unit alternately performs repeatedly a first driving process for supplying a first driving signal to the second electrode of the plurality of second electrodes which is disposed in the first partial region selected from the first plural number of the first partial regions and a second driving process for supplying a second driving signal to the second electrode of the plurality of second electrodes which is disposed in the second partial region selected from the second plural number of the second partial regions. In the first driving process, the first driving unit forms an electric field between the second electrode disposed in the selected first partial region and the first electrode of the plurality of the first electrodes which is disposed in the selected first partial region, so that an image is displayed in the selected first partial region. In the second driving process, the first detection unit detects an input position in the selected second partial region based on an electrostatic capacitance of the second electrode disposed in the selected second partial region. In the repeat processes, the first driving unit alternately repeats the first driving process and the second driving process while successively cyclically changing the first partial region selected from the first plural number of the first partial regions and successively cyclically changing the second partial region selected from the second plural number of the second partial regions.

Also, in a method of driving a display apparatus as one aspect of the present invention, the display apparatus includes: a first substrate; a second substrate that is disposed so as to face the first substrate; an electrophoresis layer sandwiched between the first substrate and the second substrate; a plurality of first electrodes formed in a first region on a first main surface of the first substrate; a plurality of second electrodes formed in a second region on a second main surface of the second substrate; a first driving unit for supplying a first driving signal and a second driving signal to the plurality of the second electrodes; and a first detection unit for detecting an input position based on an electrostatic capacitance of each of the plurality of the second electrodes. The first region is divided into a first plural number of first partial regions, and the second region is divided into a second plural number of second partial regions, the second plural number being smaller than the first plural number. Any one or more of the plurality of the first electrodes is disposed in each of the first plural number of the first partial regions, any one or more of the plurality of the second electrodes is disposed in each of the first plural number of the first partial regions, and any one or more of the plurality of the second electrodes is disposed in each of the second plural number of the second partial regions. Moreover, a method of driving the display apparatus includes: a step (a) of supplying a first driving signal by the first driving unit to the second electrode of the plurality of the second electrodes which is disposed in the first partial region selected from the first plural number of the first partial regions; and a step (b) of supplying a second driving signal by the first driving unit to the second electrode of the plurality of the second electrodes which is disposed in the second partial region selected from the second plural number of the second partial regions. In the step (a), an image is displayed in the selected first partial region by forming an electric field between the second electrode disposed in the selected first partial region and the first electrode of the plurality of the first electrodes which is disposed in the selected first partial region. In the step (b), an input position is detected by the first detection unit in the selected second partial region based on an electrostatic capacitance of the second electrode disposed in the selected second partial region. The step (a) and the step (b) are alternately repeated while successively cyclically changing the first partial region selected from the first plural number of the first partial regions and successively cyclically changing the second partial region selected from the second plural number of the second partial regions.

Additional features and advantages are described herein, and will be apparent from the following Detailed Description and the figures.

BRIEF DESCRIPTION OF THE FIGURES

FIG. 15A is a timing waveform diagram showing various signals in the touch detection operating period;

FIG. 15B is a timing waveform diagram showing various signals in the touch detection operating period;

FIG. 15C is a timing waveform diagram showing various signals in the touch detection operating period;

FIG. 20 is a timing waveform diagram showing gray levels and pixel signals during a plurality of single frame periods when a gray level of each pixel is controlled;

FIG. 21A is a diagram schematically showing an example of controls of gray levels in four sub-pixels adjacent to each other when a gray level of each pixel is controlled;

FIG. 21B is a diagram schematically showing an example of controls of gray levels in four sub-pixels adjacent to each other when a gray level of each pixel is controlled;

FIG. 21C is a diagram schematically showing an example of controls of gray levels in four sub-pixels adjacent to each other when a gray level of each pixel is controlled;

DETAILED DESCRIPTION

Figure 1:
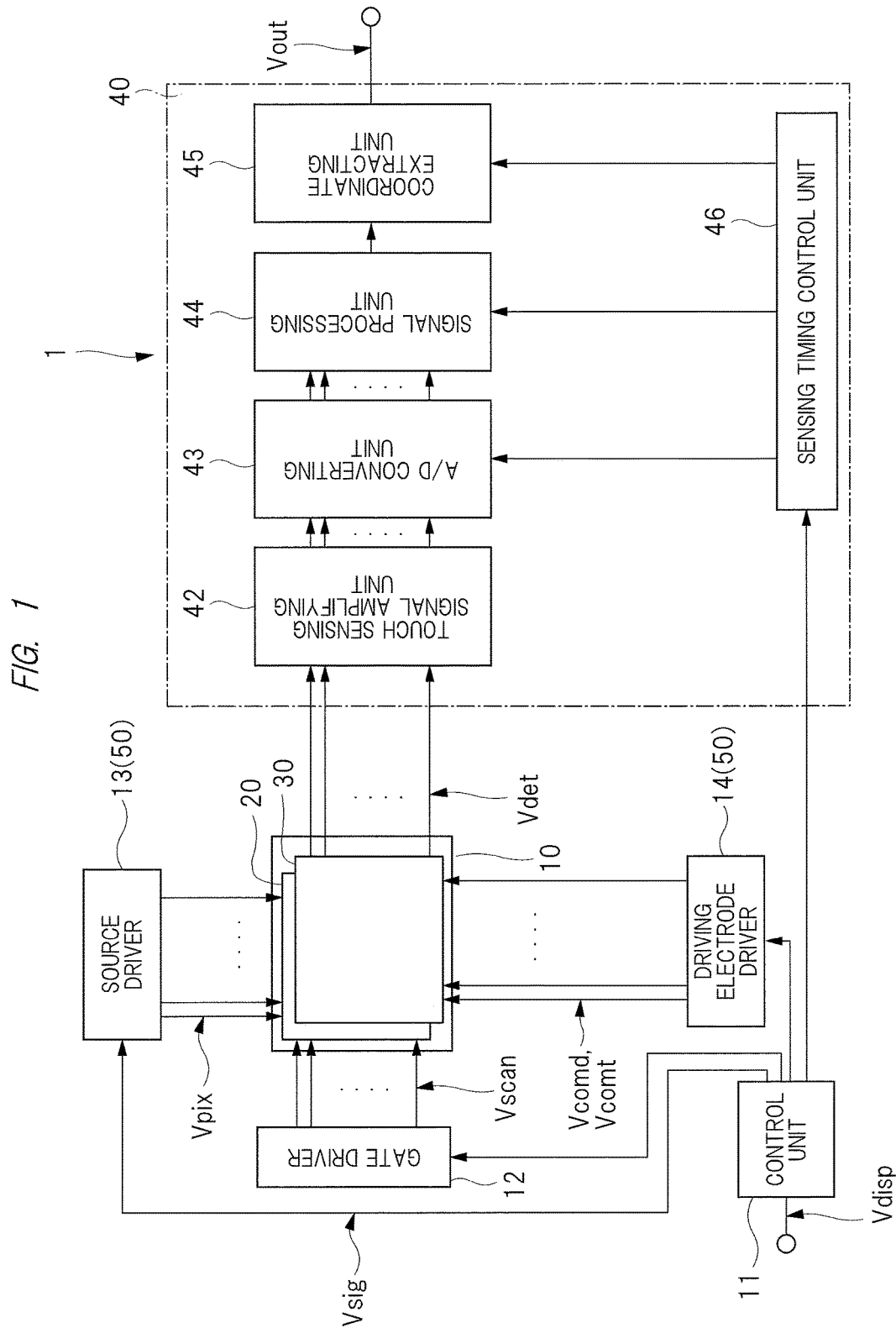
FIG. 1 is a block diagram showing an example of configuration of a display apparatus of a first embodiment.

Hereinafter, each embodiment of the present invention will be described with reference to the drawings.

Note that the disclosure shows simply an example, and an appropriate modification that could have been easily thought up by those who skilled in the art even if a concept of the present invention is maintained is absolutely included within the scope of the present invention. Moreover, in the drawings, the width, thickness, shape and others of each part are schematically shown more than the embodiments for more clearly understanding the description. However, this is simply an example, and does not restrict the interpretation of the present invention.

Moreover, in the present specification and each drawing, the same element as that in the above-described drawings is denoted by the same reference symbol, and the detailed description thereof will be omitted appropriately in some cases.

Further, in the drawings used in the embodiments, hatching is omitted even in a cross-sectional view so as to make the drawings easy to see in some cases. Also, in some drawings used in the embodiments, hatching is used even in a plan view so as to make the drawings easy to see in some cases.

Furthermore, when a range is described as A to B in the following embodiments, this range indicates A or larger and B or smaller unless otherwise specified.

First Embodiment

First, as the first embodiment, explanations will be made about an example in which a display apparatus provided with an electrophoresis display device has a touch detection device serving as an input device of a mutual capacitance system provided with a driving electrode and a detection electrode. The display apparatus of the first embodiment is configured by adopting the display apparatus provided with the touch panel serving as the input device to a display apparatus having a touch detection function of an in-cell type.

In the specification of the present application, note that the input device is an input device for detecting an electrostatic capacitance that changes in accordance with at least a capacitance of an object that comes close to, or is made in contact with an electrode. Moreover, the display apparatus having the touch detection function of the in-cell type is a display apparatus in which a detection electrode for use in touch detection is provided on either an array substrate 2 or a facing substrate 3 included in the display apparatus. Furthermore, in the present first embodiment, descriptions will be made about the display apparatus having a touch detection function of the in-cell type having such a feature that a driving electrode for displaying an image is provided so as to also function as an electrode for detecting an input position.

<Overall Configuration>

First, with reference to FIG. 1, the overall configuration of the display apparatus of the first embodiment will be described. FIG. 1 is a block diagram showing an example of configuration of the display apparatus of the first embodiment.

A display apparatus 1 of the first embodiment is provided with a display device 10 having a touch detection function, a control unit 11, a gate driver 12, a source driver 13, a driving electrode driver 14 and a touch detection unit 40. A scan driving unit 50 is formed of the source driver 13 and the driving electrode driver 14.

The display device 10 having the touch detection function has a display device 20 and a touch detection device 30. In the present first embodiment, the display device 20 is assumed to be a display device using an electrophoresis display element as a display element. Therefore, the display device 20 is sometimes referred to as an electrophoresis display device 20 below. The touch detection device 30 is a touch detection device of an electrostatic capacitance system, that is, an electrostatic capacitance-type touch detection device. Therefore, the display apparatus 1 is a display apparatus provided with an input device having a touch detection function. Moreover, the display device 10 with the touch detection function is a display device obtained by integrating the electrophoresis display 20 and the touch detection device 30 so as to be a display device having a touch detection function embedded therein, that is, a display device having a touch detection function of an in-cell type.

As will be described later in a third modified example of a second embodiment, note that the display device 10 having the touch detection function may be a display device formed by attaching the touch detection device 30 onto the display device 20.

The display device 20 displays an image by executing a successive scanning process on the display region for one horizontal line in accordance with a scanning signal Vscan supplied from the gate driver 12. The touch detection device 30 is operated based on a principle of an electrostatic capacitance-type touch detection as will be described later, and outputs a detection signal Vdet.

Based on a video signal Vdisp supplied from the outside, the control unit 11 is a circuit which supplies control signals to each of the gate driver 12, the source driver 13, the driving electrode driver 14 and the touch detection unit 40 to control these devices so as to be operated in synchronization with one another.

The gate driver 12 has such a function as, based on the control signal supplied from the control unit 11, successively selecting one horizontal line which is a target of a display driving process by the display device 10 having the touch detection function.

The source driver 13 is a circuit which supplies a pixel signal Vpix to a sub-pixel SPix (see FIG. 7 to be described later) included in the display device 10 having the touch detection function based on a control signal of an image signal Vsig supplied from the control unit 11.

The driving electrode driver 14 included in the scan driving unit 50 is a circuit which, in performing a displaying operation, supplies a display driving signal Vcomd to driving electrodes COML1 and driving electrodes COML2 (see FIG. 5 or FIG. 6 to be described later) included in the display device 10 having the touch detection function based on the control signal supplied from the control unit 11. Moreover, the driving electrode driver 14 included in the scan driving unit 50 is a circuit which, in performing a touch detection operation, supplies a touch detection driving signal Vcomt to driving electrodes COML1 (see FIG. 5 or FIG. 6 to be described later) included in the display device 10 having the touch detection function based on the control signal supplied from the control unit 11.

Note that the driving electrode driver 14 included in the scan driving unit 50 may, in performing the touch detection operation, supply the touch detection driving signal Vcomt to auxiliary electrodes AE1 (see FIG. 6 to be described later) electrically connected to the driving electrodes COML1 based on the control signal supplied from the control unit 11. That is, the driving electrode driver 14 may, in performing the touch detection operation, supply the touch detection driving signal Vcomt formed of an alternate-current signal having the same phase as that of an alternate-current signal contained in the touch detection driving signal Vcomt to the auxiliary electrodes AE1 (see FIG. 6 to be described later) electrically connected to the driving electrodes COML1.

The touch detection unit 40 is a circuit which detects existence or nonexistence of touch by an input tool such as a finger or a touch pen onto the touch detection device 30, that is, existence or nonexistence of a touched state or a coming-close state to be described later based on the control signal supplied from the control unit 11 and a detection signal Vdet supplied from the touch detection device 30 of the display device 10 having the touch detection function. Moreover, the touch detection unit 40 is a circuit which, if the touch exists, acquires coordinates of the touch in a touch detection region, that is, acquires an input position or others. The touch detection unit 40 is provided with a touch sensing signal amplifying unit 42, an A/D (Analog/Digital) converting unit 43, a signal processing unit 44, a coordinate extracting unit 45 and a sensing timing control unit 46.

The touch sensing signal amplifying unit 42 amplifies the detection signal Vdet supplied from the touch detection device 30. The touch sensing signal amplifying unit 42 may be provided with a low-pass analog filter that removes a high frequency component, that is, a noise component, contained in the detection signal Vdet, and extracts a touch component, and then outputs each component.

<Principle of Electrostatic Capacitance-Type Touch Detection>

Figure 2:
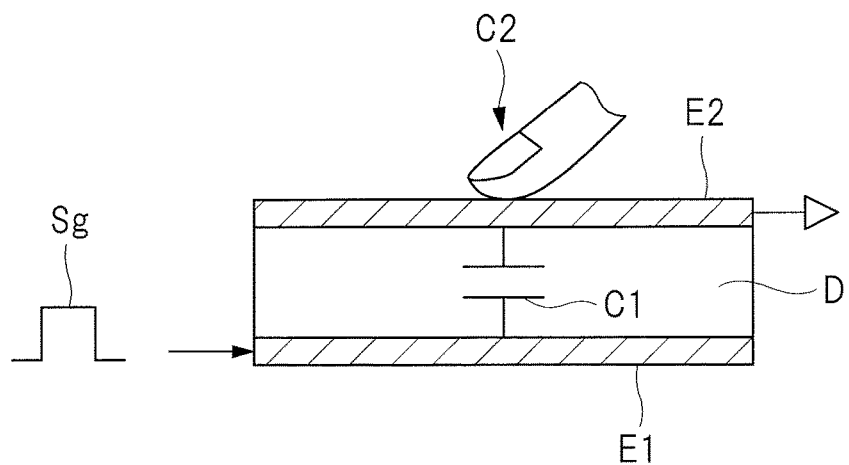
FIG. 2 is an explanatory diagram showing a state in which a finger touches or comes close to a touch detection device.
Figure 3:
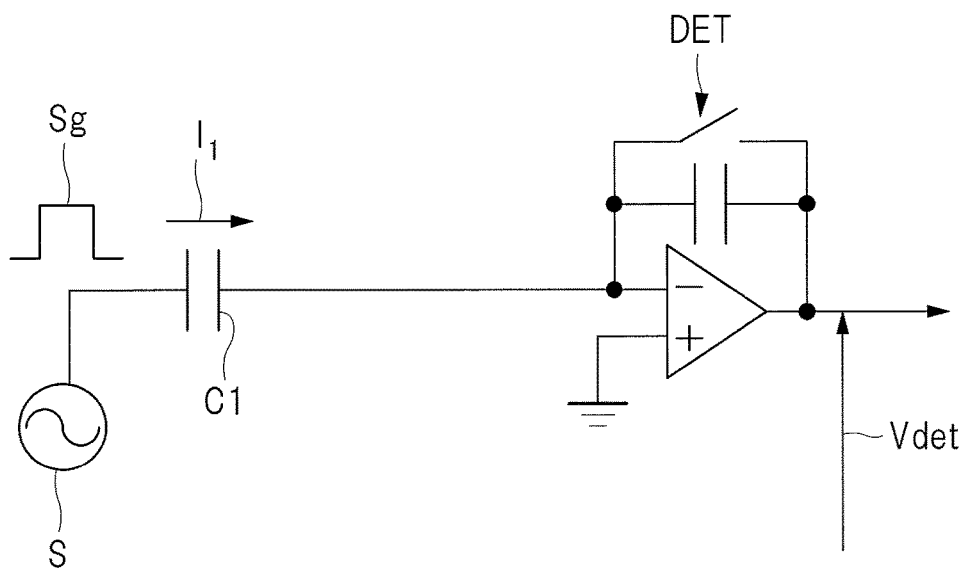
FIG. 3 is an explanatory diagram showing an equivalent circuit example in a state in which a finger touches or comes close to the touch detection device.
Figure 4:
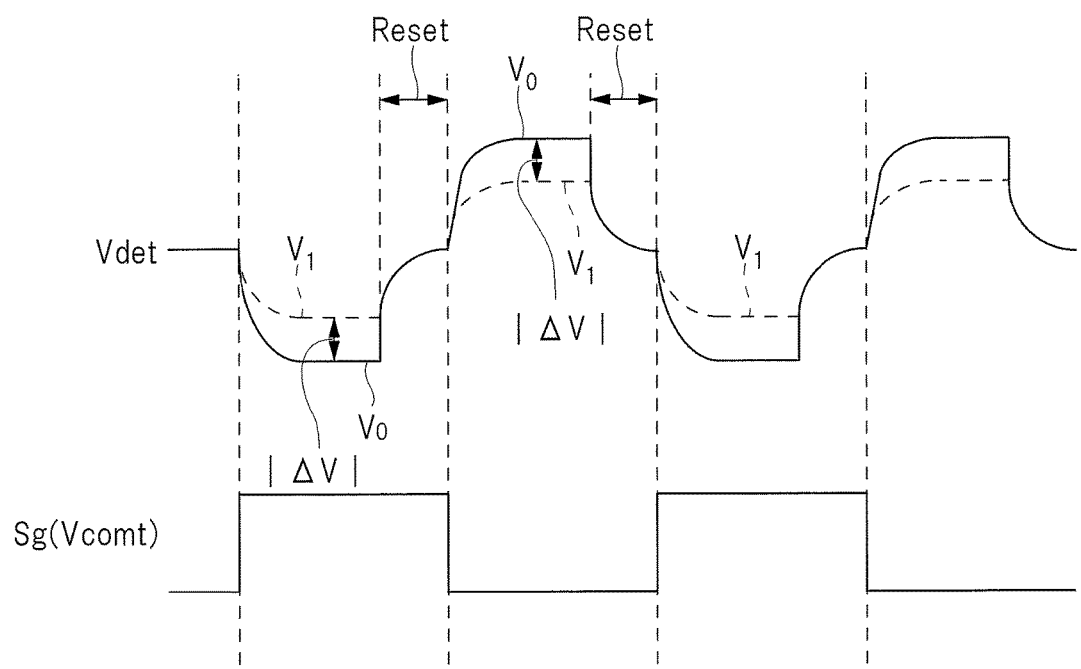
FIG. 4 is a diagram showing an example of a waveform of each of a driving signal and a detection signal.

Next, with reference to FIGS. 1 to 4, the principle of a touch detection in the display apparatus 1 of the present first embodiment will be described. FIG. 2 is an explanatory diagram showing a touching state or coming-close state of a finger onto the touch detection device. FIG. 3 is an explanatory diagram showing an equivalent circuit example in the state of the touching state or coming-close state of the finger onto the touch detection device. FIG. 4 is a diagram showing an example of a waveform of each of a driving signal and a detection signal.

As shown in FIG. 2, in the electrostatic capacitance-type touch detection, an input device referred to as a touch panel or a touch sensor has a driving electrode E1 and a detection electrode E2 that are disposed so as to face each other and so as to interpose a dielectric member D therebetween. A capacitive element C1 is formed of these driving electrode E1 and detection electrode E2. As shown in FIG. 3, one end of the capacitive element C1 is connected to an alternate-current signal source S serving as a driving signal source, and the other end of the capacitive element C1 is connected to a voltage detector DET serving as a touch detection unit. The voltage detector DET is formed of, for example, an integration circuit included in the touch sensing signal amplifying unit 42 shown in FIG. 1.

When an alternate-current rectangular wave Sg having a frequency of, for example, about several kHz to several hundreds kHz, is applied from the alternate-current signal source S onto one end of the capacitive element C1, that is, onto the driving electrode E1, a detection signal Vdet having an output waveform is generated through the voltage detector DET connected to the other end of the capacitive element C1, that is, the detection electrode E2 side. Note that this alternate-current rectangular wave Sg corresponds to, for example, a touch detection driving signal Vcomt shown in FIG. 4.

In a state in which the finger does not contact or come close, that is, in a no contact state, as shown in FIG. 3, an electric current $I_1$ is flowed in accordance with the capacitance value of the capacitive element C1 by charge/discharge of the capacitive element C1. The voltage detector DET converts fluctuation of the electric current $I_1$ in accordance with the alternate-current rectangular wave Sg to fluctuation of voltage. This voltage fluctuation is denoted by a waveform $V_O$ with a solid line in FIG. 4.

On the other hand, in a state in which the finger contacts or comes close, that is, in a contact state, the capacitance value of the capacitive element C1 formed of the driving electrode E1 and the detection electrode E2 becomes small because of being influenced by an electrostatic capacitance C2 formed by the finger. For this reason, the electric current $I_1$ flowing through the capacitive element C1 shown in FIG. 3 is fluctuated. The voltage detector DET converts the fluctuation of the electric current $I_1$ in accordance with the alternate-current rectangular wave Sg to a fluctuation of voltage. This fluctuation of voltage is shown by a waveform $V_1$ with a broken line in FIG. 4. In this case, the waveform $V_1$ has an amplitude smaller than that of the above-described waveform $V_O$. Thus, the absolute value $|\Delta V|$ of a voltage difference between the waveform $V_O$ and waveform $V_1$ changes in accordance with an influence of an object, such as a finger, that comes close thereto from the outside. In order to accurately detect the absolute value $|\Delta V|$ of the voltage difference between the waveform $V_O$ and waveform $V_1$, note that the voltage detector DET is preferably operated so as to include a resetting period Reset for resetting the charge/discharge of the capacitor in accordance with the frequency of the alternate-current rectangular wave Sg by switching inside the circuit.

In an example shown in FIG. 1, the touch detection device 30 performs the touch detection in accordance with the touch detection driving signal Vcomt supplied from the driving electrode driver 14 for each of detection blocks, that is, a partial detection region Atp (see FIG. 13 to be described later) corresponding to one or a plurality of driving electrodes COML1 (see FIG. 5 or 6 to be described later). That is, the touch detection device 30 outputs a detection signal Vdet through the voltage detector DET shown in FIG. 3 for each one of the detection regions Atp corresponding to one or a plurality of the driving electrodes COML1, and supplies the outputted detection signal Vdet to the touch sensing signal amplifying unit 42 of the touch detection unit 40.

The A/D converting unit 43 is a circuit for converting an analog signal to a digital signal by sampling each analog signal outputted from the touch sensing signal amplifying unit 42 at a timing synchronized with the touch detection driving signal Vcomt.

The signal processing unit 44 is provided with a digital filter for reducing a component of a frequency other than a frequency obtained by sampling the touch detection driving signal Vcomt contained in the output signal of the A/D converting unit 43, that is, reducing a noise component. The signal processing unit 44 is a logical circuit that detects existence or nonexistence of the touch onto the touch detection device 30 based on the output signal of the A/D converting unit 43. The signal processing unit 44 performs a process of extracting only a differential voltage caused by the finger. The differential voltage caused by the finger is the above-described absolute value $|\Delta V|$ of the difference between the waveform $V_O$ and waveform $V_1$. The signal processing unit 44 may perform an arithmetic operation for averaging the absolute value $|\Delta V|$ per one partial detection region so as to acquire an average value of the absolute values $|\Delta V|$. Thus, the signal processing unit 44 can reduce the influence of the noise. The signal processing unit 44 compares the detected differential voltage caused by the finger with a predetermined threshold voltage. If it is equal to or larger than the threshold value voltage, the state is determined as the contact state of the external approaching object from the outside. If it is smaller than the threshold voltage, the state is determined as no contact state of the external approaching object. In this manner, the touch detection by the touch detection unit 40 is performed.

The coordinate extracting unit 45 is a logical circuit which, when the touching is detected by the signal processing unit 44, acquires the coordinates of the position at which the touching is detected, that is, the input position in the touch panel. The sensing timing control unit 46 controls so that the A/D converting unit 43, the signal processing unit 44 and the coordinate extracting unit 45 are operated in synchronization with one another. The coordinate extracting unit 45 outputs touch panel coordinates as a signal output Vout.

<Module>

Figure 5:
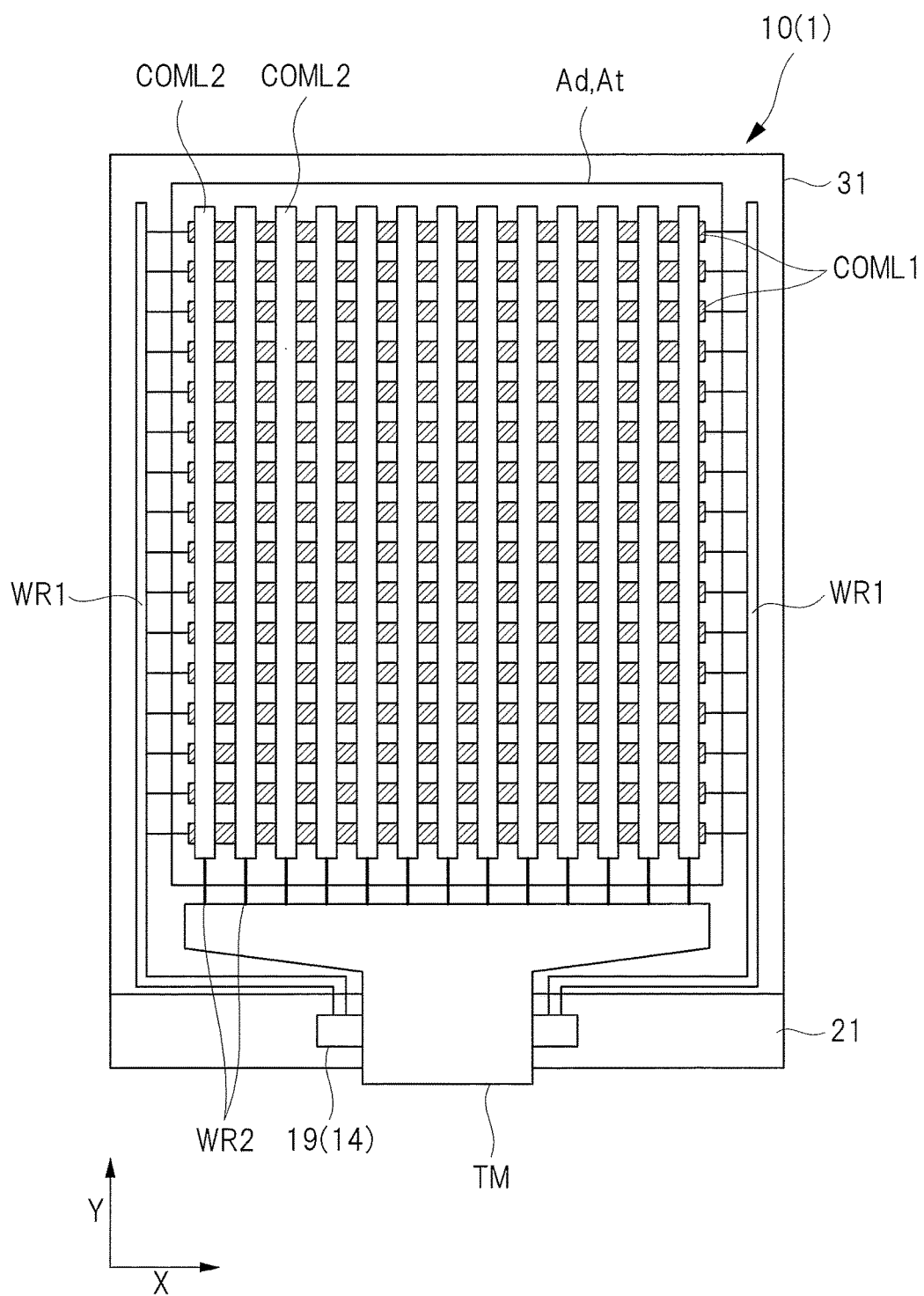
FIG. 5 is a plan view showing an example of module on which the display apparatus of the first embodiment is mounted.

FIG. 5 is a plan view showing an example of module on which the display apparatus of the first embodiment is mounted.

As shown in FIG. 5, a display device 10 having a touch detection function according to the first embodiment has a substrate 21, a substrate 31, a plurality of driving electrodes COML1 and a plurality of driving electrodes COML2.

The substrate 21 has an upper surface serving as one main surface and a lower surface serving as the other main surface on the side opposite to the upper surface. Moreover, the substrate 31 has an upper surface serving as one main surface and a lower surface serving as the other main surface on the side opposite to the upper surface. Here, it is assumed that two directions that intersect with each other, and more preferably, are orthogonal to each other, within the upper surface of the substrate 21 or within the lower surface of the substrate 21, or within the upper surface of the substrate 31 or within the lower surface of the substrate 31, are an X-axis direction and a Y-axis direction. At this time, each of the plurality of the driving electrodes COML1 is extended in the X-axis direction and is also arranged in the Y-axis direction when seen in a plan view. Moreover, each of the plurality of the driving electrodes COML2 is extended in the Y-axis direction and is also arranged in the X-axis direction when seen in a plan view.

As will be described later with reference to FIG. 7, each of the plurality of the driving electrodes COML1 is formed so as to overlap with a plurality of sub-pixels SPix arranged in the X-axis direction when seen in a plan view. That is, one driving electrode COML1 is formed as a common electrode for the plurality of the sub-pixels SPix.

In the specification of the present application, note that the expression "when seen in a plan view" means a case of viewing from a direction perpendicular to the upper surface of the substrate 21 or to the upper surface of the substrate 31.

In the example shown in FIG. 5, the display device 10 having the touch detection function has a rectangular shape provided with two sides each of which is extended in the X-axis direction and which face each other and two sides each of which is extended in the Y-axis direction and which face each other when seen in a plan view. On one side of the display device 10 having the touch detection function in the Y-axis direction, a terminal unit TM is formed. The terminal unit TM and each of the plurality of the driving electrodes COML2 are electrically connected to each other by a routing wiring WR2. The terminal unit TM is connected to the touch detection unit 40 (see FIG. 1) that is mounted on the external portion of this module. Therefore, the driving electrodes COML2 are connected to the touch detection unit 40 through the routing wiring WR2 and the terminal unit TM.

The display device 10 having the touch detection function has a COG 19. The COG 19 is a chip mounted on the substrate 21 which embedding each of circuits required for a displaying operation, such as the control unit 11, the gate driver 12, and the source driver 13 shown in FIG. 1. Moreover, the driving electrode driver 14 may be embedded in the COG 19. Although not shown in the drawings in detail, the COG 19 and each of the plurality of the driving electrodes COML1 are electrically connected to each other by a routing wiring WR1.

Note that various substrates such as, for example, a glass substrate or a film made of resin can be used as the substrate 21. Moreover, as the substrate 31, various transparent substrates relative to visible light, such as a film made of resin of PET (Polyethylene terephthalate) or others, can be used. Furthermore, in the specification of the present application, the expression "transparent . . . relative to visible light" means that its transmittance relative to visible light is, for example, 90% or higher, and the transmittance relative to visible light means an average value of transmittances relative to light having wavelengths of, for example, 380 to 780 nm.

<Display Device Having Touch Detection Function>

Next, with reference to FIGS. 5 to 8, the display device having the touch detection function of the display apparatus will be described.

Figure 6:
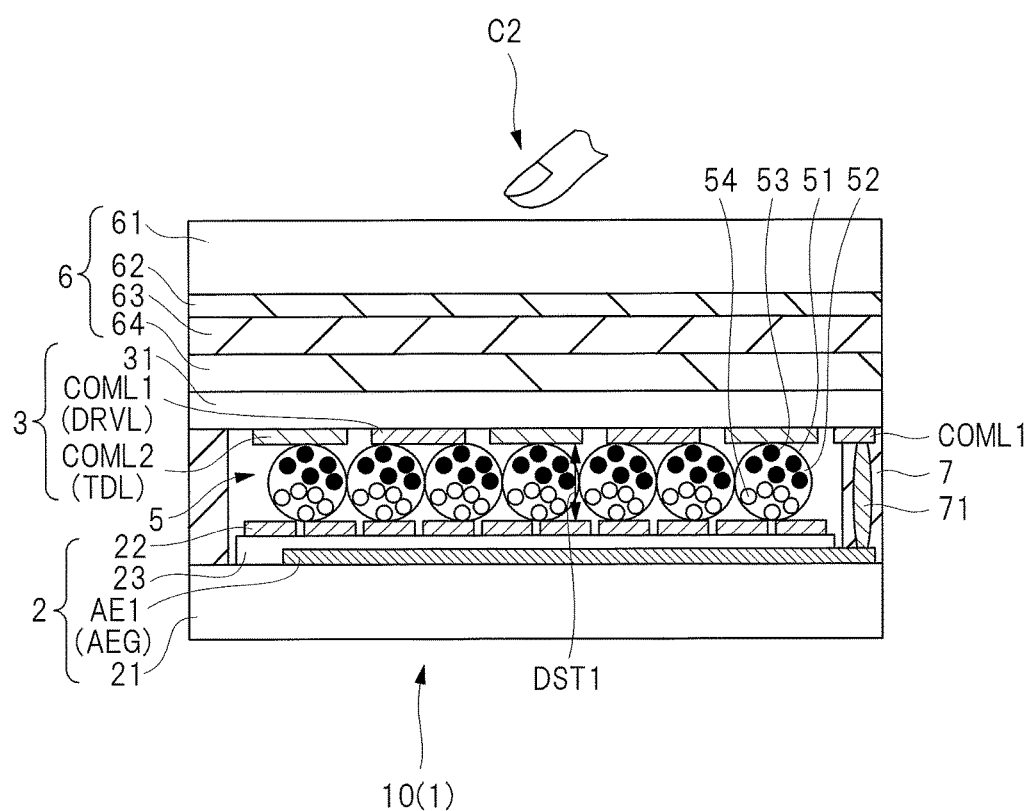
FIG. 6 is a cross-sectional view showing an example of configuration of a display device with a touch detection function of the display apparatus of the first embodiment.
Figure 7:
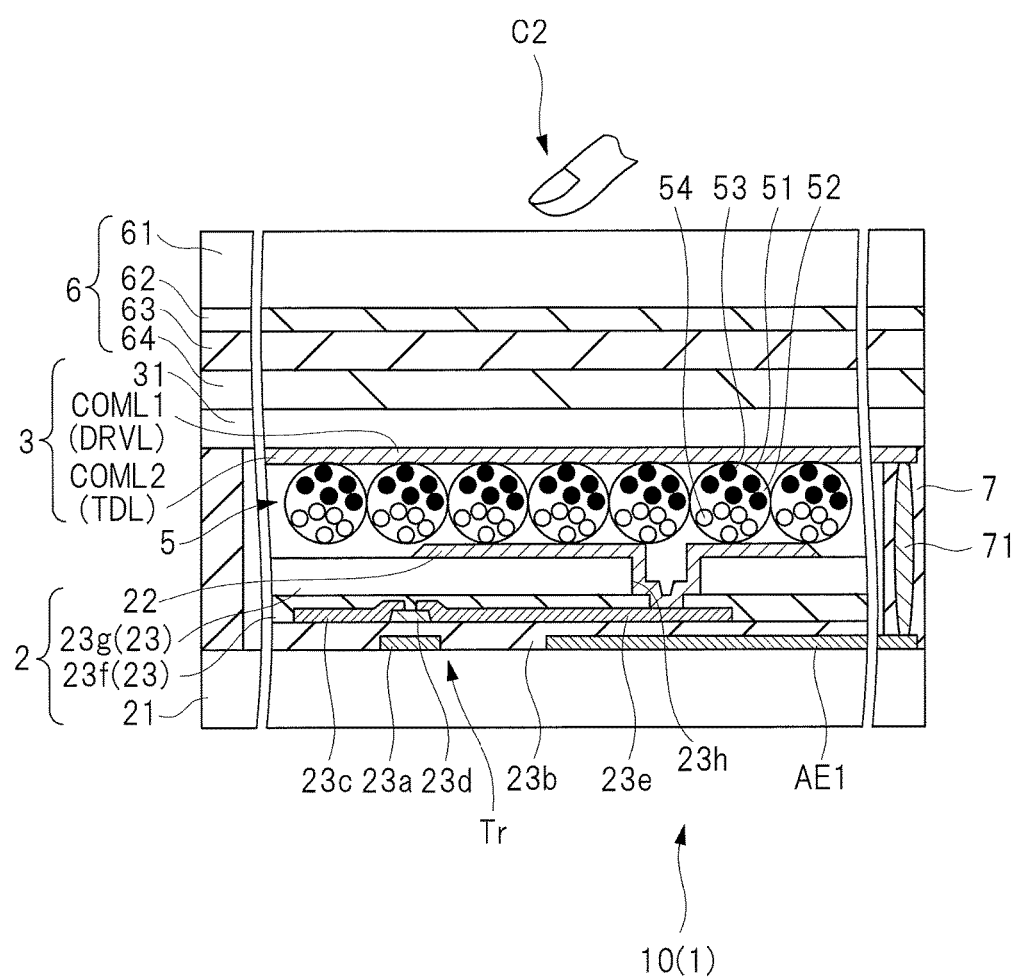
FIG. 7 is a cross-sectional view showing another example of configurations of the display device with a touch detection function of the display apparatus of the first embodiment.
Figure 8:
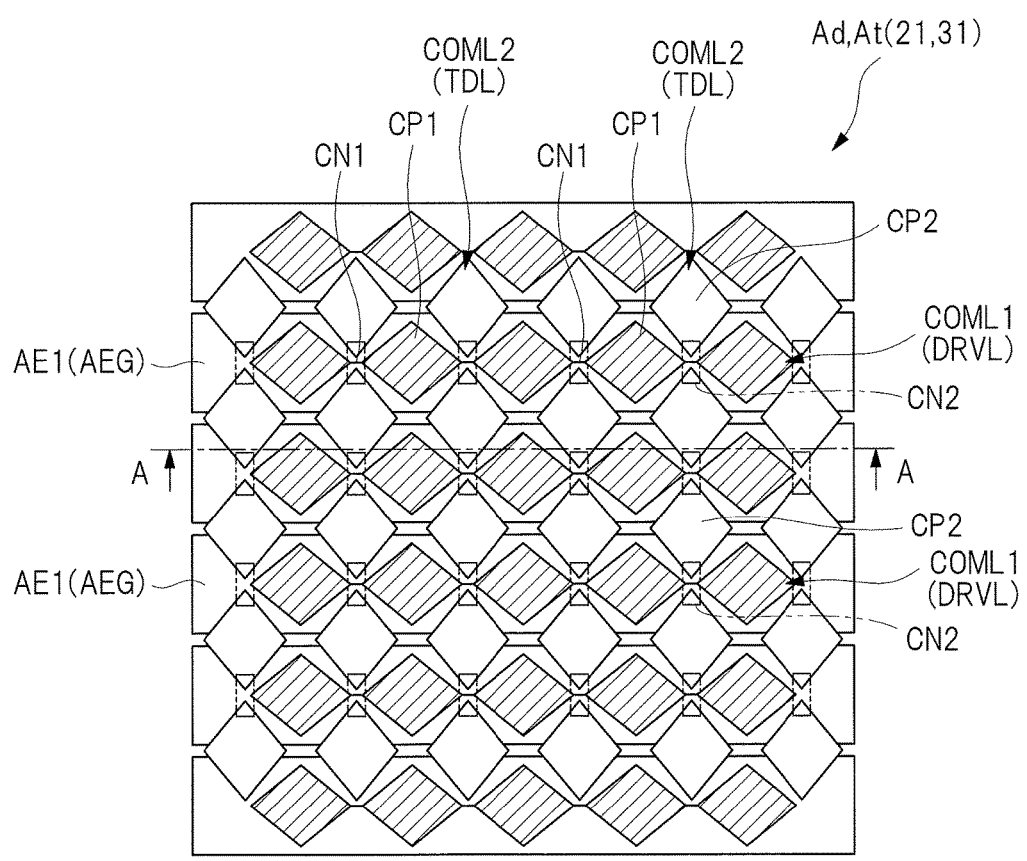
FIG. 8 is a plan view schematically showing one example of configuration of a driving electrode and an auxiliary electrode in the display apparatus of the first embodiment.

FIGS. 6 and 7 are cross-sectional views showing one example of a configuration of the display device having the touch detection function of the display apparatus according to the first embodiment. FIG. 8 is a plan view schematically showing one example of configurations of the driving electrodes and auxiliary electrodes in the display apparatus according to the first embodiment. FIG. 7 shows a peripheral portion of one sub-pixel SPix in the cross-sectional view shown in FIG. 6, the portion shown as a peripheral portion of a TFT element Tr so as to be enlarged. Moreover, FIG. 6 is a cross-sectional view taken along a line A-A of FIG. 8.

Figure 9:
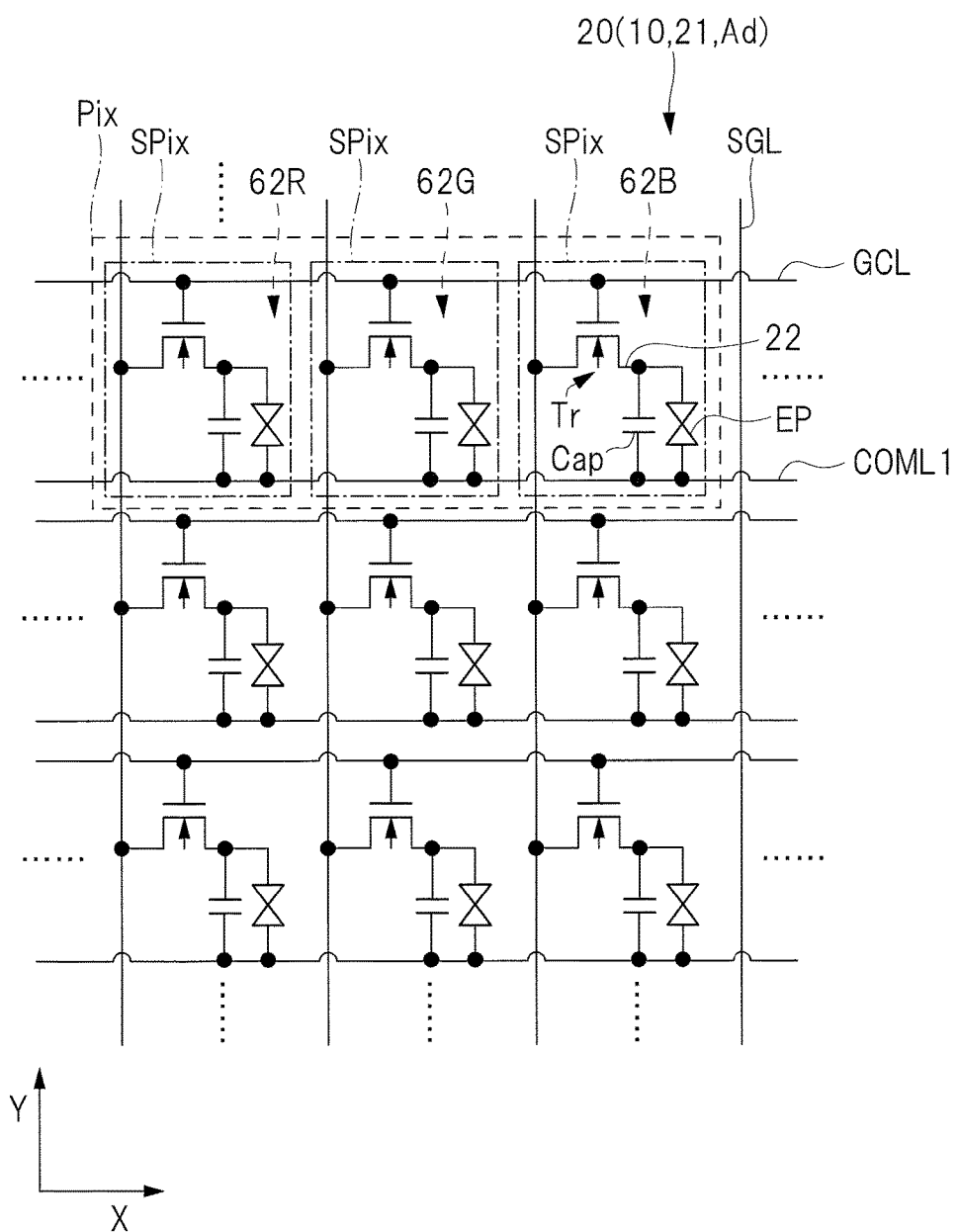
FIG. 9 is a circuit diagram showing the display device with a touch detection function of the display apparatus of the first embodiment.
Figure 10:
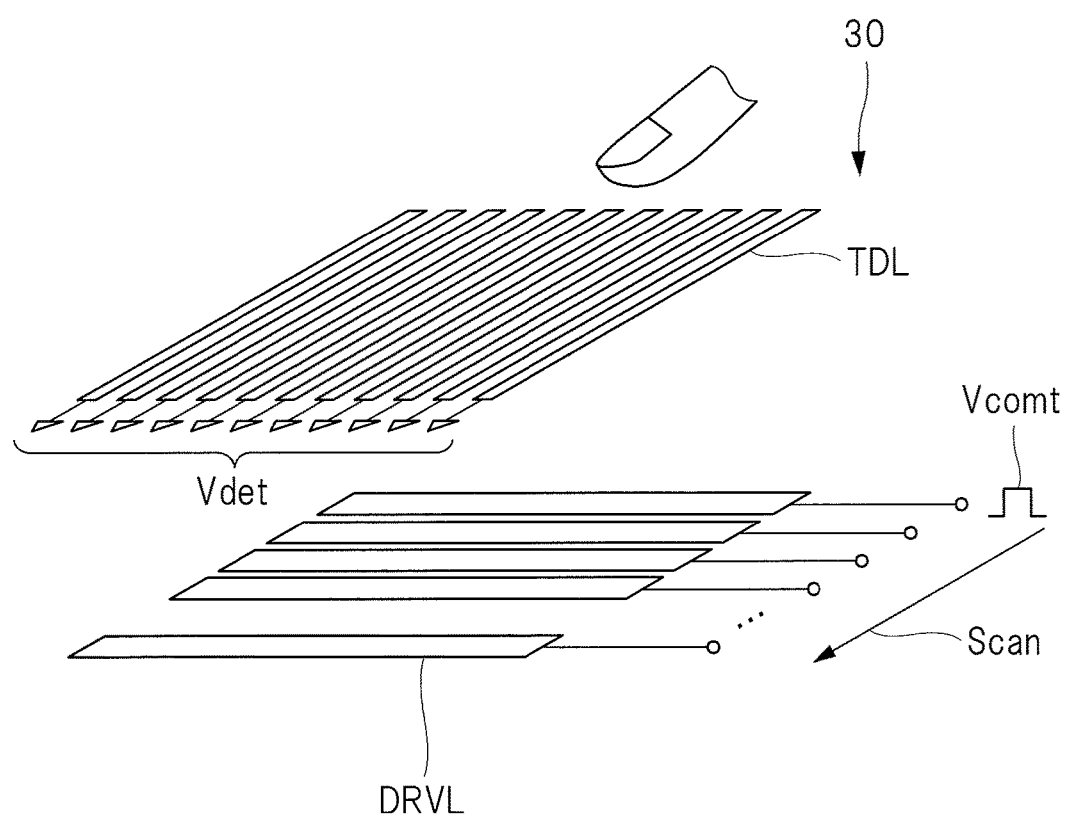
FIG. 10 is a perspective view showing one example of configuration of a driving electrode and a detection electrode of the display apparatus of the first embodiment.

FIG. 9 is a circuit diagram showing the display device having the touch detection function of the display apparatus according to the first embodiment. FIG. 10 is a perspective view showing an example of configuration of the driving electrodes and detection electrodes of the display apparatus according to the first embodiment.

The display device 10 having the touch detection function has an array substrate 2, a facing substrate 3, an electrophoresis layer 5, a protective substrate 6 and a sealing portion 7. The facing substrate 3 has a facing arrangement in which an upper surface serving as a main surface of the array substrate 2 and a lower surface serving as a main surface of the facing substrate 3 are arranged so as to face each other. The electrophoresis layer 5 is formed between the array substrate 2 and the facing substrate 3. That is, the electrophoresis layer 5 is sandwiched between the upper surface of the substrate 21 and the lower surface of the substrate 31.

The array substrate 2 has the substrate 21. Moreover, the facing substrate has the substrate 31. As described above, the substrate 21 has an upper surface serving as one main surface, and a lower surface serving as the other main surface on the side opposite to the upper surface. Moreover, the substrate 31 has an upper surface serving as one main surface, and a lower surface serving as the other main surface on the side opposite to the upper surface. The substrate 31 is disposed so as to face the substrate 21 so that the upper surface serving as the main surface of the substrate 21 and the lower surface serving as the main surface of the facing substrate 31 face each other. The upper surface of the substrate 21 includes a display region Ad serving as one region of the upper surface. The upper surface of the substrate 31 includes a touch detection region At serving as one region of the upper surface. When seen in a plan view, the display region Ad and the touch detection region At may be the same region, or the display region Ad may be disposed within the touch detection region At, or the touch detection region At may be disposed within the display region Ad.

As shown in FIG. 6, the array substrate 2 has the substrate 21, an insulating film 23 and a plurality of pixel electrodes 22. As shown in FIG. 9, in the display region Ad, a plurality of scanning lines GCL and a plurality of signal lines SGL are formed on the upper surface of the substrate 21. Moreover, as shown in FIG. 7 and FIG. 9, a plurality of TFT elements Tr are formed on the upper surface of the substrate 21. Each of the TFT elements Tr is, for example, a thin-film transistor serving as an n-channel type MOS (Metal Oxide Semiconductor).

Note that, FIG. 6 shows an insulating film 23 in which an insulating film 23b, an interlayer resin film 23f and an insulating film 23g shown in FIG. 7 are integrally formed. Moreover, the scanning line means a gate wiring, and the signal line means a source wiring.

As shown in FIG. 9, on the upper surface of the substrate 21, a plurality of scanning lines GCL are formed. As shown in FIG. 9, each of the plurality of scanning lines GCL is extended in the X-axis direction and is also arranged in the Y-axis direction when seen in a plan view. Each of the plurality of scanning lines GCL is made of an opaque metal such as aluminum (Al) or molybdenum (Mo). At an intersecting point between the signal line SGL and the scanning line GCL as described later, a gate electrode 23a is extended from the scanning line GCL.

On the upper surface of the substrate 21, an insulating film 23b serving as a gate insulating film is formed so as to cover the plurality of the scanning lines GCL and gate electrodes 23a. The insulating film 23b is a transparent insulating film made of, for example, silicon nitride or silicon oxide.

On the insulating film 23b, a plurality of signal lines SGL are formed. Each of the plurality of the signal lines SGL is extended in the Y-axis direction and is also arranged in the X-axis direction when seen in a plan view. Each of the signal lines SGL is made of an opaque metal such as aluminum (Al) or molybdenum (Mo). At an intersecting point between the signal line SGL and the scanning line GCL, a source electrode 23c is extended from the signal line SGL.

On the insulating film 23b at a portion overlapping with the gate electrode 23a when seen in a plan view, a semiconductor layer 23d is formed. The semiconductor layer 23d is made of, for example, amorphous silicon or polycrystalline silicon. The above-described source electrode 23c is made in contact with partially the semiconductor layer 23d.

Moreover, on the insulating film 23b, a drain electrode 23e made of the same material as those of the scanning line GCL and the source electrode 23c is formed. The drain electrode 23e is disposed closely to the source electrode 23c, and is partially made in contact with the semiconductor layer 23d.

More preferably, the drain electrode 23e is made of a conductor film formed in the same layer as the conductor film included in the signal line SGL. Thus, the drain electrode 23e can be formed by the same process as the process of forming the signal lines SGL.

In this manner, by disposing the TFT element Tr on each of a plurality of intersecting points at which the plurality of the scanning lines GCL and the plurality of the signal lines SGL intersect with each other, the plurality of the TFT elements Tr are formed. Each of the plurality of the TFT elements Tr is a switching element formed of the gate electrode 23a, the insulating film 23b, the source electrode 23c, the semiconductor layer 23d and the drain electrode 23e. The plurality of the TFT elements Tr are formed on the upper surface of the substrate 21.

Moreover, as shown in FIG. 9, the plurality of the sub-pixels SPix are formed so as to correspond to the plurality of the TFT elements Tr, respectively. The plurality of the sub-pixels SPix are disposed in a matrix form in the direction in which the scanning lines GCL are extended (X-axis direction) as well as in the direction in which the signal lines SGL are extended (Y-axis direction). Note that the region in which the plurality of the sub-pixels SPix are disposed in the matrix form is, for example, the above-described display region Ad.

On the insulating film 23b, an interlayer resin film 23f is formed so as to cover the plurality of the signal lines SGL, the plurality of the source electrodes 23c, the plurality of the semiconductor layers 23d and the plurality of the drain electrodes 23e. The interlayer resin film 23f is a flattening film so as to partially cover exposed portions of the plurality of the signal lines SGL, the plurality of the source electrodes 23c, the plurality of the semiconductor layers 23d, the plurality of the drain electrodes 23e and the insulating film 23b, and also to flatten irregular surfaces formed of each upper surface of the plurality of the signal lines SGL, the plurality of the source electrodes 23c, the plurality of the semiconductor layers 23d, the plurality of the drain electrodes 23e and the insulating film 23b. The interlayer resin film 23f is made of, for example, a transparent resin material such as a photoresist.

On the interlayer resin film 23f, an insulating film 23g is formed. The insulating film 23g is a transparent insulating film made of, for example, silicon nitride or silicon oxide.

On the insulating film 23g, a plurality of pixel electrodes 22 are formed. That is, the plurality of the pixel electrodes 22 are formed on the upper surface of the substrate 21. Note that the plurality of the pixel electrodes 22 may be formed on the lower surface of the substrate 21.

When seen in a plan view, each of the plurality of the pixel electrodes 22 is disposed inside each of the plurality of the sub-pixels SPix. Each of the plurality of the pixel electrodes 22 is made of a transparent conductive material such as ITO or IZO. When seen in a plan view, on the periphery of the sub-pixel SPix, an opening 23h is formed at a position overlapped with the drain electrode 23e so as to penetrate through the insulating film 23g and the interlayer resin film 23f to reach the drain electrode 23e. The pixel electrode 22 is also formed on the inner wall of the opening 23h as well as on the drain electrode 23e exposed from the bottom of the opening 23h so as to be electrically connected to the drain electrode 23e exposed from the bottom of the opening 23h.

As shown in FIGS. 6 to 8, on the upper surface of the substrate 21, a group of auxiliary electrodes AEG made of a plurality of auxiliary electrodes AE1 are formed. The plurality of the auxiliary electrodes AE1 are formed in the same layer as those of the scanning lines GCL and the gate electrodes 23a on the upper surface of the substrate 21 at the display region Ad or the touch detection region At when seen in a plan view. Therefore, the insulating film 23b is formed so as to cover the plurality of the auxiliary electrodes AE1. Each of the plurality of the auxiliary electrodes AE1 is extended in the X-axis direction and is also arranged in the Y-axis direction when seen in a plan view.

More preferably, each of the plurality of the driving electrodes COML1 is electrically connected to any one or more of the plurality of the auxiliary electrodes AE1 through a conductive portion 71 formed inside the sealing portion 7. That is, each of the plurality of the auxiliary electrodes AE1 is electrically connected to the driving electrode driver 14 (see FIG. 1) through a routing wiring WR1 (see FIG. 5). Thus, in performing the touch detection operation, a touch detection driving signal Vcomt (see FIG. 1) formed of an alternate-current signal having the same phase as the alternate-current signal contained in the touch detection driving signal Vcomt supplied to the driving electrode COML1 can be supplied to the auxiliary electrode AE1. Therefore, a parasitic capacitance generated between the driving electrode COML1 and each of the wirings included in the array substrate 2 can be eliminated so that the sensitivity of the touch detection can be improved.

As shown in FIGS. 6 to 8, the facing substrate 3 has the substrate 31, the plurality of the driving electrodes COML1 and the plurality of the driving electrodes COML2.

Each of the plurality of the driving electrodes COML1 and the plurality of the driving electrodes COML2 is made of a transparent conductor material such as ITO or IZO. The plurality of the driving electrodes COML1 and the plurality of the driving electrodes COML2 are formed on the lower surface of the substrate 31 at the display region Ad or the touch detection region At when seen in a plan view. Note that the plurality of the driving electrodes COML1 or the plurality of the driving electrodes COML2 may be formed on the upper surface of the substrate 31.

Each of the plurality of the driving electrodes COML1 is extended in the X-axis direction and is also arranged in the Y-axis direction when seen in a plan view. Each of the plurality of the driving electrodes COML1 includes a plurality of electrode portions CP1 and a plurality of connection portions CN1. Each of the plurality of the electrode portions CP1 and each of the plurality of the connection portions CN1 are formed on the lower surface of the substrate 31 at the display region Ad or the touch detection region At. The plurality of the electrode portions CP1 are arranged in the X-axis direction when seen in a plan view. Moreover, the two electrode portions CP1 that are adjacent to each other in the X-axis direction are electrically connected to each other by the connection portion CN1.

Each of the plurality of the driving electrodes COML2 is extended in the Y-axis direction and is also arranged in the X-axis direction when seen in a plan view. Each of the plurality of the driving electrodes COML2 includes a plurality of electrode portions CP2 and a plurality of connection portions CN2. Each of the plurality of the electrode portions CP2 and each of the plurality of the connection portions CN2 are formed on the lower surface of the substrate 31 at the display region Ad or the touch detection region At. The plurality of the electrode portions CP2 are arranged in the Y-axis direction when seen in a plan view. Moreover, the two electrode portions CP2 that are adjacent to each other in the Y-axis direction are electrically connected to each other by the connection portion CN2.

In the example as shown in FIG. 6 and FIG. 8, the plurality of the driving electrodes COML1 and the plurality of the driving electrodes COML2 are formed in the same layer. For this reason, the connection portions CN2 are formed in a layer different from that of the electrode portion CP2, and each of them is formed so as to bridge over each of the connection portions CN1 through an insulating film not shown.

As the electrophoresis layer 5, such a layer as to contain, for example, a plurality of electrophoretic particles serving as a plurality of charged particles may be used. More preferably, as shown in FIG. 6 and FIG. 7, as the electrophoresis layer 5, such a layer as to contain a plurality of microcapsules 51 whose insides contain a plurality of electrophoresis particles sealed therein, may be used.

Each of the microcapsules 51 is a transparent capsule. The microcapsule 51 is made from, for example, gum Arabic and gelatin. Inside each of the microcapsules 51, a dispersion solution 52, black fine particles 53 serving as a plurality of electrophoresis particles and white fine particles 54 serving as a plurality of electrophoresis particles are sealed. The dispersion solution 52 is made of a transparent liquid. The dispersion solution 52 is made of, for example, silicone oil. The black fine particles 53 are made of, for example, negatively-charged graphite. On the other hand, the white fine particles 54 are made of, for example, positively-charged titanium oxide ($TiO_2$).

Note that, for example, a transparent binder polymer may be filled in a portion of the electrophoresis layer 5, the portion being between the microcapsules 51 although the illustration thereof is omitted.

Such an electrophoresis layer 5 can be formed between the array substrate 2 and the facing substrate 3 by using the following method. First, on one main surfaces of the substrate 31 made of, for example, a resin such as PET, the driving electrode COML1 and the plurality of the driving electrodes COML2 are formed. Next, for example, the microcapsules 51 are applied onto the plurality of the driving electrodes COML1 and the plurality of the driving electrodes COML2 in a state mixed with, for example, a transparent binder polymer if necessary. Next, the substrate 31 with the microcapsules 51 applied thereon is bonded to the substrate 21 in a state that the main surface thereof on which the microcapsules 51 are applied faces the main surface of the substrate 21 on which the pixel electrodes 22 are formed, that is, the upper surface of the substrate 21. Thus, between the substrate 21 included in the array substrate 2 and the substrate 31 included in the facing substrate 3, an electrophoresis layer 5 made of the microcapsules 51 can be formed.

A thickness of the electrophoresis layer 5, that is, a distance DST1 between the lower surface of the driving electrode COML1 and the upper surface of the pixel electrode 22 is, for example, about 30 to 200 μm. Meanwhile, a thickness of a liquid crystal layer in a liquid crystal display device is, for example, about 3 μm. Therefore, the thickness of the electrophoresis layer 5 is larger than the thickness of the liquid crystal layer in the liquid crystal display device.

As shown in FIG. 6 and FIG. 7, the protective substrate 6 has a substrate 61, a color filter layer 62, an optical film 63 and a barrier film 64. Note that it may be not required to form the color filter layer 62. In this case, the display apparatus 1 of the first embodiment is a display apparatus of a mono-color display type.

The substrate 61 has an upper surface serving as a main surface and a lower surface serving as a main surface on the side opposite to the upper surface. As the substrate 61, various transparent substrates with respect to visible light, such as, for example, a glass substrate, or, for example, a film made of a resin such as PET may be used.

The color filter layer 62 is formed on the lower surface of the substrate 61. As the color filter layer 62, color filter layers colored into three colors such as red (R), green (G) and blue (B) are arranged in the X-axis direction. In such a case, as shown in FIG. 9, a plurality of sub-pixels SPix corresponding to the color regions 62R, 62G and 62B of three colors R, G and B are formed, respectively, and one pixel Pix is formed by using the plurality of the sub-pixels SPix corresponding to the respective color regions 62R, 62G and 62B which are in one set. The pixels Pix are disposed in a matrix form in the direction (X-axis direction) in which the scanning lines GCL are extended and in the direction (Y-axis direction) in which the signal lines SGL are extended. Moreover, a region in which the pixels Pix are disposed in the matrix form is, for example, the above-described display region Ad.

As color combination of the color filter layer 62, a combination of a plurality of colors including colors other than R, G and B may be used. Moreover, the color filter layer 62 may not be formed. Alternatively, one pixel Pix may include a sub-pixel SPix with no color filter 62 formed thereon, that is, a white-color sub-pixel SPix.

The optical film 63 and the barrier film 64 are successively formed on the lower surface of the substrate 61 so as to cover the color filter layers 62. As the optical film 63 and the barrier film 64, for example, a film made of a resin or others may be used.

The sealing portion 7 is formed between the outer peripheral portion of the array substrate 2 and the outer peripheral portion of the facing substrate 3. A space between the array substrate 2 and the facing substrate 3 is sealed by the sealing portion 7 formed so as to surround an outer peripheral portion of the space. And, in the space sealed by the sealing portion 7, the electrophoresis layer 5 is formed as described above.

A conductive portion 71 is formed inside the sealing portion 7. The conductive portion 71 allows the end portion of the auxiliary electrode AE1 and the end portion of the driving electrode COML1 to be conducted to each other. That is, the auxiliary electrode AE1 and the driving electrode COML1 are electrically connected to each other through the conductive portion 71. The conductive portion 71 is formed by a transparent conductive material such as ITO, or fine particles made of a metal material.

The electrophoresis display device 20 has a plurality of scanning lines GCL, a plurality of signal lines SGL, a plurality of TFT elements Tr, a plurality of pixel electrodes 22, a plurality of driving electrodes COML1, a plurality of driving electrodes COML2 and a plurality of electrophoresis elements EP. The electrophoresis display device 20 displays images for each one of display blocks, that is, each partial display regions Adp (see FIG. 13 to be described later) corresponding to one or the plurality of the driving electrodes COML1. That is, the electrophoresis display device 20 supplies a display driving signal Vcomd (see FIG. 1) to each one of the partial display regions Adp corresponding to one or the plurality of the driving electrodes COML1.

As described above, the sub-pixels SPix are disposed at the intersecting points between the plurality of the scanning lines GCL and the plurality of the signal lines SGL that intersect with each other when seen in a plan view, so that one pixel Pix is formed by the plurality of sub-pixels SPix having different colors. Moreover, the TFT elements Tr are formed at the intersecting points in which the plurality of the scanning lines GCL and the plurality of the signal lines SGL intersect with each other when seen in a plan view. Therefore, the TFT element Tr is formed at each of the plurality of the sub-pixels SPix. Moreover, an electrophoresis element EP is formed at each of the plurality of the sub-pixels SPix, in addition to the TFT element Tr.

As shown in FIG. 9, the gate electrode of each TFT element Tr is connected to the scanning line GCL. The source electrode of the TFT element Tr is connected to the signal line SGL. The drain electrode of the TFT element Tr is connected to one end of the electrophoresis element EP. The electrophoresis element EP has, for example, one end connected to the drain electrode of the TFT element Tr and the other end connected to the driving electrode COML1.

As shown in FIG. 9, the plurality of the pixel electrodes 22 are formed inside the plurality of the sub-pixels SPix disposed in the matrix form in the X-axis direction as well as in the Y-axis direction at the display region Ad when seen in a plan view, respectively. Therefore, the plurality of the pixel electrodes 22 are disposed in the matrix form in the X-axis direction as well as in the Y-axis direction.

As shown in FIG. 9, the plurality of the driving electrodes COML1 are formed so as to be overlapped with the plurality of pixel electrodes 22 when seen in a plan view, respectively. At this time, a pixel signal Vpix (see FIG. 1) is supplied to each of the plurality of the pixel electrodes 22 by the source driver 13, and a display driving signal Vcomd (see FIG. 1) is supplied to each of the plurality of the driving electrodes COML1 by the driving electrode driver 14. And, by forming an electric field between each of the plurality of the pixel electrodes 22 and each of the plurality of the driving electrodes COML1, that is, in the electrophoresis element EP formed on each of the plurality of the sub-pixels SPix, an image is displayed in the display region Ad. At this time, a capacitance Cap is formed between the driving electrode COML1 and the pixel electrode 22, and the capacitance Cap functions as a holding capacitor.

As shown in FIG. 9, the plurality of the sub-pixels SPix arranged in the X-axis direction, that is, the plurality of the sub-pixels SPix belonging to the same line of the electrophoresis display device 20, are connected with each other by the scanning line GCL. The scanning line GCL is connected to the gate driver 12 (see FIG. 1), and a scanning signal Vscan (see FIG. 1) is supplied by the gate driver 12. Moreover, the plurality of the sub-pixels SPix arranged in the Y-axis direction, that is, the plurality of the sub-pixels SPix belonging to the same row of the electrophoresis display device 20, are connected with each other by the signal line SGL. Each of the plurality of the signal lines SGL is connected to the source driver 13 (see FIG. 1), and a pixel signal Vpix (see FIG. 1) is supplied by the source driver 13.

The plurality of the driving electrodes COML1 are connected to the driving electrode driver 14 (see FIG. 1). The driving electrode driver 14 supplies a display driving signal Vcomd (see FIG. 1) to the plurality of the driving electrodes COML1. In the example shown in FIG. 9, each of the plurality of the driving electrodes COML1 is extended in the X-axis direction and is also arranged in the Y-axis direction in the display region Ad. And, the plurality of the sub-pixels SPix belonging to the same line share one driving electrode COML1.

The gate driver 12 (see FIG. 1) supplies a scanning signal Vscan to the gate electrode of the TFT element Tr of each of the sub-pixels SPix through the scanning line GCL, so that one line of the sub-pixels SPix formed into the matrix form in the electrophoresis display device 20, that is, one horizontal line thereof, is successively selected as a display driving target.

The source driver 13 (see FIG. 1) supplies a pixel signal Vpix respectively to the pixel electrodes 22 included in the plurality of the respective sub-pixels SPix forming one horizontal line that is successively selected by the gate driver 12 through the signal line SGL.

In performing the displaying operation in the electrophoresis display device 20, for example, one display block, that is, a partial display region Adp (see FIG. 13 to be described later) corresponding to one or the plurality of the driving electrodes COML1 in the Y-axis direction is successively selected by the driving electrode driver 14 (see FIG. 1). Moreover, the display driving signal Vcomd (see FIG. 1) is supplied to one or the plurality of the driving electrodes COML1 disposed in the selected partial display region Adp by the driving electrode driver 14. The gate driver 12 drives so as to successively scan the scanning lines GCL in time division, so that the sub-pixels SPix are successively selected for one horizontal line. Then, the pixel signal Vpix (see FIG. 1) is supplied by the source driver 13 to the pixel electrodes 22 contained in the respective sub-pixels SPix belonging to the selected one horizontal line. In this manner, an electric field is formed between each of the plurality of the pixel electrodes 22 and each of the plurality of the driving electrodes COML1 in the selected partial display region Adp, so that an image is displayed in each horizontal line in the selected partial display region Adp.

Note that each of the plurality of the driving electrodes COML2 is extended in the Y-axis direction and is also arranged in the X-axis direction in the display region Ad as shown in FIG. 8 although illustration is omitted in FIG. 9. In such a case, the plurality of the sub-pixels SPix belonging to the same row share one driving electrode COML2. Moreover, when the display driving signal Vcomd (see FIG. 1) is supplied by the driving electrode driver 14 to one or the plurality of the driving electrodes COML1 disposed in the selected partial display region Adp (see FIG. 13 to be described later), the display driving signal Vcomd (see FIG. 1) may also be supplied by the driving electrode driver 14 to the plurality of the driving electrodes COML2 that are overlapped with the selected partial display region Adp when seen in a plan view. Furthermore, an electric field is formed between each of the plurality of the pixel electrodes 22 and each of the plurality of the driving electrodes COML2 in the selected partial display region Adp, so that an image may be displayed in the selected partial display region Adp.

Moreover, even when the partial display regions Adp (see FIG. 13 to be described later) are successively selected in performing the displaying operation, the display driving signal Vcomd (see FIG. 1) may be always supplied by the driving electrode driver 14 to the plurality of the driving electrodes COML1 disposed in all the partial display regions Adp. Even in such a case, in performing the displaying operation, the display driving signal Vcomd (see FIG. 1) is supplied by the driving electrode driver 14 to one or the plurality of the driving electrodes COML1 disposed on at least the selected partial display region Adp.

Meanwhile, the touch detection device 30 has a plurality of driving electrodes DRVL and a plurality of detection electrodes TDL formed on the facing substrate 3.

In the example shown in FIG. 6 and FIG. 8, the plurality of the driving electrodes COML1 are operated as the driving electrodes of the electrophoresis display device, and are also operated as driving electrodes DRVL of the touch detection device. Moreover, the plurality of the driving electrodes COML2 are operated as the driving electrodes for the electrophoresis display device, and are also operated as detection electrodes TDL for the touch detection device.

Each of the plurality of the detection electrodes TDL is extended in a direction intersecting with a direction in which each of the plurality of the driving electrodes DRVL is extended when seen in a plan view. In other words, the plurality of the detection electrodes TDL have a space therebetween so as to intersect with the plurality of the driving electrodes DRVL when seen in a plan view. Each of the plurality of the detection electrodes TDL is connected to the touch sensing signal amplifying unit 42 (see FIG. 1) of the touch detection unit 40.

An electrostatic capacitance is generated at an intersecting point between each of the plurality of the driving electrodes DRVL and each of the plurality of the detection electrodes TDL when seen in a plan view. Then, based on the electrostatic capacitance between each of the plurality of the driving electrodes DRVL and each of the plurality of the detection electrodes TDL, the touch detection unit 40 (see FIG. 1) detects the input position.

As shown in FIG. 10, in the touch detection device 30 in performing the touch detection operation, one detection block corresponding to one or the plurality of the driving electrodes DRVL in a scanning direction Scan, that is, the partial detection region Atp (see FIG. 13 to be described later) is successively selected by the driving electrode driver 14. Thus, a touch detection driving signal Vcomt for measuring the electrostatic capacitance between the driving electrode DRVL and the detection electrode TDL is inputted, that is, supplied by the driving electrode driver 14 to one or the plurality of the driving electrodes DRVL disposed in the selected partial detection region Atp, and a detection signal Vdet for detecting the input position is outputted from the detection electrode TDL. As described above, in the touch detection device 30, the touch detection operation is performed for each one of the partial detection regions Atp. Note that the driving electrodes DRVL correspond to the driving electrodes E1 in the principle of the above-described touch detection, and the detection electrodes TDL correspond to the detection electrodes E2.

As shown in FIG. 10, when seen in a plan view, the plurality of the driving electrodes DRVL and the plurality of the detection electrodes TDL that intersect with each other form electrostatic capacitance-type touch sensors arranged in a matrix form. Therefore, by scanning the entire surface of the touch detection region At of the touch detection device 30, the position at which the finger or others touches or comes close can be detected.

As shown in FIG. 6 and FIG. 8, a group of auxiliary electrodes AEG formed of the auxiliary electrodes AE1 may be formed. Moreover, in performing the touch detection operation, a touch detection driving signal Vcomt formed of an alternate-current signal having the same phase as the alternate-current signal contained in the touch detection driving signal Vcomt supplied to the driving electrodes DRVL formed of the driving electrodes COML1 may be supplied to the auxiliary electrodes AE1. That is, when the scan driving unit 50 supplies the touch detection driving signal Vcomt to the plurality of the driving electrodes DRVL and also supplies the touch detection driving signal Vcomt to the plurality of the auxiliary electrodes AE1, the touch detection unit 40 may detect the input position based on an electrostatic capacitance generated between each of the plurality of the driving electrodes DRVL and each of the plurality of the detection electrodes TDL. Thus, a parasitic capacitance generated between the driving electrodes DRVL and each of wirings included in the array substrate 2 can be eliminated so that the sensitivity of the touch detection can be improved. However, the auxiliary electrodes AE1 may not be formed.

<Driving Method>

Next, a method of driving the display apparatus 1 according to the present first embodiment will be described.

Figure 11:
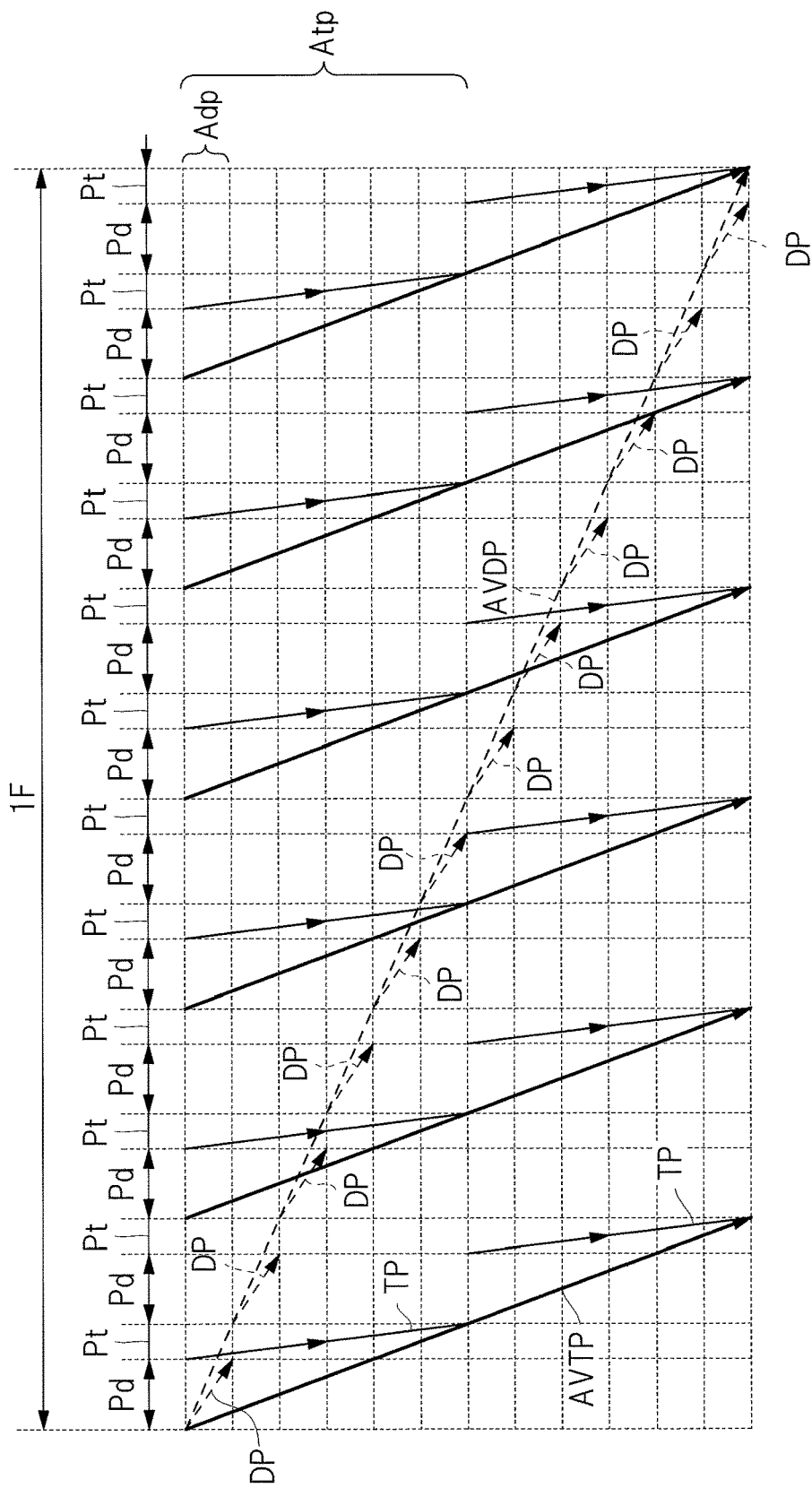
FIG. 11 is a diagram schematically showing an operation during one frame period of the display apparatus.
Figure 12:
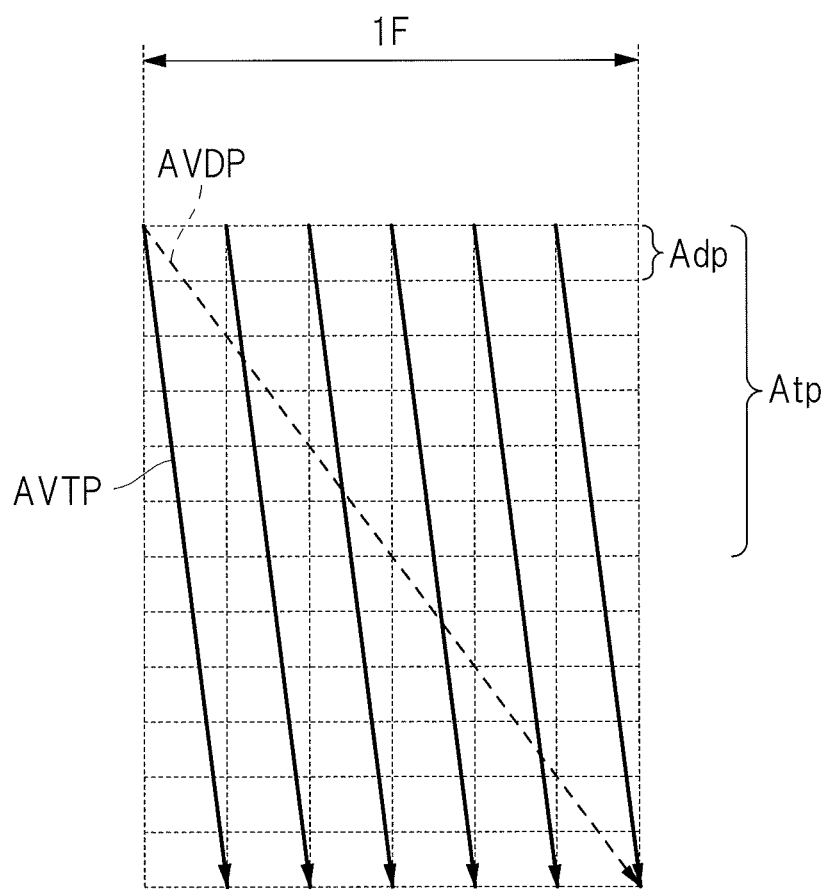
FIG. 12 is a diagram schematically showing an operation during one frame period of the display apparatus.

FIG. 11 and FIG. 12 are diagrams schematically showing operations in one frame period of the display apparatus. Each lateral direction of FIG. 11 and FIG. 12 represents time, and each longitudinal direction of FIG. 11 and FIG. 12 represents an aligning direction of the partial display regions Adp and the partial detection regions Atp. FIG. 12 is a diagram for use in comparison with a modified example of a driving method explained by using FIG. 17 to be described later, and this view is obtained by compressing FIG. 11 in the lateral direction. Note that FIG. 11 and FIG. 12 show the overall display driving process for the entire surface of the display region Ad (see FIG. 5) as a display driving process AVDP. Moreover, FIG. 11 and FIG. 12 show the overall detection driving process for the entire surface of the touch detection region At (see FIG. 5) as a detection driving process AVTP.

Figure 13A:
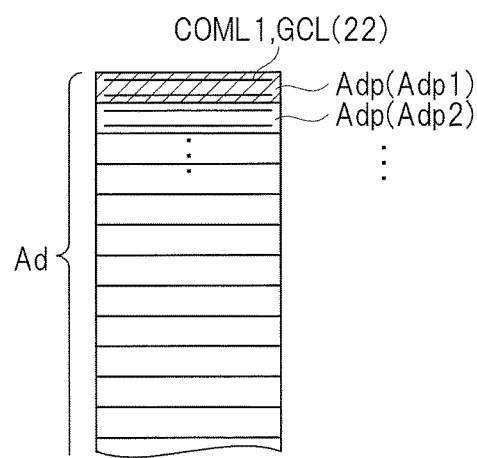
FIG. 13A is a diagram schematically showing a partial display region successively selected during each of a plurality of display operating periods.
Figure 13B:
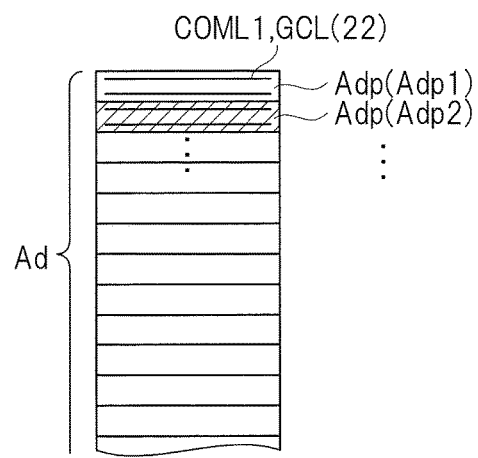
FIG. 13B is a diagram schematically showing a partial display region successively selected during each of a plurality of display operating periods.

FIGS. 13A and 13B are diagrams schematically showing partial display regions that are successively selected in each of a plurality of display operating periods. FIGS. 13A and 13B, FIG. 13A shows a state in which the first display block, that is, a partial display region Adp1 is selected, and FIG. 13B shows a state in which the second display block, that is, a partial display region Adp2 is selected.

Figure 14A:
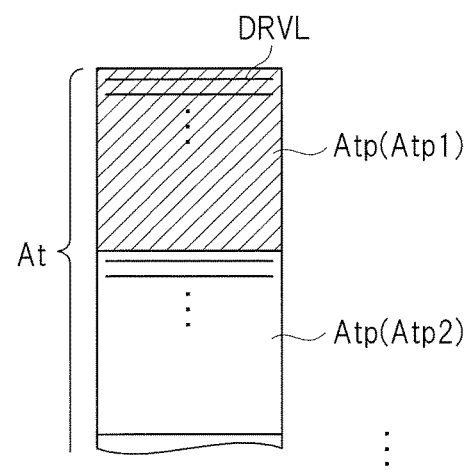
FIG. 14A is a diagram schematically showing a partial detection regions successively selected during each of a plurality of touch detection operating periods.
Figure 14B:
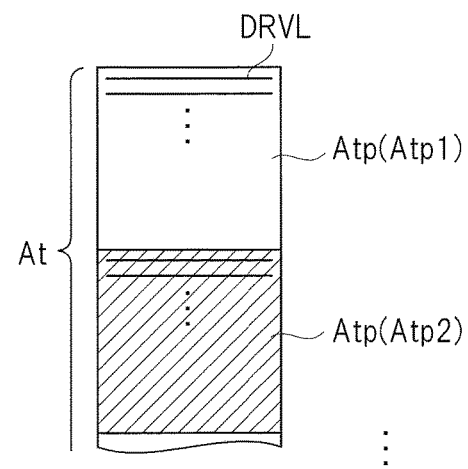
FIG. 14B is a diagram schematically showing a partial detection regions successively selected during each of a plurality of touch detection operating periods.

FIGS. 14A and 14B are diagrams schematically showing partial detection regions that are successively selected in each of a plurality of detection operation periods. In FIGS. 14A and 14B, FIG. 14A shows a state in which the first detection block, that is, a partial detection region Atp1 is selected, and FIG. 14B shows a state in which the second detection block, that is, a partial detection region Atp2 is selected.

In the example shown in FIG. 11, for convenience of explanation, the number of the partial display regions Adp is set to twelve, and the number of the partial detection regions Atp is set to two. However, the numbers are not limited to the above-described numbers as long as the number of the partial detection regions Atp is smaller than the number of the partial display regions Adp. Therefore, as shown in, for example, FIG. 13, the number of the partial display regions Adp can be set to a larger number than twelve, and the number of the partial detection regions Atp can be set to a number is larger than two but smaller than the number of the partial display regions Adp.

FIGS. 15A, 15B and 15C are timing waveform diagrams showing various signals during the touch detection operating period. FIG. 15A shows a waveform of the touch detection driving signal Vcomt, FIG. 15B shows a waveform of the detection signal Vdet, and FIG. 15C shows a waveform of an active shield driving signal Vas to be explained in the second embodiment.

Figure 16:
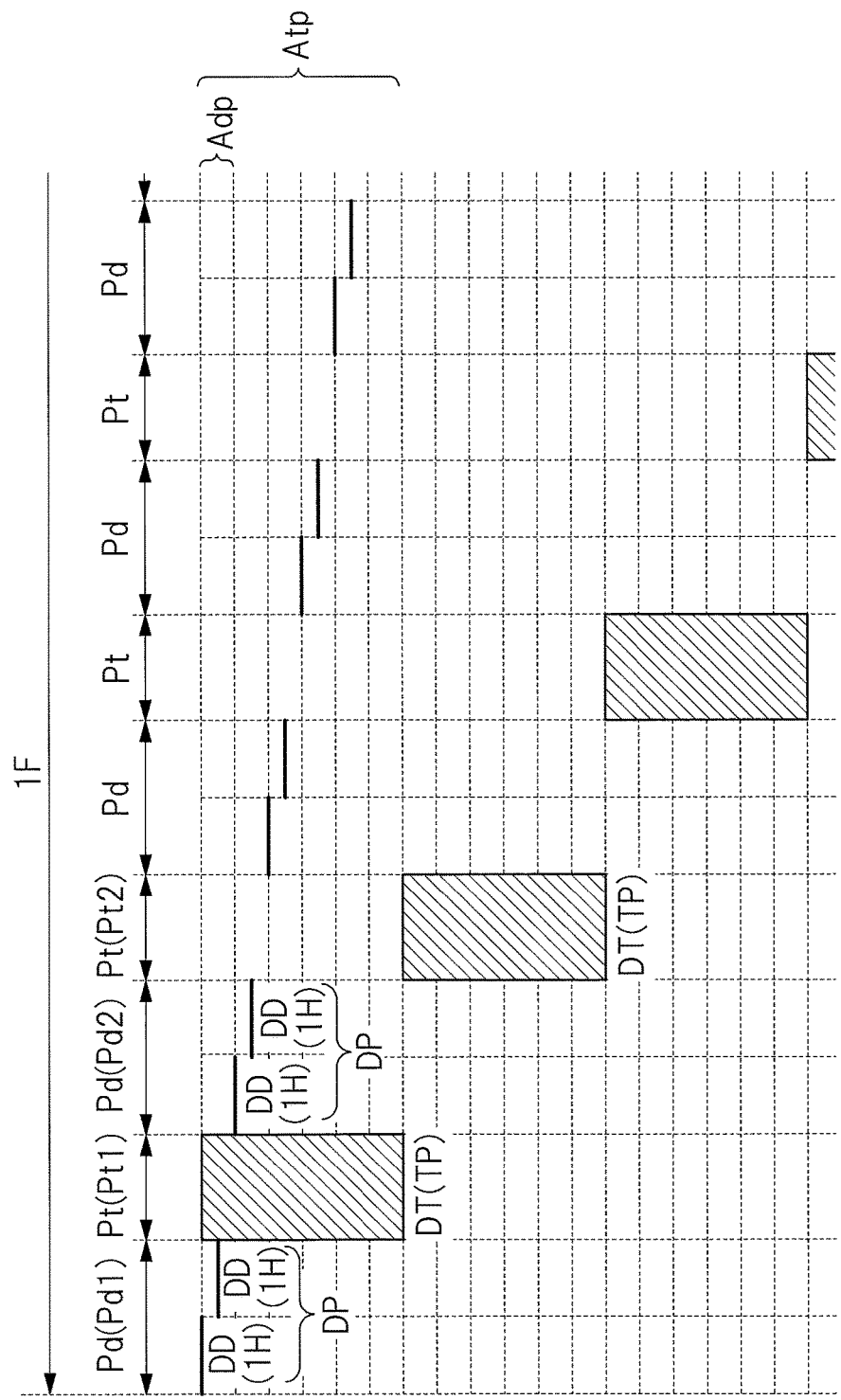
FIG. 16 is a diagram schematically showing an example of operations during a plurality of display operating periods and a plurality of touch detection operating periods included in one frame period of the display apparatus.

FIG. 16 is a diagram schematically showing one example of operations during a plurality of display operating periods and a plurality of touch detection operating periods contained in one frame period. FIG. 16 is a diagram showing an example similar to the example shown in FIG. 11 so as to partially enlarge the example. As described above, for convenience of explanation, the example shown in FIG. 11 has been described so that the number of the partial display regions Adp is set to twelve and the number of the partial detection regions Atp is set to two. On the other hand, FIG. 16 shows partially an example in which the number of the partial display regions Adp is set to at least 19 or larger and the number of the partial detection regions Atp is set to at least four or larger.

Note that the following is an explanation in a case in which the display driving signal Vcomd is supplied to the plurality of the driving electrodes COML1 among the plurality of the driving electrodes COML1 and the plurality of the driving electrodes COML2 during the display operating period Pd. However, even in a case in which the display driving signal Vcomd is supplied to the plurality of the driving electrodes COML1 and the plurality of the driving electrodes COML2 during the display operating period Pd, it is only required to supply the display driving signal Vcomd to all the driving electrodes COML2 in, for example, each of the display operating periods Pd, and the other points can be set to the same as those in the following case.

Note that the display driving signal Vcomd may be always supplied to all the plurality of the driving electrodes COML1 during the display operating period Pd. Even in such a case, during the display operating period Pd, the display driving signal Vcomd is supplied to the driving electrodes COML1 disposed on at least the selected partial display regions Adp.

As shown in FIG. 11, one frame period 1F includes a plurality of display operating periods Pd and a plurality of touch detection operating periods Pt that are repeated alternately.

Moreover, as shown in FIG. 13, the display region Ad is divided into a plurality of partial display regions Adp. That is, the display region Ad includes the plurality of the partial display regions Adp. Moreover, in each of the plurality of the partial display regions Adp, any one or more of the plurality of the driving electrodes COML1 is disposed. Furthermore, any one or more of the plurality of the scanning lines GCL is disposed in each of the plurality of the partial display regions Adp, and a pixel electrode 22 of the plurality of the pixel electrodes 22 which is connected to the scanning line GCL disposed in the partial display region Adp through the TFT element Tr (see FIG. 9) is disposed.

Moreover, as shown in FIG. 14, the touch detection region At is divided into a plurality of partial detection regions Atp. That is, the touch detection region At includes the plurality of the partial detection regions Atp. Furthermore, in each of the plurality of the partial detection regions Atp, any one or more of the plurality of the driving electrodes DRVL is disposed.

As shown in FIG. 11, FIG. 13A and FIG. 16, the first display driving process DP is performed during an initial section of the one frame period 1F, that is, a display operating period Pd1 which is the first display operating period Pd. In this first display driving process DP, the driving electrode driver 14 supplies the display driving signal Vcomd (see FIG. 1) to the plurality of the driving electrodes COML1 disposed on the initial, that is, first partial display region Adp1 among the plurality of the partial display regions Adp included in the display region Ad.

In the first display driving process DP, the gate driver 12 first supplies the scanning signal Vscan (see FIG. 1) to a scanning line GCL of a sub-pixel SPix on the first line included in the first partial display region Adp1, and the source driver 13 supplies the pixel signal Vpix (see FIG. 1) to each of the signal lines SGL. Thus, a displaying process is performed on the sub-pixels SPix on the first line as a driving process DD in one horizontal period 1H.

Next, the gate driver 12 supplies the scanning signal Vscan to a scanning line GCL of a sub-pixel SPix on the second line included in the first partial display region Adp1, and the source driver 13 supplies the pixel signal Vpix to each of the signal lines SGL. Thus, a displaying process is performed on the sub-pixel SPix on the second line as a driving process DD in one horizontal period 1H.

Thereafter, the scanning signal Vscan is supplied to a scanning line GCL of a sub-pixel SPix on each line, so that the operation of supplying the pixel signal Vpix to each of the signal lines SGL is repeated. The first display driving process DP is performed as described above to form an electric field between each of the plurality of the driving electrodes COML1 and each of the plurality of the pixel electrodes 22 disposed in the partial display region Adp1 when seen in a plan view, so that an image is displayed on the partial display region Adp1.

In the example shown in FIG. 16, note that the first display driving process DP includes two driving processes DD in the one horizontal period 1H.

Next, as shown in FIG. 11, FIG. 14A and FIG. 16, the first detection driving process TP is performed during an initial section of the one frame period 1F, that is, a touch detection operation period Pt1 which is the first touch detection operation period Pt. In the first detection driving process TP, the first detection driving process TP is performed so as to detect an electrostatic capacitance generated between each of the plurality of the detection electrodes TDL and each of the plurality of the driving electrodes DRVL disposed on the initial, that is, first partial detection region Atp1 among the plurality of the partial detection regions Atp included in the touch detection region At.

In the first detection driving process TP, the driving electrode driver 14 supplies the touch detection driving signal Vcomt shown in FIG. 15A to each of the plurality of the driving electrodes DRVL included in the partial detection region Atp. The touch detection driving signal Vcomt supplied to each of the plurality of the driving electrodes DRVL is transmitted to each of the plurality of the detection electrodes TDL through the electrostatic capacitance, and a detection signal Vdet shown in FIG. 15B is generated. In the A/D converting unit 43, at a sampling timing is in synchronization with the touch detection driving signal Vcomt, A/D conversion is performed for the output signal of the touch sensing signal amplifying unit 42 to which the detection signal Vdet has been inputted. Thus, the touch detection unit 40 performs the first detection driving process TP for detecting an electrostatic capacitance generated between each of the plurality of the driving electrodes DRVL disposed on the partial detection region Atp1 and each of the plurality of the detection electrodes TDL.

Note that, in the example shown in FIG. 16, the touch detection driving signal Vcomt is simultaneously supplied to each of the plurality of the driving electrodes DRVL disposed on the partial detection region Atp1, and therefore, the first detection driving process TP includes one driving process DT.

Next, as shown in FIG. 11, FIG. 13B and FIG. 16, the second display driving process DP is performed during a display operating period Pd2 which is the second display operating period Pd of the one frame period 1F. In the second display driving process DP, the driving electrode driver 14 supplies the display driving signal Vcomd to the plurality of the driving electrodes COML1 disposed on the second partial display region Adp2 among the plurality of the partial display regions Adp included in the display region Ad. The specific second display driving process DP can be set to the same process as the above-described first display driving process DP. The second display driving process DP is performed as described above to form an electric field between each of the plurality of the pixel electrodes 22 and each of the plurality of the driving electrodes COML1 that are disposed on the partial display region Adp2 when seen in a plan view, so that an image is displayed in the partial display region Adp2.

Next, as shown in FIG. 11, FIG. 14B and FIG. 16, the second detection driving process TP is performed during a touch detection operation period Pt2 which is the second touch detection operation period Pt of the one frame period 1F. In the second detection driving process TP, the driving electrode driver 14 detects an electrostatic capacitance generated between each of the plurality of the detection electrodes TDL and each of the plurality of the driving electrodes DRVL disposed on the second partial detection region Atp2 among the plurality of the partial detection regions Atp included in the touch detection region At. The specific second detection driving process TP can be set to the same process as the above-described first detection driving process TP.

In this manner, the display driving process DP and the detection driving process TP are repeated alternately. Moreover, in the last display operating period Pd of the one frame period 1F, an electric field is formed between each of the plurality of the pixel electrodes 22 and each of the plurality of the driving electrodes COML1 disposed on the last partial display region Adp among the plurality of the partial display regions Adp included in the display region Ad, so that an image is displayed on the last partial display region Adp. Thus, the display driving process DP is performed one time for each of the plurality of the partial display regions Adp included in the display region Ad.

Thereafter, the scan driving unit 50 (see FIG. 1) repeats the display driving process DP and the detection driving process TP alternately while successively cyclically changing the partial display region Adp selected from the plurality of the partial display regions Adp, and while successively cyclically changing the partial detection region Atp selected from the plurality of the partial detection regions Atp.

In the present first embodiment, the display region Ad is divided into a plural number "m" of partial display regions Adp, for example, twelve partial display regions Adp, and the touch detection region At is divided into a plural number "n" of partial detection regions Atp, for example, two partial detection regions Atp, the number "n" being smaller than the number "m". Moreover, by alternately repeating the display driving process DP and the detection driving process TP, the touch detection unit 40 detects the input position in the touch detection region At while the electrophoresis display device 20 displays an image on the display region Ad. Therefore, the detection driving process TP is performed one time or more even in each of the partial detection regions Atp among the "n" partial detection regions Atp included in the touch detection region At while the display driving process DP is performed one time for each of the "m" partial display regions Adp included in the display region Ad. That is, while the display driving process AVDP is performed one time, the detection driving process AVTP is performed one time or more.

More preferably, the number m of divisions of the display region Ad into the partial display regions Adp is set to twice or larger than the number n of divisions of the touch detection region At into the partial detection regions Atp. In such a case, while the display driving process DP is performed one time for each of the m partial display regions Adp included in the display region Ad, the detection driving process TP is performed two times or more for each of the partial detection regions Atp among the n partial detection regions Atp included in the touch detection region At. That is, while the display driving process AVDP is performed one time, the detection driving process AVTP is performed two times or more.

A period of time required for rewriting the display of the display apparatus provided with the electrophoresis layer, that is, a period of time required for transferring the electrophoresis particles from one side to the other side in a microcapsule, is longer than, for example, a period of time required for rewriting the display of the liquid crystal display apparatus, that is, a period of time required for rotating the liquid crystal molecule. That is, a speed of rewriting the display of the display apparatus provided with the electrophoresis layer is slower than, for example, a speed for rewriting the display of the liquid crystal display apparatus.

For example, the speed, that is, a frequency for rewriting the display of the liquid crystal display apparatus is about 60 Hz. Moreover, the one frame period that is a cycle in which the display of the liquid crystal display apparatus is rewritten, that is, a period of time required for performing the display driving process one time in each of the plurality of the partial display regions included in the display region in the liquid crystal display apparatus is about $1/60$ seconds, that is, about 16.7 msec.

On the other hand, the speed, that is, a frequency for rewriting the display of the display apparatus provided with the electrophoresis layer is about 20 Hz. Moreover, the one frame period 1F that is a cycle in which the display of the display apparatus provided with the electrophoresis layer is rewritten, that is, a period of time required for performing the display driving process DP one time in each of the plurality of the partial display regions Adp included in the display region Ad in the display apparatus provided with the electrophoresis layer is about $1/20$ seconds, that is, about 50 msec.

However, from the viewpoint of ensuring a response performance of the touch detection, it is desired that the display apparatus provided with the electrophoresis layer and the liquid display apparatus are substantially the same as each other in the period of time required for performing the detection driving process one time in each of the plurality of the partial display regions included in the touch detection region At. For this reason, in the display apparatus provided with the electrophoresis layer, the speed, that is, the frequency required for repeating the touch detection is set to about 120 Hz as the same as that of the display apparatus including the liquid crystal display apparatus. Moreover, in the display apparatus provided with the electrophoresis layer, the period of time required for performing the detection driving process TP one time in each of the plurality of the partial detection regions Atp included in the touch detection region At is set to $1/120$ seconds, that is, about 8.3 msec.

Therefore, a ratio of a frequency at for repeating the touch detection with respect to a frequency for rewriting the display in the display apparatus provided with the electrophoresis layer becomes extremely larger than a ratio of a frequency for repeating the touch detection with respect to a frequency for rewriting the display in the liquid crystal display apparatus. In other words, a ratio of a cycle for rewriting the display with respect to a cycle for repeating the touch detection in the display apparatus provided with the electrophoresis layer becomes extremely larger than a ratio of a cycle for rewriting the display with respect to a cycle for repeating the touch detection in the liquid crystal apparatus.

Figure 17:
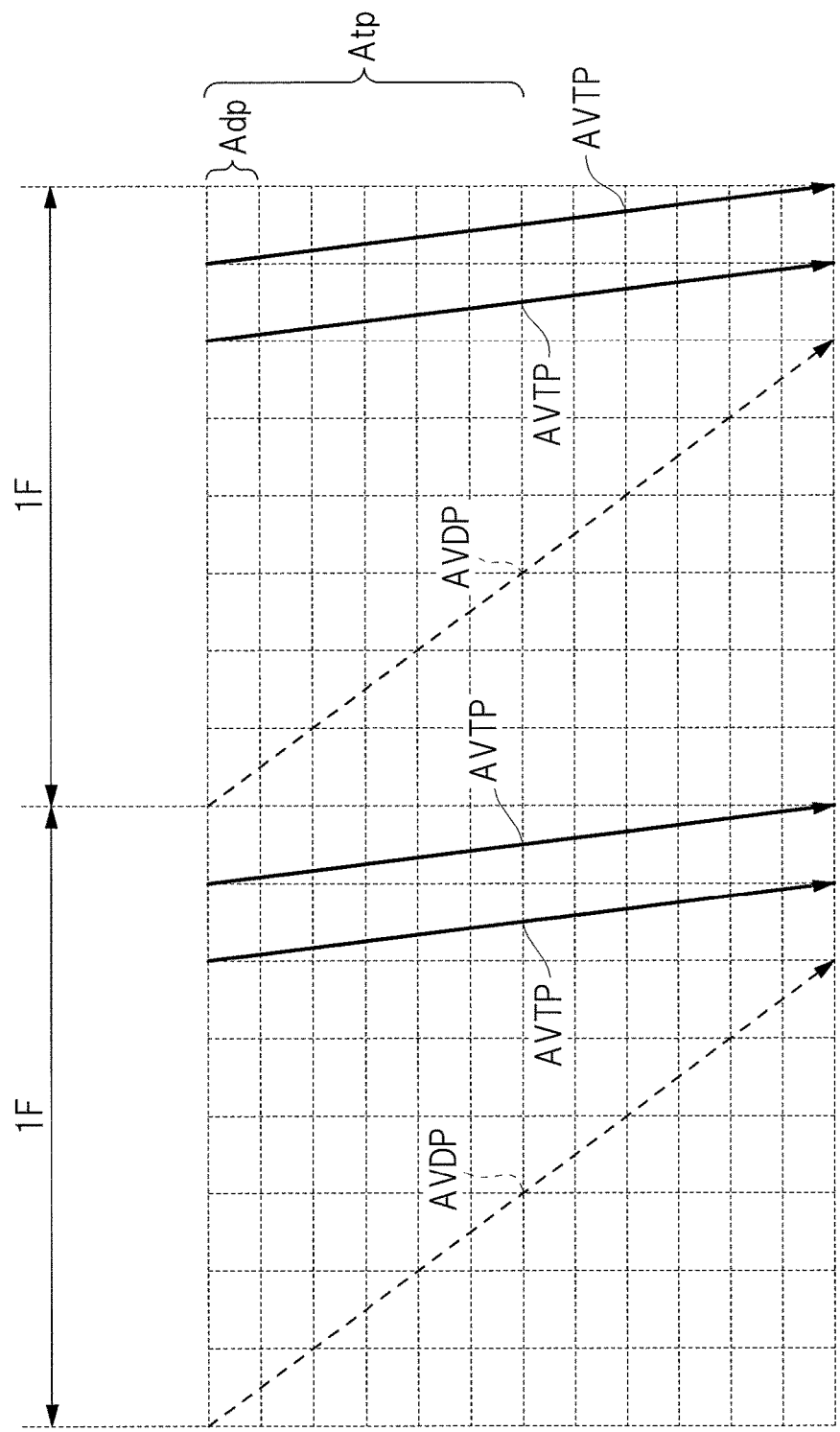
FIG. 17 is a diagram schematically showing operations during one frame period of a display apparatus in a comparative example.

FIG. 17 is a diagram schematically showing operations in one frame period of a display apparatus according to a comparative example.

In the comparative example shown in FIG. 17, during a period for performing the display driving process AVDP, the detection driving process AVTP is not performed. That is, during the period in which the display driving process DP (see FIG. 11) is performed one time in each of the plurality of the partial display regions Adp included in the display region Ad, the detection driving process TP (see FIG. 11) is not performed in each of the partial detection regions Atp of the plurality of the partial detection regions Atp included in the touch detection region At.

For this reason, since no touch detection data is acquired during the period in which the display driving process DP is performed one time in each of the plurality of the partial display regions Adp included in the display region Ad, it is difficult to improve the response performance of the touch detection. As described above, in the display apparatus provided with the electrophoresis layer that has a slower speed for rewriting the display and a larger ratio of the frequency for repeating the touch detection with respect to the frequency for rewriting the display than the liquid crystal display apparatus, it becomes more difficult to improve the response performance of the touch detection than the liquid crystal display apparatus.

Moreover, as shown in FIG. 17, a case in which the detection driving process AVTP is executed two times before the start of the second display driving process AVDP after the first display driving process AVDP will be considered. That is, a case in which the detection driving process TP (see FIG. 11) is performed two times in each of the partial detection regions Atp of the plurality of the partial detection regions Atp included in the touch detection region At after the display driving process DP (see FIG. 11) in the last partial display region Adp of the plurality of the partial display regions Adp included in the display region Ad but before the start of the display driving process DP again in the first partial display region Adp will be considered.

In this case, since timings at which the detection process is performed in a certain partial detection region Atp are not arranged with equal intervals, it becomes difficult to improve the response performance of the touch detection. As described above, the display apparatus provided with the electrophoresis layer that has a larger ratio of the frequency for repeating the touch detection with respect to the frequency for rewriting the display is more difficult to improve the response performance of the touch detection than the liquid crystal display apparatus.

On the other hand, in the present first embodiment, the detection driving process AVTP is performed one time or more while the display driving process AVDP is performed one time. That is, while the display process is performed one time in each of the plurality of the partial display regions Adp included in the display region Ad, the detection process is performed one time or more in each of the partial detection regions Atp of the plurality of the partial detection regions Atp included in the touch detection region At.

Thus, since the touch detection data can also be acquired during the period in which the display driving process DP is performed one time in each of the plurality of the partial display regions Adp included in the display region Ad, the response performance of the touch detection can be improved. Moreover, since timings at which the detection process is performed in a certain partial detection region Atp are arranged with equal intervals, the response performance of the touch detection can be improved. For this reason, even in the display apparatus including the electrophoresis display device 20 that has a larger ratio of the frequency for repeating the touch detection with respect to the frequency for rewriting the display, the response performance of the touch detection can be improved as similar to the liquid crystal display apparatus that has a smaller ratio of the frequency for repeating the touch detection with respect to the frequency for rewriting the display.

The display apparatus 1 including the electrophoresis display device 20 can maintain the displayed image even during a period in which neither the display driving signal Vcomd is supplied to the driving electrodes COML1 nor the pixel signal Vpix is supplied to the pixel electrodes 22, that is, during the touch detection operation period Pt. Therefore, in the present first embodiment, the displayed image can be maintained while the ratio of the frequency for repeating the touch detection with respect to the frequency for rewriting the display is larger than that of the liquid display device.

Figure 18:
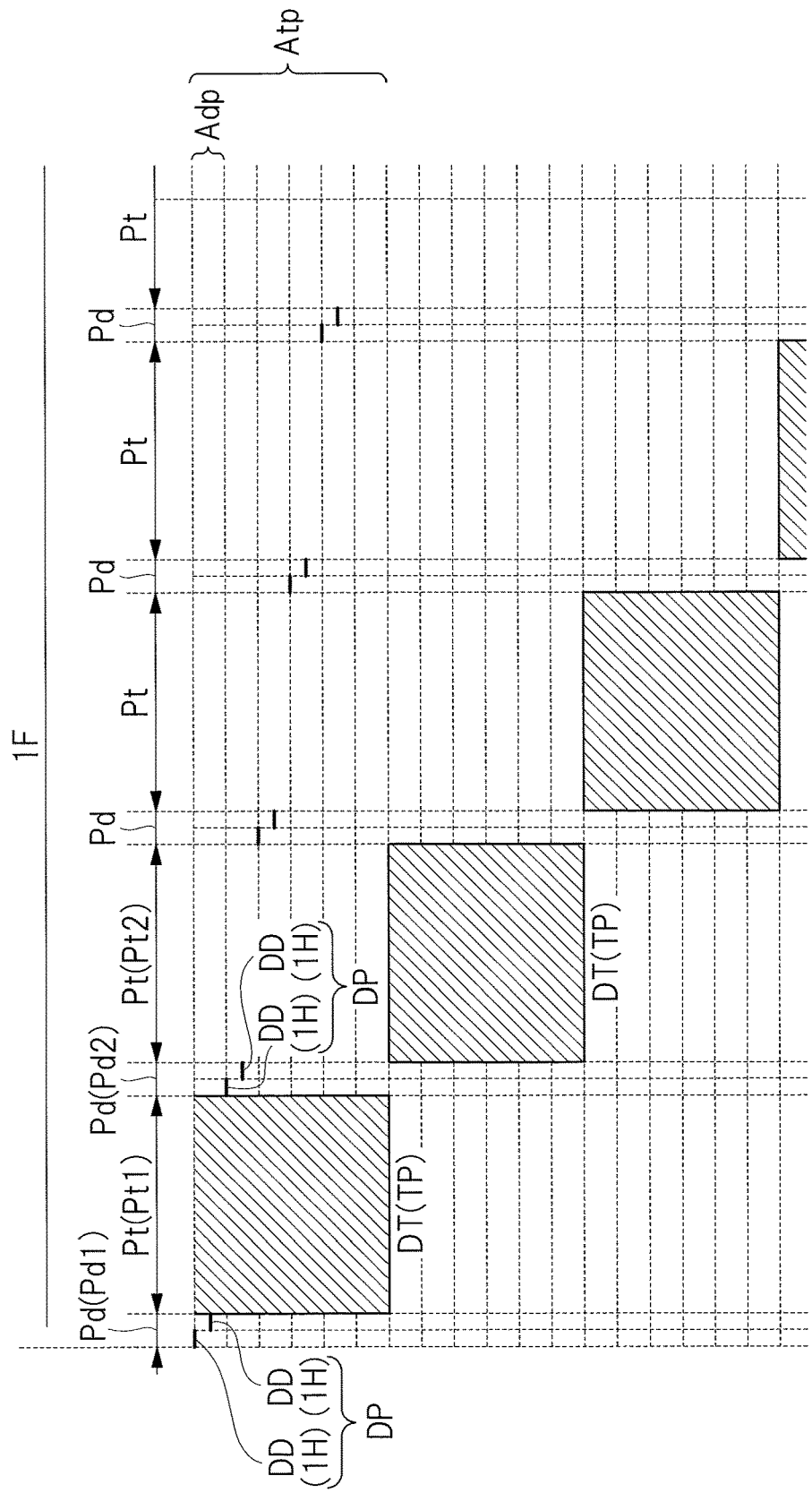
FIG. 18 is a diagram schematically showing another example of operations during a plurality of display operating periods and a plurality of touch detection operating periods included in one frame period of the display apparatus.
Figure 19:
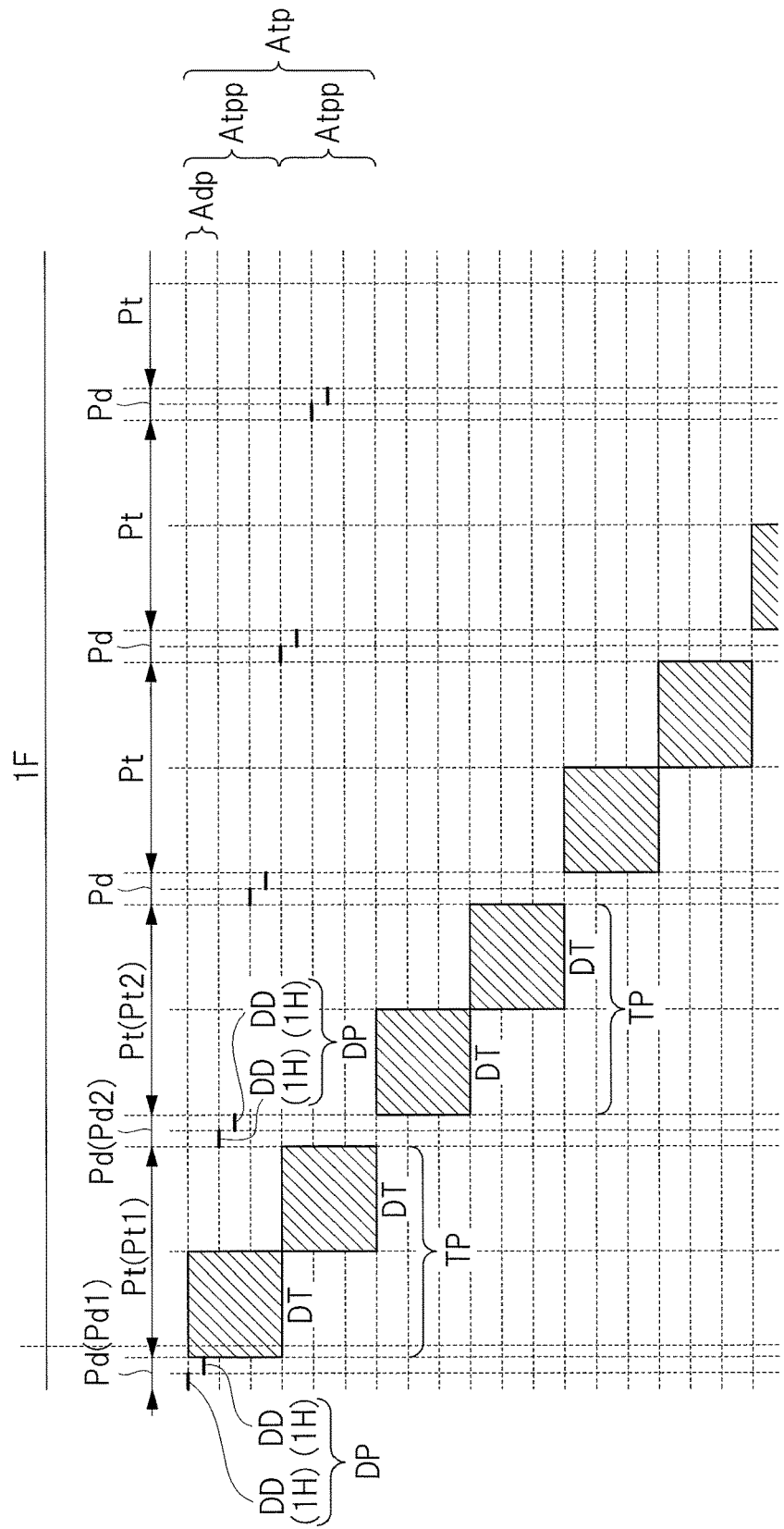
FIG. 19 is a diagram schematically showing still another example of operations during the plurality of display operating periods and the plurality of touch detection operating periods included in one frame period of the display apparatus.

FIGS. 18 and 19 are diagrams schematically showing another example of operations in the plurality of the display operating periods and the plurality of the touch detection operating periods included in the one frame period of the display apparatus. As similar to FIG. 16, FIG. 18 and FIG. 19 partially show an example in which the number of the partial display regions Adp is set to at least 19 or larger, and the number of the partial detection regions Atp is set to at least 4 or larger.

In the example shown in FIG. 16, the length of one touch detection operation period Pt, that is, a period of time required for performing one detection driving process TP, is shorter than the length of one display operating period Pd, that is, a period of time required for performing one display driving process DP. On the other hand, in the example shown in FIG. 18, the length of one touch detection operation period Pt, that is, a period of time required for performing one detection driving process TP, is longer than the length of one display operating period Pd, that is, a period of time required for performing one display driving process DP. That is, in the example shown in FIG. 18, the length of one touch detection operation period Pt is also made long while by shortening the length of one horizontal period 1H so that the length of one horizontal period 1H is substantially equal to the length of one horizontal period 1H in a liquid crystal device which performs the rewriting at a frequency of, for example, 60 Hz.

Thus, since the number of samplings for the touch detection in the detection driving process TP can be increased, a ratio of signal intensity with respect to noise intensity, that is, an SN ratio can be increased. Alternatively, since one sampling time for the touch detection in the detection driving process TP can be made longer, the area of one partial detection region Atp can be easily increased, so that an area of the display apparatus can be easily increased.

Moreover, in an example shown in FIG. 19, one partial detection region Atp is further divided into a plurality of partial detection regions Atpp, and the detection processes are successively performed while the length of one touch detection operation period Pt, that is, a period of time required for performing one detection process is made longer than the length of one display operating period Pd, that is, a period of time required for performing one display process as shown in FIG. 18.

That is, in the example of FIG. 19, each of the plurality of the partial detection regions Atp is divided into a plurality of partial detection regions Atpp. In other words, each of the plurality of the partial detection regions Atp includes the plurality of the partial detection regions Atpp. At this time, on each of the plurality of the partial detection regions Atpp, any one or more one of the plurality of the driving electrodes COML1 disposed on each of the plurality of the partial detection regions Atp is disposed. Moreover, the scan driving unit 50 performs a driving process DT for supplying the touch detection driving signal Vcomt to the plurality of the driving electrodes COML1 disposed on one partial detection region Atpp successively selected from the plurality of the partial detection regions Atpp, among the plurality of the driving electrodes COML1 disposed on the selected partial detection region Atp in one detection driving process TP, the driving process DT being repeated the number of times which is equal to the number of divided pieces in dividing the partial detection region Atp into the partial detection regions Atpp. Thus, the positional accuracy of the touch detection can be improved.

<Driving Method with Gray Level Control>

A driving method with gray level control in the display apparatus 1 according to the first embodiment will be described.

Figure 22:
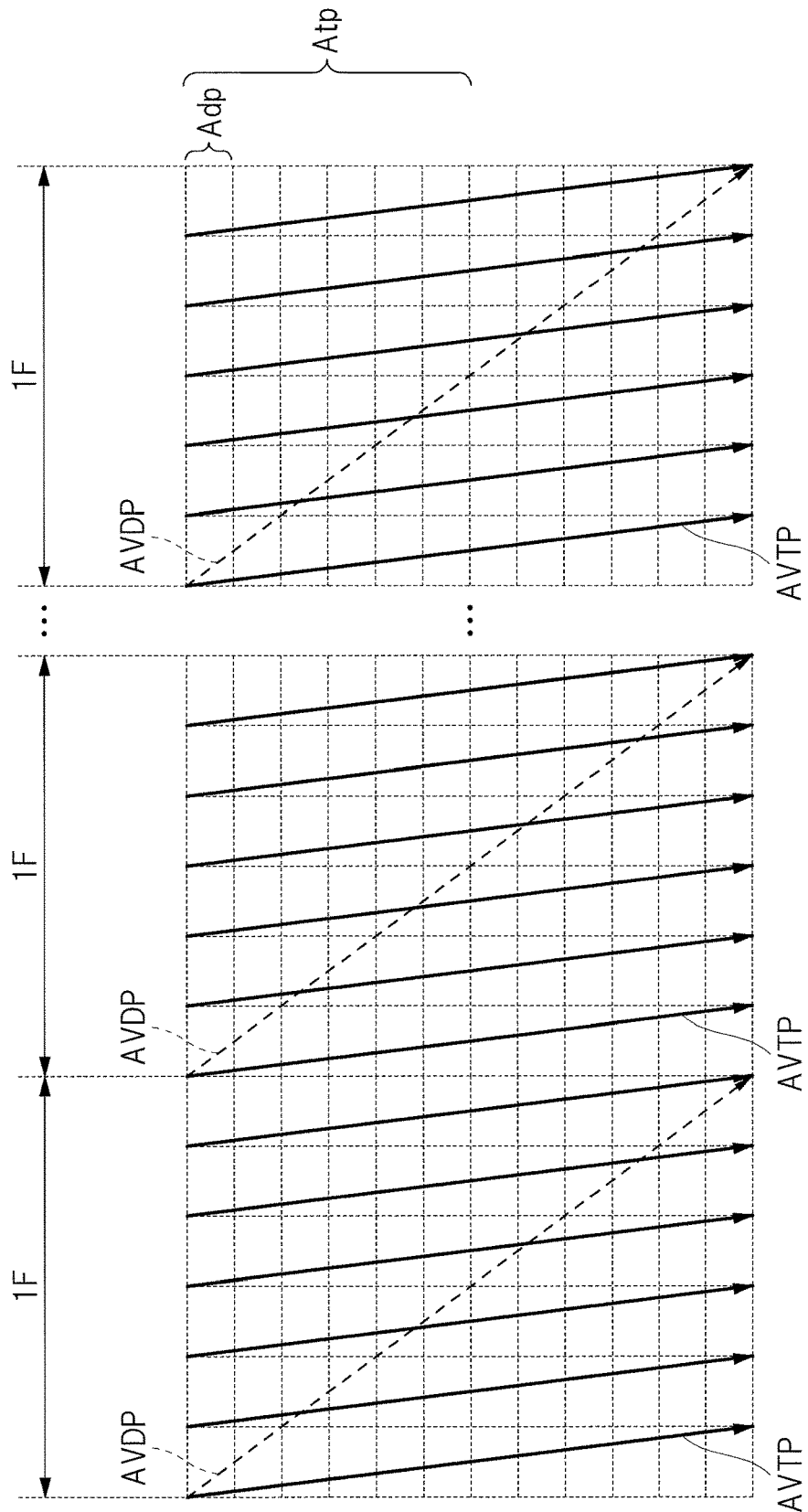
FIG. 22 is a diagram schematically showing an example of operations during a plurality of display operating periods and a plurality of touch detection operating periods included in a frame period when a gray level of each pixel is controlled.

FIG. 20 is a timing waveform diagram showing gray levels and pixel signals over a plurality of the one frame periods in controlling the gray level of each pixel. FIGS. 21A to 21C are diagrams schematically showing examples of control of the gray level in four sub-pixels adjacent to one another in controlling the gray level of each pixel. FIG. 21A shows a gray level in each sub-pixel obtained before the rewriting of a certain image, FIG. 21B shows a pattern of a pulse sequence to be used in rewriting the image, and FIG. 21C shows the gray level in each sub-pixel obtained after the rewriting of the image. FIG. 22 is a diagram schematically showing one example of operations during a plurality of display operating periods and a plurality of detection operation periods included in the one frame period in controlling the gray level of each pixel.

On each of the plurality of the partial display regions Adp, any one or more of the plurality of the pixel electrodes 22 is disposed. At this time, as shown in FIG. 20, the source driver 13 included in the scan driving unit 50 supplies a pixel signal Vpix having a voltage V and formed of a pulse sequence to the pixel electrodes 22 formed inside each sub-pixel SPix, so that the gray level in each sub-pixel SPix can be controlled. The pulse sequence includes a plurality of pulses each having a positive pulse height (voltage+Vs) or a negative pulse height (voltage−Vs). A period of time while a certain-order pulse of the plurality of the pulses is applied one time to each of a plural number of the pixel electrodes 22 disposed on each of the plurality of the partial display regions Adp included in the display region Ad among another plural number of the pixel electrodes 22 corresponds to the one frame period 1F.

Here, as shown in FIG. 21, an example in which the gray level that can be set in each of the sub-pixels is made of any one or more of levels WW, WB, BW and BB, that is, in which the total number of the gray levels is four will be exemplified, and the number of patterns of the pulse sequence for use in rewriting an image in a case of this example will be described. The levels WW, WB, BW and BB are four gray levels that are set so as to successively come close from white to black between the level WW close to white color to the level BB close to black color. FIG. 20 exemplifies a configuration in which an image is rewritten so as to change the gray level Lv in a certain sub-pixel from the level WW to the level WB. Moreover, the pulse sequence shown in FIG. 20 corresponds to a pattern wwPwb to be described later with reference to FIG. 21.

When the total number of the gray levels is four, as shown in FIG. 21A, the gray level of a certain sub-pixel obtained before the rewriting of the image is any one the four gray levels of level WW, WB, BW and BB. Moreover, as shown in FIG. 21C, the gray level of the sub-pixel obtained after the rewriting of the image is set to any one of the four gray levels of WW, WB, BW and BB.

First, a case in which the gray level in a certain sub-pixel obtained before the rewriting of the image is set to the level WW will be considered. In this case, as shown in FIG. 21B, when the gray level in the sub-pixel is not changed from the level WW before and after the rewriting process, a pulse sequence formed of a pattern wwPww is utilized. Alternatively, when the gray level in the sub-pixel is changed from the level WW to the level WB before and after the rewriting process, a pulse sequence formed of a pattern wwPwb is utilized. On the other hand, when the gray level in the sub-pixel is changed from the level WW to the level BW before and after the rewriting process, a pulse sequence formed of a pattern wwPbw is utilized. Alternatively, when the gray level in the sub-pixel is changed from the level WW to the level BB before and after the rewriting process, a pulse sequence formed of a pattern wwPbb is utilized.

Therefore, when an image is rewritten so as to change the gray level of a certain sub-pixel from the level WW to any one of the four gray levels of WW, WB, BW and BB before and after the rewriting process, any one of the four patterns formed of the patterns wwPww, wwPwb, wwPbw and wwPbb are used as the pattern of the pulse sequence.

Similarly, even in the case of the gray level of a certain sub-pixel to be the level WB, BW or BB, when an image is rewritten so as to change the gray level from the gray level to any one of the four gray levels of WW, WB, BW and BB before and after the rewriting process, four pattern types are used as the pattern of the pulse sequence. Therefore, when the total number of the gray levels is four, the number of patterns of the pulse sequence to be used for rewriting the image is "4×4=16". In this case, patterns of 16 types can be set by combining four or more pulses, for example, five pulses as the plurality of pulses to form the pulse sequence.

In this case, as shown in FIG. 22, an image to be displayed on the display region Ad is rewritten by repeating a repeat process a plurality of times while changing the pixel signal Vpix, the repeat process performing the display process one time in each of the plurality of the partial display regions Adp while repeating the display driving process DP and the detection driving process TP alternately m times. Thus, the gray level of each pixel can be controlled to a plurality of gray levels.

Note that a degree of the control of the gray level has a temperature dependency sometimes depending on a type of the electrophoresis layer 5. At this time, in accordance with the use temperature of the display apparatus, it is desired to change the pulse sequence for controlling the gray level of each pixel into a plurality of gray levels. For this reason, more preferably, a temperature range in which the display apparatus is used is divided into a plurality of temperature ranges, and a pulse sequence that is optimized in order to control the gray level of each pixel into a plurality of gray levels is set in each temperature range of the plurality of the temperature ranges. Then, the temperature is measured by, for example, a temperature measuring unit provided in the display apparatus, and a pulse sequence which is set in accordance with the temperature range including the measured temperature is selected. Then, by using the selected pulse sequence, the gray level of each pixel is controlled to the plurality of the gray levels. Thus, even in a wide temperature range, change of the gray level of the pixel displayed in the display region due to change of the use temperature is prevented or suppressed.

<First Modified Example of Display Device Having Touch Detection Function>

Next, with reference to FIGS. 23 and 24, the first modified example of a display device having a touch detection function will be described. In the present first modified example, the driving electrodes COML1 and the driving electrodes COML2 are formed in different layers from each other.

Figure 23:
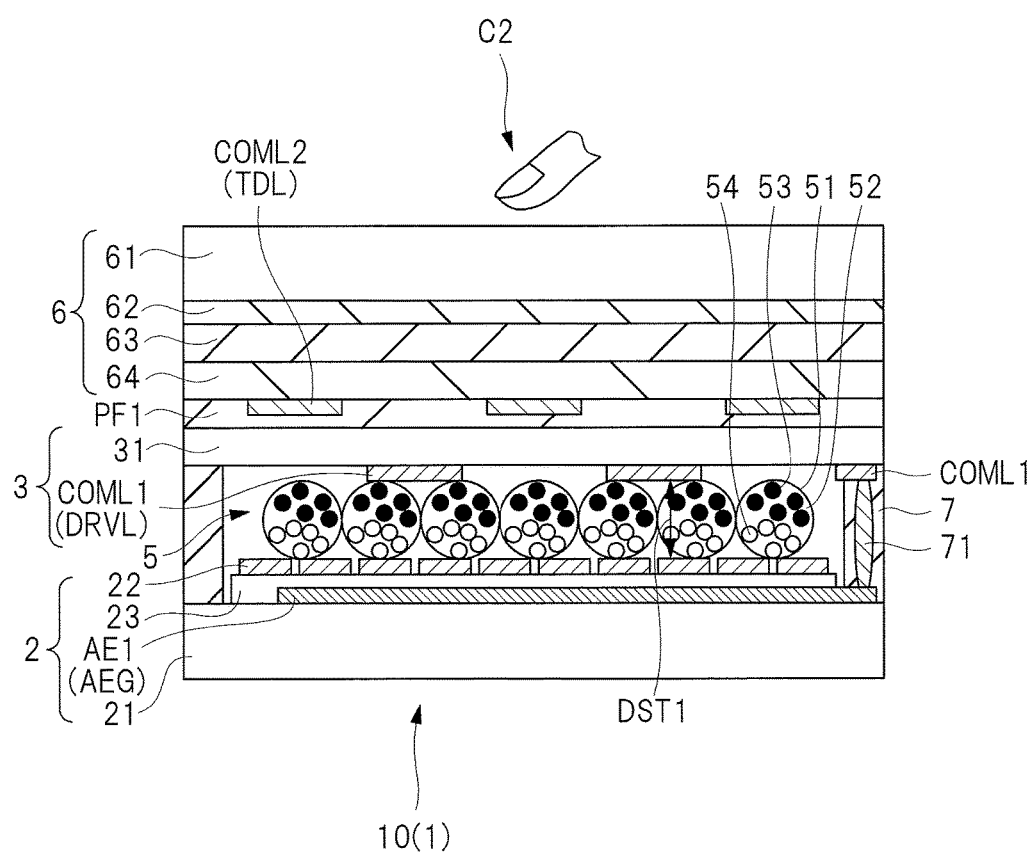
FIG. 23 is a cross-sectional view showing a display device with a touch detection function of a first modified example of the first embodiment.
Figure 24:
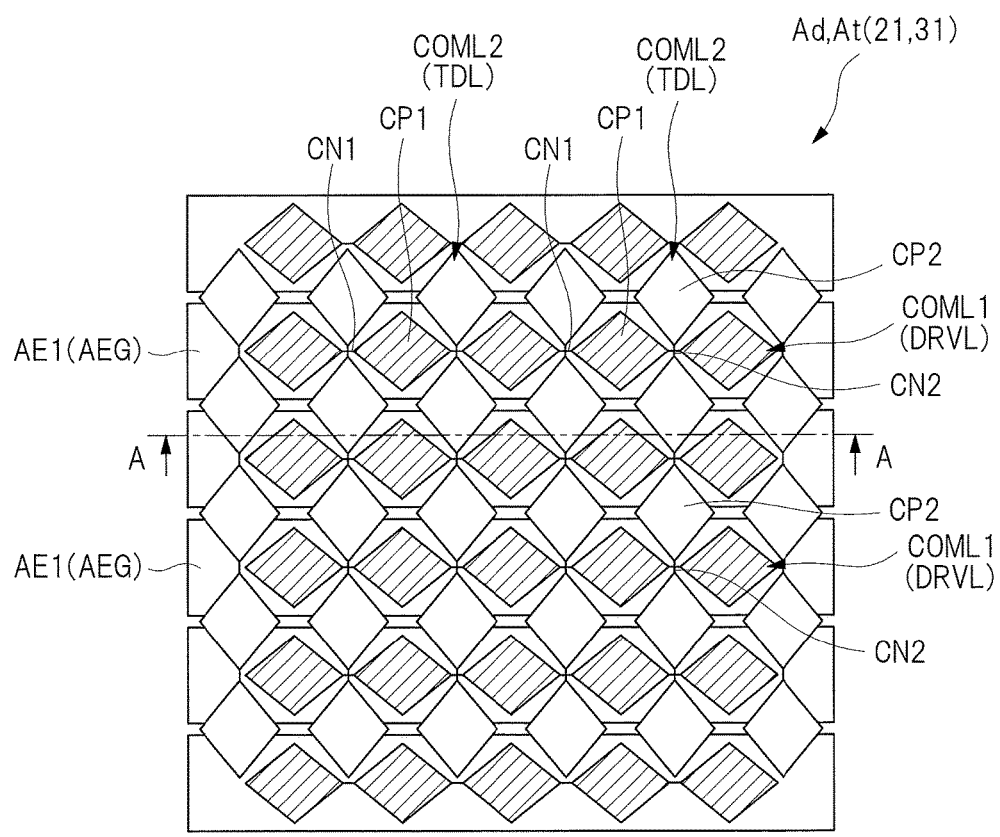
FIG. 24 is a plan view schematically showing configurations of a driving electrode and an auxiliary electrode in the first modified example of the first embodiment.

FIG. 23 is a cross-sectional view showing the display device with the touch detection function of the first modified example according to the first embodiment. FIG. 24 is a plan view schematically showing a configuration of driving electrodes and auxiliary electrodes in the first modified example according to the first embodiment. Moreover, FIG. 23 is a cross-sectional view taken along a line A-A of FIG. 24.

In the present first modified example, the facing substrate 3 has the substrate 31 and the plurality of the driving electrodes COML1. When seen in a plan view, the plurality of the driving electrodes COML1 are formed on the lower surface of the substrate 31 at the display region Ad or the touch detection region At. The plurality of the driving electrodes COML1 can be set as the same as the example shown in FIG. 6 and FIG. 8.

On the other hand, in the present first modified example, each of the plurality of the driving electrodes COML2 is formed on a layer different from that of the plurality of the driving electrodes COML1. In this manner, it is not required to form a connection portion CN2 of the driving electrodes COML2 on a layer different from that of the electrode portions CP2 in comparison with the example shown in FIG. 6 and FIG. 8, the driving electrodes COML2 can be formed easily.

Alternatively, the plurality of the driving electrodes COML2 may be formed on the upper surface of the substrate 31, or may be formed on a lower layer of a barrier film 64 formed on the lower surface of the substrate 61. In the example shown in FIG. 23, the plurality of the driving electrodes COML2 are formed on the lower surface of the barrier film 64, and a protective film PF1 is formed on the lower surface of the barrier film 64 so as to cover the plurality of the driving electrodes COML2. Moreover, the protective film PF1 formed on the lower surface of the barrier film 64 is made in contact with the upper surface of the substrate 31 of the facing substrate 3.

Note that it is only required to form the plurality of the driving electrodes COML1 and the plurality of the driving electrodes COML2 on different layers from each other. Therefore, both of the plurality of the driving electrodes COML1 and the plurality of the driving electrodes COML2 may be formed on the lower surface of the substrate 31. Alternatively, both of the plurality of the driving electrodes COML1 and the plurality of the driving electrodes COML2 may be formed on the upper surface of the substrate 31.

Each of the plurality of the driving electrodes COML2 is extended in the Y-axis direction and is also arranged in the X-axis direction when seen in a plan view. Each of the plurality of the driving electrodes COML2 includes a plurality of electrode portions CP2 and a plurality of connection portions CN2. In the present first modified example, as different from the example shown in FIG. 6 and FIG. 8, each of the plurality of the electrode portions CP2 and each of the plurality of the connection portions CN2 are formed on the lower surface of the barrier film 64, that is, on the upper surface of the substrate 31 at the display region Ad or the touch detection region At. The plurality of the electrode portions CP2 are aligned in the Y-axis direction when seen in a plan view. Moreover, the two electrode portions CP2 that are adjacent to each other in the Y-axis direction are electrically connected to each other by the connection portion CN2.

In the present first modified example, the plurality of the driving electrodes COML1 and the plurality of the driving electrodes COML2 are formed on layers different from each other. For this reason, the connection portions CN2 are formed on the same layer as the electrode portions CP2.

As described above, the thickness of the liquid crystal layer in the liquid crystal display device is set to, for example, about 3 μm. Moreover, the thickness of the electrophoresis layer 5 in the electrophoresis display device 20, that is, the distance DST1 between the lower surface of the driving electrode COML1 and the upper surface of the pixel electrode 22 is larger than the thickness of the liquid crystal layer in the liquid crystal display device, and set to, about 30 to 200 μm.

On the other hand, the thickness of the substrate 31 made of, for example, a resin, is set to, for example, 20 to 40 μm. For this reason, even when the plurality of the driving electrodes COML1 are formed on the lower surface of the substrate 31 and the plurality of the driving electrodes COML2 are formed on the upper surface of the substrate 31, the distance between the upper surface of the pixel electrode 22 and the lower surface of the driving electrode COML2 is not different so much from the distance between the upper surface of the pixel electrode 22 and the lower surface of the driving electrode COML1. Therefore, the same display driving process as that in the case when the plurality of the driving electrodes COML1 and the plurality of the driving electrodes COML2 are formed on the same layer can be performed by such adjustment that, for example, the display driving signal Vcomd to be supplied to each of the plurality of the driving electrodes COML2 is larger than the display driving signal Vcomd to be respectively supplied to the plurality of the driving electrodes COML1.

In the present first modified example, the plurality of the driving electrodes COML1 are operated as the driving electrodes for the electrophoresis display device, and also operated as the driving electrodes DRVL for the touch detection device. Moreover, the plurality of the driving electrodes COML2 are operated as the driving electrodes for the electrophoresis display device, and also operated as the detection electrodes TDL for the touch detection device.

Also in the present first modified example, a group of auxiliary electrodes AEG formed of a plurality of auxiliary electrodes AE1 may be formed as similar to the example shown in FIG. 6 and FIG. 8. Moreover, in performing the touch detection operation, a touch detection driving signal Vcomt formed of an alternate-current signal having the same phase as that of the alternate-current signal contained in the touch detection driving signal Vcomt supplied to the driving electrodes DRVL formed of the driving electrodes COML1 may be supplied to the auxiliary electrodes AE1. Thus, a parasitic capacitance generated between the driving electrodes DRVL and each of wirings included in the array substrate 2 can be eliminated, so that the sensitivity of the touch detection can be enhanced. However, the auxiliary electrodes AE1 may not be formed.

Other parts than that can be set as those of the example shown in FIG. 6 and FIG. 8.

<Second Modified Example of Display Device Having Touch Detection Function>

Next, with reference to FIGS. 25 and 26, the second modified example of a display device having a touch detection function will be described. In the present second modified example, the auxiliary electrodes AE1 are formed as the driving electrodes DRVL, and the driving electrodes COML1 are formed as the detection electrodes TDL. That is, also in the present second modified example, the group of the auxiliary electrodes AEG formed of the plurality of the auxiliary electrodes AE1 are formed as similar to the example shown in FIG. 6 and FIG. 8.

Figure 25:
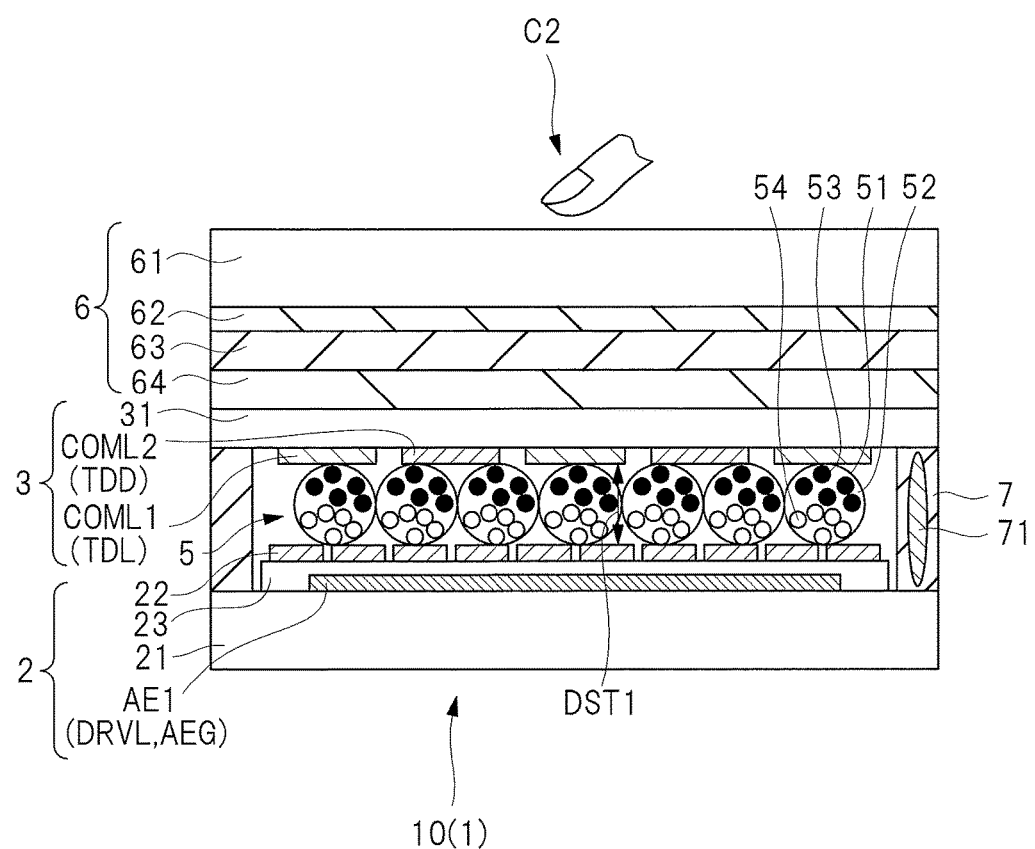
FIG. 25 is a cross-sectional view showing a display device with a touch detection function of a second modified example of the first embodiment.
Figure 26:
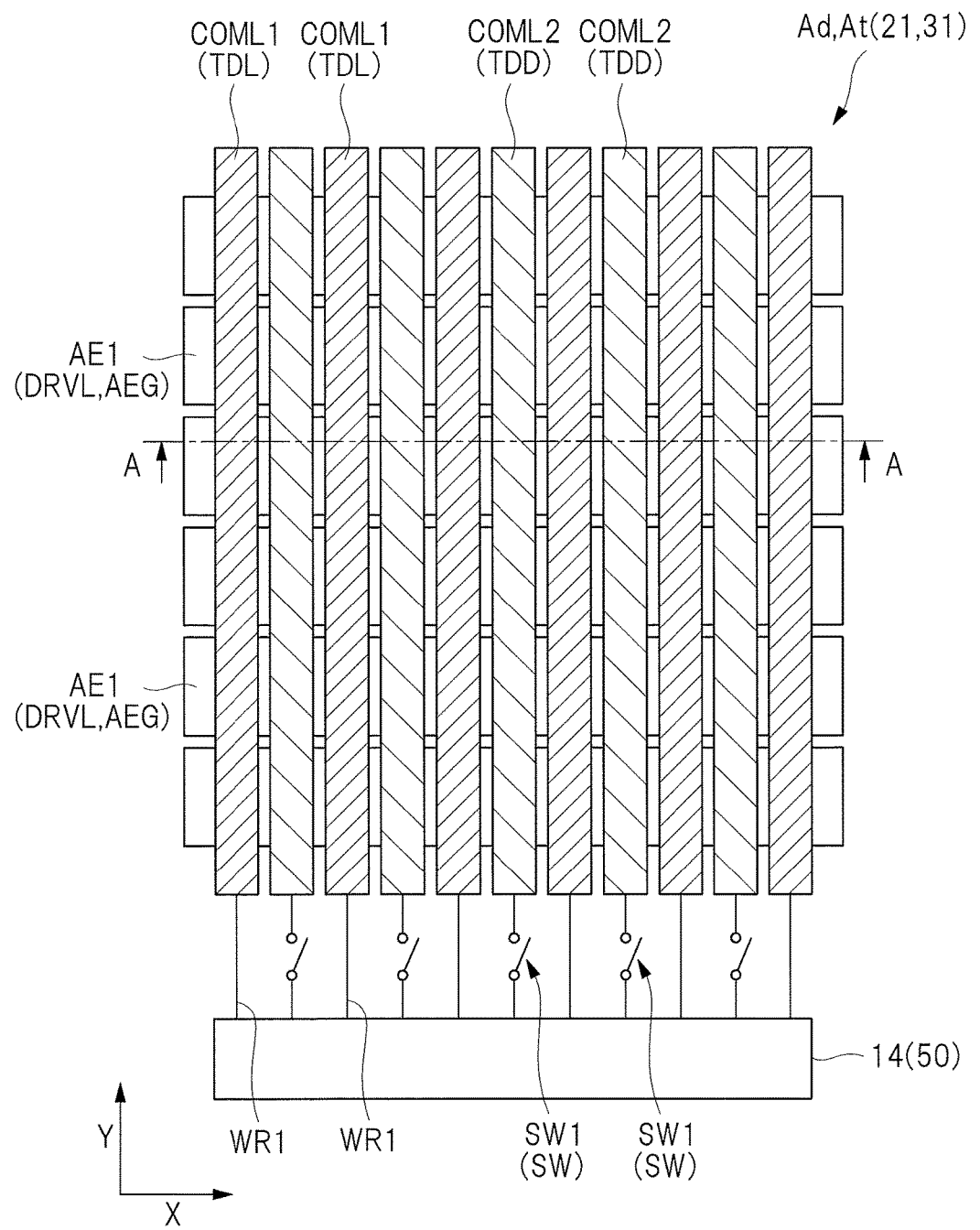
FIG. 26 is a plan view schematically showing configurations of a driving electrode and an auxiliary electrode of the second modified example of the first embodiment.

FIG. 25 is a cross-sectional view showing the display device with a touch detection function of the second modified example according to the first embodiment. FIG. 26 is a plan view schematically showing configurations of driving electrodes and auxiliary electrodes in the second modified example according to the first embodiment. Moreover, FIG. 25 is a cross-sectional view taken along a line A-A of FIG. 26.

In the present second modified example, the facing substrate 3 has the substrate 31, the plurality of the driving electrodes COML1 and the plurality of the driving electrodes COML2.

As similar to the example shown in FIG. 6 and FIG. 8, each of the plurality of the driving electrodes COML1 and the plurality of the driving electrodes COML2 is made of a transparent conductive material such as ITO and IZO. The plurality of the driving electrodes COML1 and the plurality of the driving electrodes COML2 are formed on the lower surface of the substrate 31 at the display region Ad or the touch detection region At. Note that the plurality of the driving electrodes COML1 or the plurality of the driving electrodes COML2 may be formed on the upper surface of the substrate 31. Moreover, the plurality of the driving electrodes COML1 and the plurality of the driving electrodes COML2 may be formed on layers different from each other. Alternatively, only the plurality of the driving electrodes COML1 may be formed while the plurality of the driving electrodes COML2 may be not formed.

In the present second modified example, each of the plurality of the driving electrodes COML1 is extended in the Y-axis direction and is also arranged in the X-axis direction when seen in a plan view. Moreover, each of the plurality of the driving electrodes COML2 is extended in the Y-axis direction and is also arranged in the X-axis direction when seen in a plan view. When seen in a plan view, one or a plurality of the driving electrodes COML1 among the plurality of the driving electrodes COML1 and one or a plurality of the driving electrodes COML2 among the plurality of the driving electrodes COML2 are alternately disposed in the X-axis direction.

Each of the plurality of the driving electrodes COML1 is connected electrically to the driving electrode driver 14 included in the scan driving unit 50 through routing wiring WR1. Meanwhile, each of the plurality of the driving electrodes COML2 is connected electrically to the driving electrode driver 14 included in the scan driving unit 50 through the routing wiring WR1 and each of a plurality of switches SW1 included in the switch unit SW. The switch unit SW formed of the plurality of switches SW1 switches between a state in which the plurality of the driving electrodes COML2 are electrically connected to the driving electrode driver 14 and a state in which the plurality of the driving electrodes COML2 are in a floating state.

In the present second modified example, the plurality of the driving electrodes COML1 are operated as the driving electrodes for the electrophoresis display device, and also operated as the detection electrodes TDL for the touch detection device. Meanwhile, in performing the displaying operation, the plurality of the driving electrodes COML2 are connected to the driving electrode driver 14 by the switch SW1, and are operated as the driving electrodes for the electrophoresis display device. However, in performing the touch detection operation, the plurality of the driving electrodes COML2 are blocked from the driving electrode driver 14 by the switch SW1, so that they are not operated as the detection electrodes TDL for the touch detection device 30 but become dummy electrodes TDD. Moreover, in the present second modified example, the plurality of the auxiliary electrodes AE1 are operated as the driving electrodes DRVL for the touch detection device.

That is, in the present second modified example, in performing the displaying operation, when a state of the plurality of the driving electrodes COML2 is switched by the switch unit SW into the state in which they are electrically connected to the driving electrode driver 14, the driving electrode driver 14 supplies the display driving signal Vcomd to the plurality of the driving electrodes COML1 and the plurality of the driving electrodes COML2. Then, the electric field is formed between each of the plurality of the pixel electrodes 22 and each of the plurality of the driving electrodes COML1 as well as each of the plurality of the driving electrodes COML2, so that an image is displayed.

Meanwhile, in the present second modified example, in performing the touch detection operation, when a state of the plurality of the driving electrodes COML2 is switched by the switch unit SW into the state in which they are electrically in the floating state, the driving electrode driver 14 supplies the touch detection driving signal Vcomt to the plurality of the auxiliary electrodes AE1. Moreover, in performing the touch detection operation, when a state of the plurality of the driving electrodes COML2 is switched by the switch unit SW into the state in which they are electrically in the floating state, the touch detection unit 40 (see FIG. 1) detects the input position based on the electrostatic capacitance generated between each of the plurality of the auxiliary electrodes AE1 and each of the plurality of the detection electrodes TDL.

When the thickness of the electrophoresis layer 5, that is, a distance DST1 from the upper surface of the pixel electrode 22 to the lower surface of the driving electrode COML1 is substantially equal to the thickness of the liquid crystal layer in the liquid crystal apparatus such as about 3 an electrostatic capacitance generated between the auxiliary electrodes AE1 and the driving electrodes COML1 becomes extremely larger than a change in the electrostatic capacitance C2 formed by a finger. For this reason, it is not possible to operate the auxiliary electrodes AE1 cannot be operated as the driving electrodes DRVL for the touch detection device, and the driving electrodes COML1 cannot be operated as the detection electrodes TDL for the touch detection device.

However, as described above, in the display apparatus provided with the electrophoresis layer, the thickness of the electrophoresis layer 5, that is, the distance DST1 between the lower surface of the driving electrode COML1 and the upper surface of the pixel electrode 22 is set to, for example, about 30 to 200 which is extremely larger than that of the liquid crystal display device. For this reason, in the present second modified example, the electrostatic capacitance between the auxiliary electrodes AE1 and the driving electrodes COML1 is not so large in comparison with the change in the electrostatic capacitance C2 formed by the finger. Therefore, the auxiliary electrodes AE1 can be operated as the driving electrodes DRVL for the touch detection device, and the driving electrodes COML1 can be operated as the detection electrodes TDL for the touch detection device.

Moreover, in performing the touch detection operation, one or a plurality of the detection electrodes TDL among the plurality of the detection electrodes TDL and one or a plurality of dummy electrodes TDD among the plurality of the dummy electrodes TDD are alternately disposed in the X-axis direction when seen in a plan view. Thus, in performing the touch detection operation, a parasitic capacitance generated between the detection electrodes TDL and wirings or others located lower than the detection electrodes TDL can be reduced, so that the detection sensitivity of the touch detection can be enhanced. Moreover, the distribution of the electric field between the detection electrodes TDL and the driving electrodes DRVL can be easily adjusted, so that the detection sensitivity of the touch detection can be enhanced.

Other parts than that can be set as the same as those of the example shown in FIG. 6 and FIG. 8.

<Third Modified Example of Display Device Having Touch Detection Function>

Next, with reference to FIGS. 27 and 28, the third modified example of a display device having a touch detection function will be described. In the present third modified example, the line width of the driving electrode COML1 is made narrower than the line width of the driving electrode COML1 of the second modified example according to the first embodiment.

Figure 27:
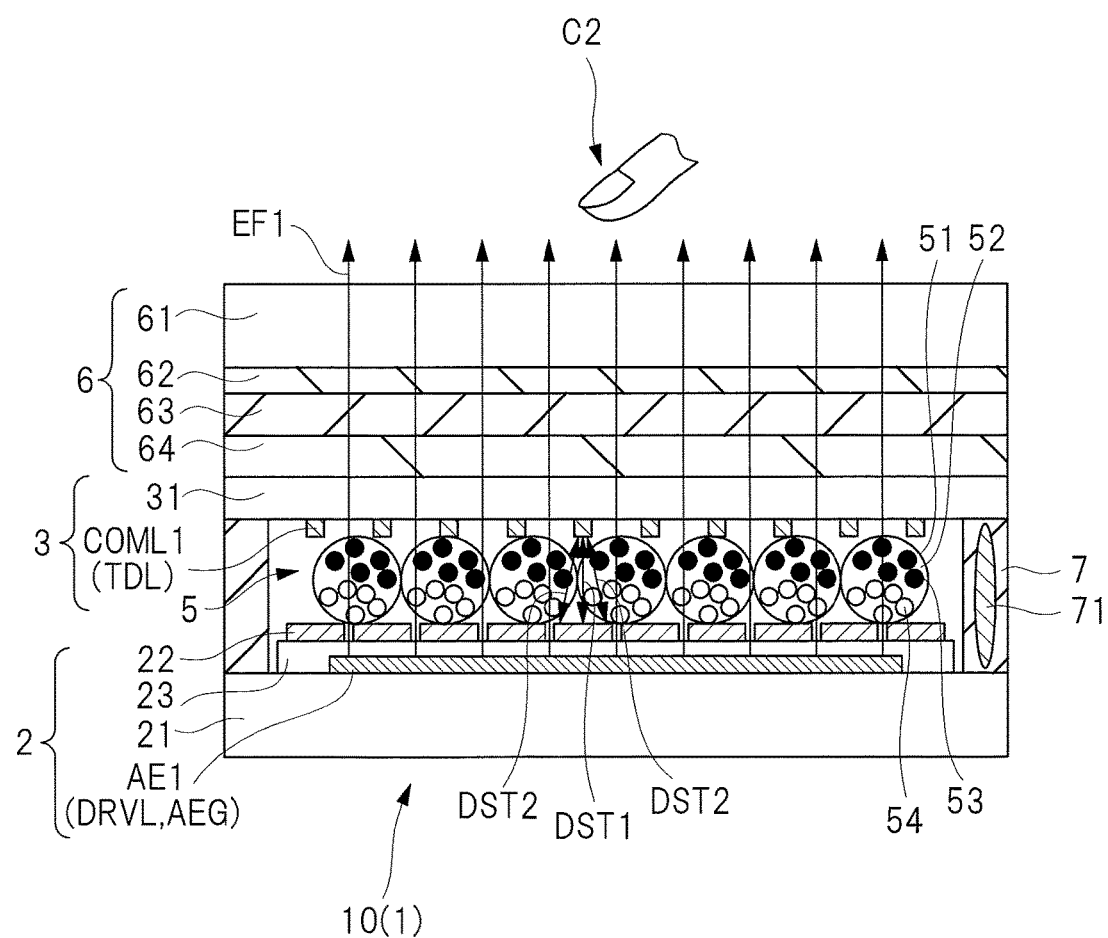
FIG. 27 is a cross-sectional view showing a display device with a touch detection function of a third modified example of the first embodiment.
Figure 28:
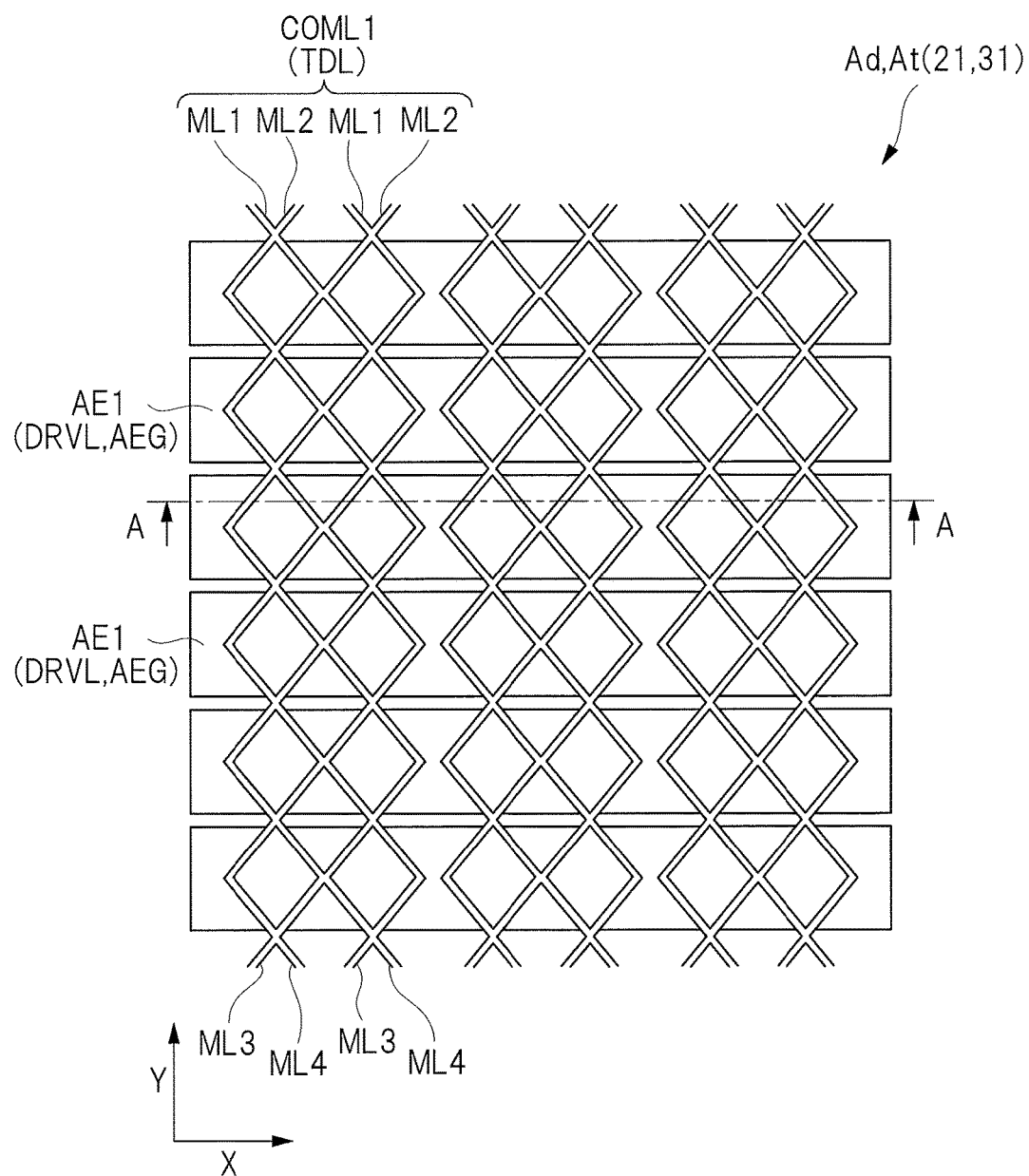
FIG. 28 is a plan view schematically showing configurations of a driving electrode and an auxiliary electrode of the third modified example of the first embodiment.

FIG. 27 is a cross-sectional view showing the display device with a touch detection function of the third modified example in accordance with the first embodiment. FIG. 28 is a plan view schematically showing configurations of driving electrodes and auxiliary electrodes in the third modified example according to the first embodiment. Moreover, FIG. 27 is a cross-sectional view taken along a line A-A of FIG. 28.

In the present third modified example, the facing substrate 3 has the substrate 31 and the plurality of the driving electrodes COML1. The plurality of the driving electrodes COML1 are formed on the lower surface of the substrate 31 at the display region Ad or the touch detection region At when seen in a plan view. Note that the plurality of the driving electrodes COML1 may be formed on the upper surface of the substrate 31.

In the present third modified example, each of the plurality of the driving electrodes COML1 is extended in the Y-axis direction and is also arranged in the X-axis direction when seen in a plan view. Each of the plurality of the driving electrodes COML1 may have a mesh shape formed of a plurality of conductor lines when seen in a plan view. In the example shown in FIG. 28, each of the plurality of the driving electrodes COML1 has two conductor lines ML1 and two conductor lines ML2. The two conductor lines ML1 and the two conductor lines ML2 are bent alternately in reversed directions from each other when seen in a plan view so as to form a zig-zag shape that is extended in the Y-axis direction as a whole. Moreover, the respective reversely-bent parts of the conductor line ML1 and the conductor line ML2 which are adjacent with each other in the X-axis direction are connected to each other. Alternatively, each of the plurality of the driving electrodes COML1 may have only a plurality of conductor lines ML1 each having a zig-zag shape without forming the two conductor lines ML2.

Alternatively, in another view point, each of the plurality of the driving electrodes COML1 has a plurality of conductor lines ML3 and a plurality of conductor lines ML4. The plurality of the conductor lines ML3 are extended in a direction that is different from both of the X-axis direction and the Y-axis direction when seen in a plan view, and arranged while being spaced from each other. Each of the plurality of the conductor lines ML4 is extended in a direction that is different from all of the X-axis direction, the Y-axis direction and the extending direction of the conductor lines ML3 when seen in a plan view, and arranged while being spaced from each other. The plurality of the conductor lines ML3 and the plurality of the conductor lines ML4 intersect with each other. Moreover, the plurality of the driving electrodes COML1 form a mesh shape formed of the plurality of the conductor lines ML3 and the plurality of the conductor lines ML4 that intersect with each other.

As different from the example shown in FIG. 6 and FIG. 8, the conductor lines ML1 and the conductor lines ML2 or the conductor lines ML3 and the conductor lines ML4, which are included in each of the plurality of the driving electrodes COML1 in the present third modified example, contain a metal layer or alloy layer. For this reason, the resistivity of each of the plurality of the driving electrodes COML1 in the present third modified example can be made smaller than the resistivity of each of the plurality of the driving electrodes COML1 in the second modified example of the first embodiment. Therefore, the line width of the conductor line ML3 in a direction intersecting with the extending direction of the conductor line ML3 that is included in each of the plurality of the driving electrodes COML1 in the present third modified example can be made narrower than the width between the facing side surfaces of the two conductor lines ML3 that are adjacent with each other in a direction intersecting with the extending direction of the conductor lines ML3. In other words, the area ratio of the driving electrodes COML1 at the touch detection area At can be set to 50% or less.

As described above, the thickness of the electrophoresis layer 5, that is, the distance DST1 between the lower surface of the driving electrode COML1 and the upper surface of the pixel electrode 22 is set to, for example, about 30 to 200 µm, which is extremely larger than that of the liquid crystal display device. For this reason, even in the case of the narrow line width of the driving electrodes COML1, as shown in FIG. 27, a distance DST2 between the peripheral portion of the pixel electrode 22 in the X-axis direction and the pixel electrode 22 is substantially equal to a distance DST1 between the center portion of the pixel electrode 22 in the X-axis direction (see FIG. 28) and the pixel electrode 22. Therefore, even in the case of the narrow line width of the driving electrode COML1, in performing the displaying operation, the driving electrodes COML1 can be operated as the driving electrodes for the electrophoresis display device.

In the present third modified example, the plurality of the driving electrodes COML1 are operated as the driving electrodes for the electrophoresis display device, and also operated as the detection electrodes TDL for the touch detection device. Moreover, also in the present third modified example, the plurality of the auxiliary electrodes AE1 are operated as the driving electrodes DRVL for the touch detection device as similar to the second modified example of the first embodiment.

In the second modified example of the first embodiment, each of the plurality of the dummy electrodes TDD is disposed above each of the auxiliary electrodes AE1 at a portion located between two detection electrodes TDL which are adjacent to each other in the X-axis direction when seen in a plan view. At this time, each of the plurality of the dummy electrodes TDD is disposed so as to bridge over the plurality of the driving electrodes DRVL arranged in the Y-axis direction when seen in a plan view. Therefore, the electric field generated by the supply of the touch detection driving signal Vcomt to the driving electrodes DRVL is difficult to go round to be upper than the detection electrodes TDL.

Meanwhile, in the present third modified example, no dummy electrodes are formed, so that the line width of each of the plurality of the driving electrodes COML1 is narrower than the line width of each of the plurality of the driving electrodes COML1 in the second modified example of the first embodiment. Thus, an electric field EF1 generated by the supply of the touch detection driving signal Vcomt to the driving electrodes DRVL formed of the auxiliary electrodes AE1 is easy to go round to be upper than the detection electrodes TDL formed of the driving electrodes COML1, so that the detection sensitivity of the touch detection can be increased to be higher than that of the second modified example of the first embodiment.

As described above, preferably, the line width of the conductor line ML3 in a direction intersecting with the extending direction of the conductor line ML3 included in each of the plurality of the driving electrodes COML1 is made narrower than the width between the facing side surfaces of the two conductor lines ML3 which are adjacent to each other in the direction intersecting with the extending direction of the conductor line ML3. Thus, the electric field EF1 generated by the supply of the touch detection driving signal Vcomt to the driving electrodes DRVL formed of the auxiliary electrodes AE1 is easy to go round to be further higher than the detection electrodes TDL formed of the driving electrodes COML1, so that the detection sensitivity of the touch detection can be further enhanced than that of the second modified example of the first embodiment.

Other parts than that can be set to those of the example shown in FIG. 6 and FIG. 8.

Second Embodiment

In the first embodiment, the explanations have been made about the example in which the display apparatus provided with the electrophoresis display device has the touch detection device serving as the input device of the mutual capacitance system provided with the driving electrodes and the detection electrodes. On the other hand, in the second embodiment, explanations will be made about an example in which a display apparatus provided with an electrophoresis display device has a touch detection device of a self-capacitance system provided with only the detection electrodes. Note that the display apparatus of the second embodiment is also obtained by applying the display apparatus provided with a touch panel serving as an input device to a display apparatus having a touch detection function of an in-cell type as similar to the display apparatus of the first embodiment.

<Overall Configuration>

Figure 29:
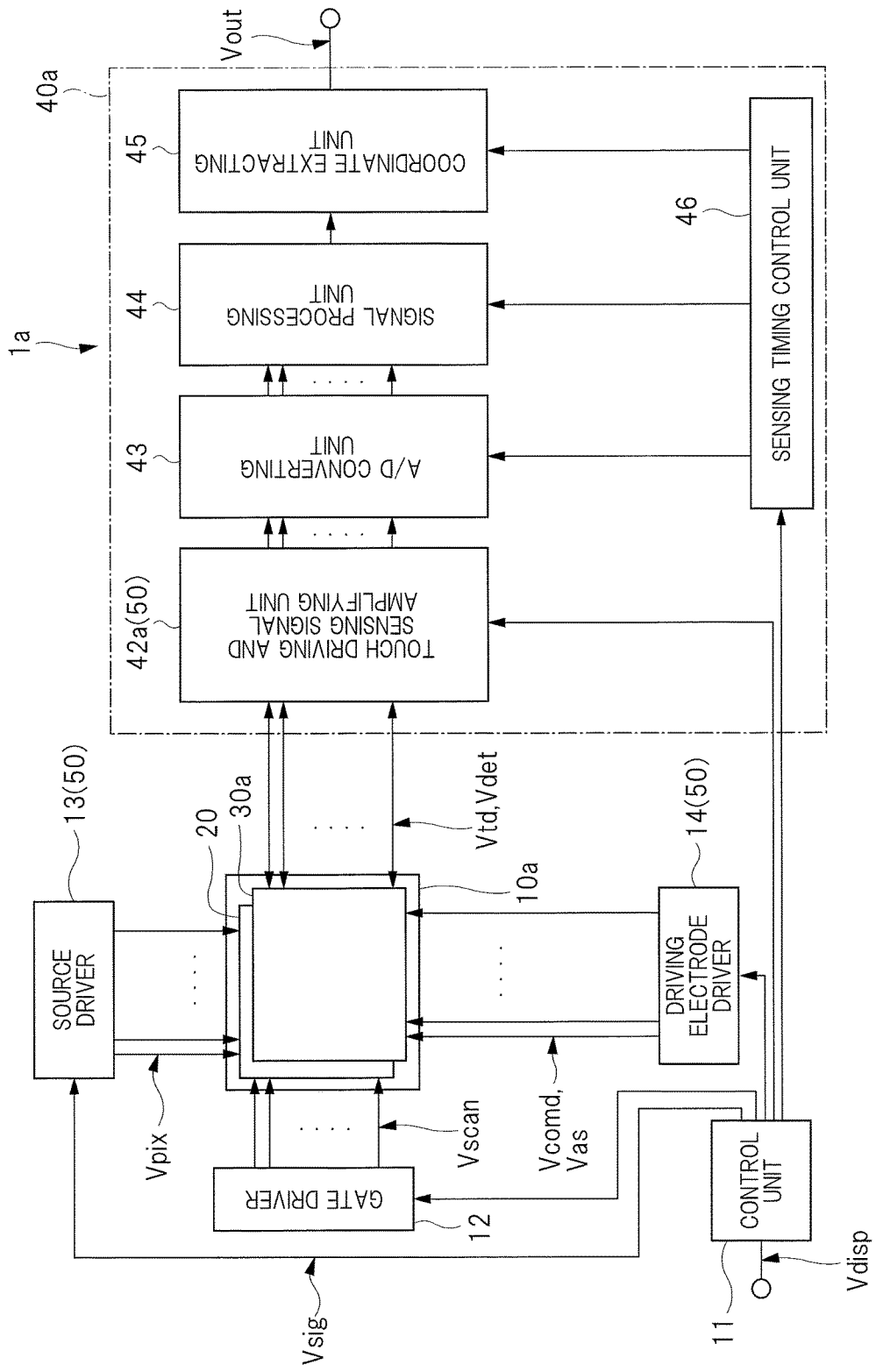
FIG. 29 is a block diagram showing one example of configuration of a display apparatus of a second embodiment.

First, with reference to FIG. 29, an overall configuration of a display apparatus according to the second embodiment will be described. FIG. 29 is a block diagram showing one structural example of the display apparatus of the second embodiment.

A display apparatus 1a of the second embodiment is provided with a display device 10a having a touch detection function, a control unit 11, a gate driver 12, a source driver 13, a driving electrode driver 14 and a touch detection unit 40a. In the present second embodiment, as different from the first embodiment, a scan driving unit 50 is formed of a touch driving and touch sensing signal amplifying unit 42a in addition to the source driver 13 and the driving electrode driver 14.

The display device 10 having a touch detection function has a display device 20 and a touch detection device 30a. each unit other than the touch detection device 30a and the touch detection unit 40a of the display device 10a having the touch detection function in the display apparatus 1a of the present second embodiment are set as the same as each unit other than the facing substrate 3 in the display apparatus of the first embodiment, and therefore, the description of each unit will be omitted.

Note that the driving electrode driver 14 included in the scan driving unit 50 is a circuit which supplies a display driving signal Vcomd in performing the displaying operation to driving electrodes COML1 and driving electrodes COML2 (see FIG. 32 or FIG. 33 to be described later) included in the display device 10a having the touch detection function, based on the control signal supplied from the control unit 11. Moreover, in performing the touch detection operation, the driving electrode driver 14 may supply an active shield driving signal Vas formed of an alternate-current signal having the same phase as that of the alternate-current signal contained in the touch detection driving signal Vcomt to the auxiliary electrodes AE1 (see FIG. 32 and FIG. 33 to be described later) included in the display device 10a having the touch detection function as shown in FIG. 15C.

In the present second embodiment, the touch detection unit 40a supplies a touch detection driving signal Vtd to the touch detection device 30a based on a control signal supplied from the control unit 11. Moreover, based on the control signal supplied from the control unit 11 and a detection signal Vdet supplied from the touch detection device 30a of the display device 10a having the touch detection function, the touch detection unit 40a detects existence or nonexistence of the touching by the finger or the input tool such as the touch pen onto the touch detection device 30a, that is, existence or nonexistence of the touched state or the coming-close state to be described later.

In the present second embodiment, the touch detection unit 40a is provided with a touch driving and sensing signal amplifying unit 42a, an A/D converting unit 43, a signal processing unit 44, a coordinate extracting unit 45 and a sensing timing control unit 46. In the touch detection unit 40a of the present second embodiment, the A/D converting unit 43, the signal processing unit 44 and the coordinate extracting unit 45 are can be set as the same as those units in the touch detection unit 40 of the first embodiment.

As described above, the touch driving and sensing signal amplifying unit 42a supplies a touch detection driving signal Vtd to the touch detection device 30a based on a control signal supplied from the control unit 11. Then, the touch driving and sensing signal amplifying unit 42a amplifies a detection signal Vdet supplied from the touch detection device 30a.

<Principle of Self-Capacitance-Type Touch Detection>

Figure 30:
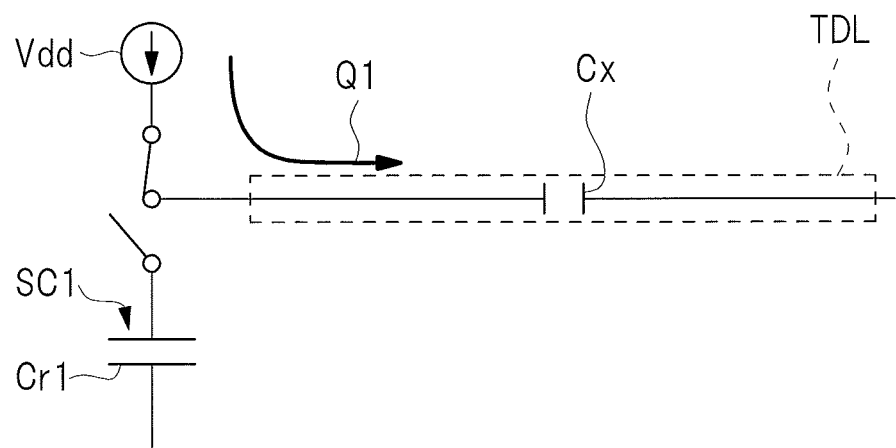
FIG. 30 is an explanatory diagram showing an electrical connection state of a detection electrode in a self-capacitance system.
Figure 31:
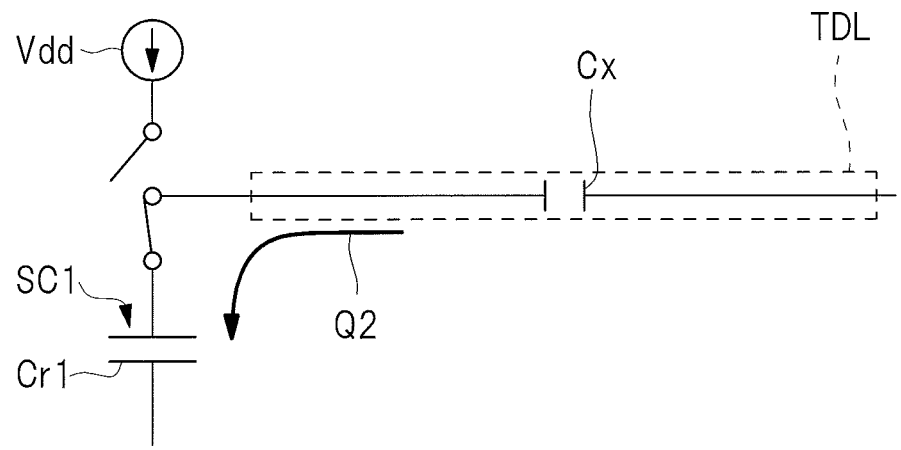
FIG. 31 is an explanatory diagram showing another electrical connection state of the detection electrode in the self-capacitance system.

Next, with reference to FIG. 30 and FIG. 31, a principle of a touch detection in a touch detection device of a self-capacitance system will be described. FIG. 30 and FIG. 31 are explanatory diagrams showing an electrical connection state of detection electrodes in the self-capacitance system.

In the touch detection device in the self-capacitance system, first, the touch driving and sensing signal amplifying unit 42a supplies the touch detection driving signal Vtd to the touch detection device 30a (see FIG. 29). At this time, a detection electrode TDL having an electrostatic capacitance Cx as shown in FIG. 30 is separated from a detection circuit SC1 having an electrostatic capacitance Cr1, and electrically connected to a power supply Vdd, so that a charge amount Q1 is stored in the detection electrode TDL having the electrostatic capacitance Cx.

Next, as shown in FIG. 31, when the detection electrode TDL having the electrostatic capacitance Cx is separated from the power supply Vdd and electrically connected to the detection circuit SC1 having the electrostatic capacitance Cr1, a charge amount Q2 flowing into the detection circuit SC1 is detected. Thus, the detection signal Vdet is supplied from the touch detection device 30a to the touch driving and sensing signal amplifying unit 42a (see FIG. 29).

Here, when a finger is made in contact with, or comes close to the detection electrode TDL, the electrostatic capacitance Cx of the detection electrode TDL is changed due to the capacitance of the finger, and the charge amount Q2 flowing into the detection circuit SC1 is also changed with the result that when the detection electrode TDL is connected to the detection circuit SC1. Therefore, by detecting the change in the electrostatic capacitance Cx of the detection electrode TDL by measuring the flowing-out charge amount Q2 by the detection circuit SC1, it can be determine whether or not the finger is made in contact with or comes close to the detection electrode TDL.

<Module>

The module in the display apparatus of the present second embodiments substantially the same module as the module of the display apparatus of the first embodiment, and therefore, the description thereof will be omitted.

<Display Device Having Touch Detection Function>

Next, with reference to FIG. 32 and FIG. 33, a display device having a touch detection function will be described.

Figure 32:
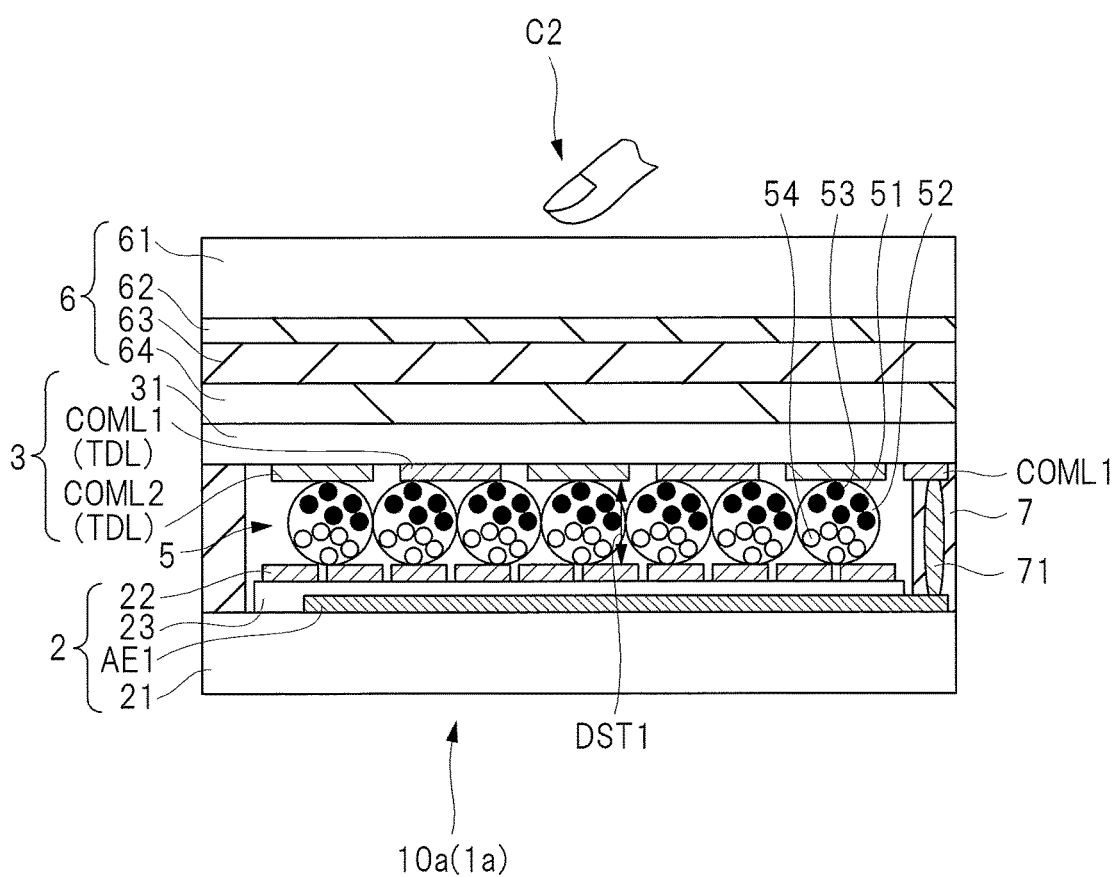
FIG. 32 is a cross-sectional view showing one example of configurations of a display device with a touch detection function of the display apparatus of the second embodiment.

FIG. 32 is a cross-sectional view showing one example of a configuration of a display device having a touch detection function of the display apparatus according to the second embodiment. FIG. 33 is a plan view schematically showing one example of configurations of driving electrodes and auxiliary electrodes in the display apparatus of the second embodiment. Moreover, FIG. 32 is a cross-sectional view taken along a line A-A of FIG. 33.

The display device 10a having the touch detection function has the array substrate 2, the facing substrate 3, an electrophoresis layer 5, a protective substrate 6 and a sealing portion 7. The facing substrate 3 has a facing configuration in which an upper surface serving as a main surface of the array substrate 2 and a lower surface serving as a main surface of the facing substrate 3 are faced to each other. The electrophoresis layer 5 is formed between the array substrate 2 and the facing substrate 3. That is, the electrophoresis layer 5 is sandwiched between the upper surface of the substrate 21 and the lower surface of the substrate 31.

The fact that the array substrate 2 has the substrate 21 and that the facing substrate 3 has the substrate 31, and the fact that the upper surface of the substrate 21 includes the display region Ad which is a part of the upper surface and that the upper surface of the substrate 31 includes the touch detection region At which is a part of the upper surface are set as the same as those of the first embodiment.

As shown in FIG. 32, the array substrate 2 has the substrate 21, an insulating film 23 and a plurality of pixel electrodes 22. As similar to the explanations made with reference to FIG. 7 and FIG. 9 in the first embodiment, in the display region Ad, the substrate 21 is provided with a plurality of scanning lines GCL, a plurality of signal lines SGL and a plurality of TFT elements Tr. Moreover, in the present second embodiment, the substrate 21, the insulating film 23 and the plurality of the pixel electrodes 22 are configured as the same as those in the first embodiment.

Figure 33:
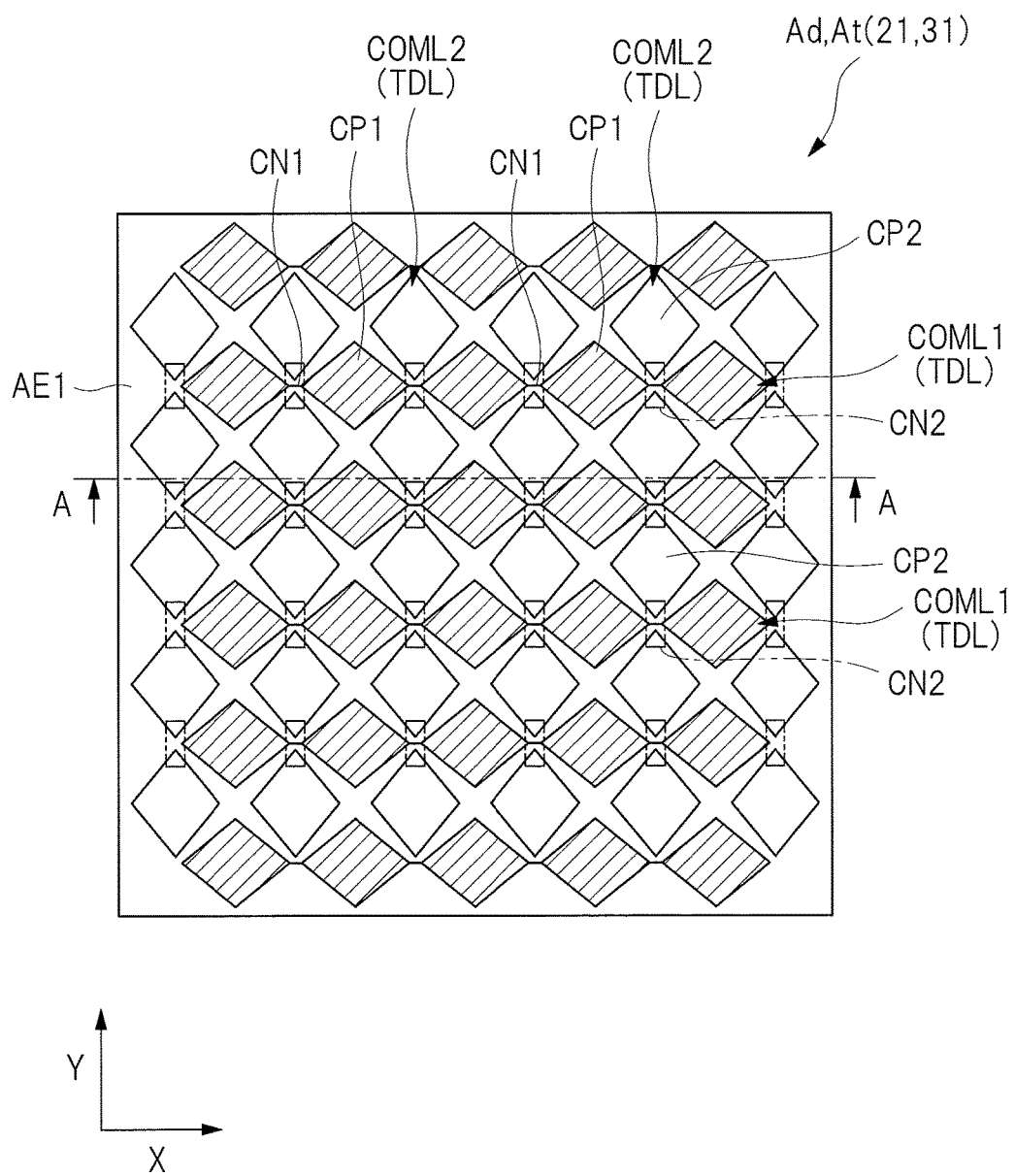
FIG. 33 is a plan view schematically showing one example of configuration of a driving electrode and an auxiliary electrode in the display apparatus of the second embodiment.

As shown in FIG. 32 and FIG. 33, the auxiliary electrode AE1 is formed on the upper surface of the substrate 21. The auxiliary electrode AE1 is formed on the same layer as the scanning lines GCL and the gate electrodes 23a (see FIG. 7) on the upper surface of the substrate 21 at the display region Ad or the touch detection region At when seen in a plan view.

More preferably, in performing the touch detection operation, the auxiliary electrode AE1 is electrically connected to the driving electrode driver 14 (see FIG. 29). Moreover, in performing the touch detection operation, to the auxiliary electrode AE1, the driving electrode driver 14 supplies an active shield driving signal Vas formed of an alternate-current signal having the same phase as that of the alternate-current signal contained in the touch detection driving signal Vtd supplied to the detection electrode TDL formed of the driving electrodes COML1 by the touch driving and sensing signal amplifying unit 42a. Thus, a parasitic capacitance generated between the detection electrode TDL formed of the driving electrode COML1 and each of wirings formed on the array substrate 2 can be removed, so that the sensitivity of the touch detection can be improved.

Note that the plurality of the driving electrodes COML1 may be electrically connected to the auxiliary electrode AE1 through the conductive portion 71 formed inside the sealing portion 7.

As shown in FIG. 32 and FIG. 33, the facing substrate 3 has the substrate 31, the plurality of the driving electrodes COML1 and the plurality of the driving electrodes COML2. The substrate 31, the plurality of the driving electrodes COML1 and the plurality of the driving electrodes COML2 in the present second embodiment can be set as the same as those of the first embodiment. That is, the plurality of the driving electrodes COML1 and the plurality of the driving electrodes COML2 are formed on the lower surface of the substrate 31 at the display region Ad or the touch detection region At when seen in a plan view. Note that the plurality of the driving electrodes COML1 or the plurality of the driving electrodes COML2 may be formed on the upper surface of the substrate 31.

Each of the plurality of the driving electrodes COML1 is extended in the X-axis direction and is also arranged in the Y-axis direction when seen in a plan view. Each of the plurality of the driving electrodes COML1 includes a plurality of electrode portions CP1 and a plurality of connection portions CN1. Each of the plurality of the electrode portions CP1 and each of the plurality of the connection portions CN1 are formed on the lower surface of the substrate 31 at the display region Ad or the touch detection region At. The plurality of the electrode portions CP1 are arranged in the X-axis direction when seen in a plan view. The two electrode portions CP1 that are adjacent to each other in the X-axis direction are electrically connected to each other by the connection portion CN1.

Each of the plurality of the driving electrodes COML2 is extended in the Y-axis direction and is also arranged in the X-axis direction when seen in a plan view. Each of the plurality of the driving electrodes COML2 includes a plurality of electrode portions CP2 and a plurality of connection portions CN2. Each of the plurality of the electrode portions CP2 is formed on the lower surface of the substrate 31 at the display region Ad or the touch detection region At. The plurality of the electrode portions CP2 are arranged in the Y-axis direction when seen in a plan view. Moreover, the two electrode portions CP2 that are adjacent to each other in the Y-axis direction are electrically connected to each other by the connection portion CN2.

In the example as shown in FIG. 32 and FIG. 33, the plurality of the driving electrodes COML1 and the plurality of the driving electrodes COML2 are formed on the same layer. For this reason, the connection portions CN2 are formed on a layer different from that of the electrode portions CP2 so as to bridge over each of the connection portions CN1 through an insulating film not shown.

Moreover, the electrophoresis layer 5, the protective substrate 6 and the sealing portion 7 of the present second embodiment can be set as the same as those of the first embodiment.

Also in the present second embodiment, as similar to the explanations made with reference to FIGS. 5 to 9 in the first embodiment, the electrophoresis display device 20 has a plurality of scanning lines GCL, a plurality of signal lines SGL, a plurality of TFT elements Tr, a plurality of pixel electrodes 22, a plurality of driving electrodes COML1, a plurality of driving electrodes COML2 and a plurality of electrophoresis elements EP.

Moreover, the display driving signal Vcomd (see FIG. 29) is supplied by the driving electrode driver 14 to one or the plurality of the driving electrodes COML1 disposed in the selected partial display region Adp (see FIG. 13), and the pixel signal Vpix (see FIG. 29) is supplied by the source driver 13 to the pixel electrode 22 included in each of the sub-pixels SPix belonging to the selected one horizontal line. Thus, an electric field is formed between each of the plurality of the pixel electrodes 22 and each of the plurality of the driving electrodes COML1 in the selected partial display region Adp, so that an image is displayed on each horizontal line in the selected partial display region Adp.

On the other hand, the touch detection device 30a (see FIG. 29) according to the present second embodiment is a touch detection device of a self-capacitance system. Therefore, in the example shown in FIG. 32 and FIG. 33, as different from the first embodiment, the plurality of the driving electrodes COML1 are operated as the driving electrodes for the electrophoresis display device, and also operated as the detection electrodes TDL for the touch detection device. Moreover, the plurality of the driving electrodes COML2 are operated as the driving electrodes for the electrophoresis display device, and also operated as the detection electrodes TDL for the touch detection device. That is, in the present second embodiment, in performing the touch detection operation, both of the plurality of the driving electrodes COML1 and the plurality of the driving electrodes COM2 are operated as not the driving electrodes DRVL (see FIG. 6 and FIG. 8) but the detection electrodes TDL.

As described above by using FIG. 30 and FIG. 31, in the present second embodiment, a charge amount is stored in the detection electrode TDL by the supply of the touch detection driving signal Vtd to the touch detection device 30a by the touch driving and sensing signal amplifying unit 42a. Next, when the detection electrode TDL is separated from the power supply and is electrically connected to the detection electrode TDL, the detection signal Vdet is supplied from the touch detection device 30a to the touch driving and sensing signal amplifying unit 42a as a charge amount flowing into the detection circuit. Then, the touch detection unit 40a detects the input position based on the electrostatic capacitance of each of the plurality of the detection electrodes TDL.

In the example shown in FIG. 32 and FIG. 33, the auxiliary electrode AE1 may be formed, and an active shield driving signal Vas formed of an alternate-current signal having the same phase as that of the alternate-current signal contained in the touch detection driving signal Vtd supplied to the detection electrode TDL formed of the driving electrode COML1 may be supplied to the auxiliary electrodes AE1 in performing the touch detection operation. That is, when the scan driving unit 50 (see FIG. 29) supplies the touch detection driving signal Vtd to the plurality of the detection electrodes TDL, and when the active shield driving signal Vas is supplied to the auxiliary electrode AE1, the touch detection unit 40a may detect the input position based on the electrostatic capacitance of each of the plurality of the detection electrodes TDL. Thus, a parasitic capacitance generated between the detection electrode TDL and each of the wirings included in the array substrate 2 can be eliminated, so that the sensitivity of the touch detection can be enhanced. However, the auxiliary electrode AE1 may not be formed.

As described later with reference to FIG. 37, note that only the plurality of the driving electrodes COML1 that are arranged in the X-axis direction and the Y-axis direction in a matrix form when seen in a plan view may be formed in place of the plurality of the driving electrodes COML1 and the plurality of the driving electrodes COML2 that intersect with each other. Moreover, all the plurality of the detection electrodes TDL each formed of the driving electrodes COML1 may be connected to the touch driving and sensing signal amplifying unit 42a through an individually-formed routing wiring. When the touch detection device 30a is a touch detection device of a self-capacitance system, all the plurality of the detection electrodes TDL can be individually connected to the touch driving and sensing signal amplifying unit 42a by using such a connection method. Thus, the input position can be detected with high positional accuracy.

More specifically, without forming the plurality of the connection portions CN1 and the plurality of the connection portions CN2, by using the same connection method as a connection method to be explained later with reference to FIG. 36 and FIG. 37, all the plurality of the electrode portions CP1 and the plurality of the electrode portions CP2 can be individually connected to the touch driving and sensing signal amplifying unit 42a.

<Driving Method>

The driving method of the display apparatus 1a according to the present second embodiment can be set as the same as the driving method of the display apparatus 1 of the first embodiment, and has the same effects as those of the driving method of the display apparatus 1 of the first embodiment.

<Driving Method with Gray Level Control>

The driving method with the gray level control in the display apparatus 1a according to the second embodiment can be set as the same as the driving method with gray level control in the display apparatus 1 of the first embodiment, and has the same effects as those of the driving method with gray level control in the display apparatus 1 of the first embodiment.

<First Modified Example of Display Device Having Touch Detection Function>

Next, with reference to FIG. 34 and FIG. 35, the first modified example of the display device having a touch detection function will be described. In the present first modified example, the driving electrodes COM1 and the driving electrodes COM2 are formed on different layers from each other.

Figure 34:
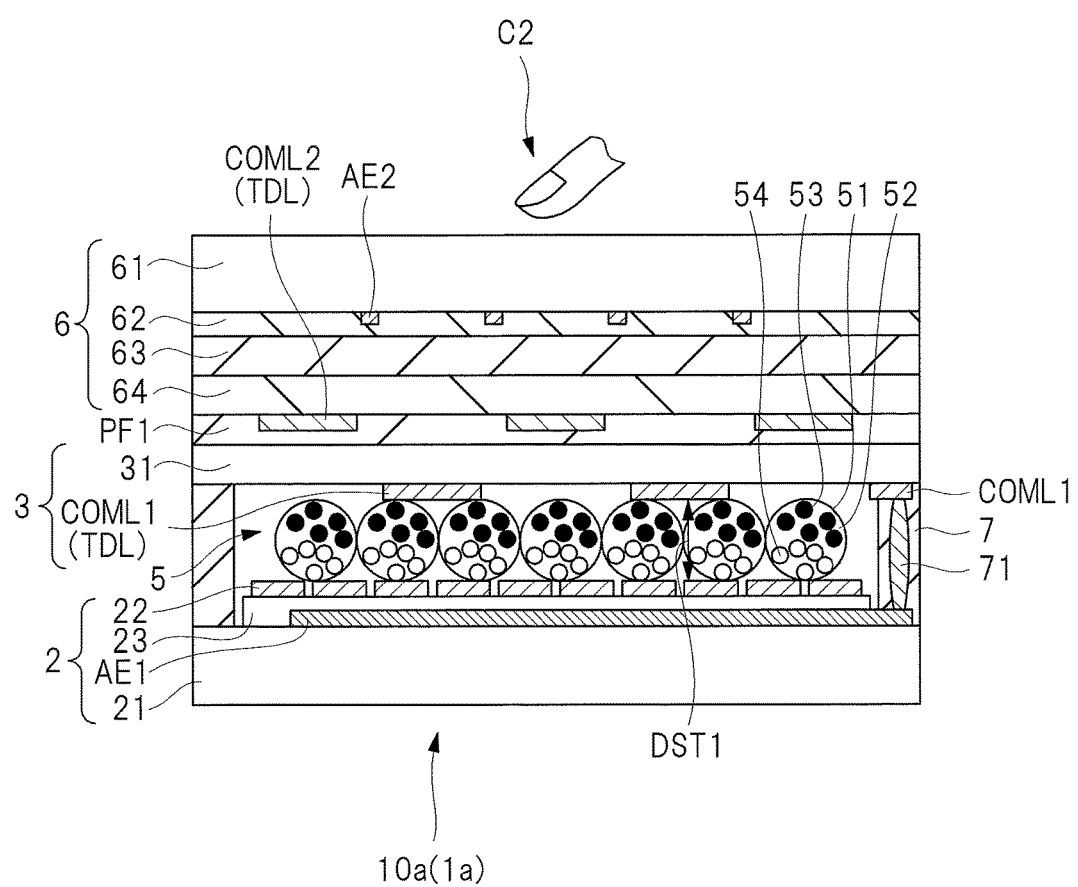
FIG. 34 is a cross-sectional view showing a display device with a touch detection function of a first modified example of the second embodiment.

FIG. 34 is a cross-sectional view showing a display device having a touch detection function of the first modified example of the second embodiment. FIG. 35 is a plan view schematically showing a configuration of driving electrodes and auxiliary electrodes in the first modified example of the second embodiment. Moreover, FIG. 34 is a cross-sectional view taken along line A-A of FIG. 35.

In the present first modified example, the facing substrate 3 has the substrate 31 and the plurality of the driving electrodes COML1. The plurality of the driving electrodes COML1 are formed on the lower surface of the substrate 31 at the display region Ad or the touch detection region At when seen in a plan view. The plurality of the driving electrodes COML1 can be set as the same as that of the example shown in FIG. 32 and FIG. 33.

On the other hand, in the present first modified example, each of the plurality of the driving electrodes COML2 is formed on a layer different from that of the plurality of the driving electrodes COML1. In this manner, it is not required to form the connection portions CN2 of the driving electrodes COML2 on a layer different from that of the electrode portions CP2, in comparison with the example shown in FIG. 32 or FIG. 33, and therefore, the driving electrodes COML2 can be formed easily.

Alternatively, the plurality of the driving electrodes COML2 may be formed on the upper surface of the substrate 31, or may be formed on the lower surface of the barrier film 64 formed on the lower surface of the substrate 61. In the example shown in FIG. 34, the plurality of the driving electrodes COML2 are formed on the lower surface of the barrier film 64, and a protective film PF1 is formed on the lower surface of the barrier film 64 so as to cover the plurality of the driving electrodes COML2. Moreover, the protective film PF1 formed on the lower surface of the barrier film 64 is made in contact with the upper surface of the substrate 31 of the facing substrate 3.

Note that it is only required to form the plurality of the driving electrodes COML1 and the plurality of the driving electrodes COML2 on different layers from each other. Therefore, both of the plurality of the driving electrodes COML1 and the plurality of the driving electrodes COML2 may be formed on the lower surface of the substrate 31. Alternatively, both of the plurality of the driving electrodes COML1 and the plurality of the driving electrodes COML2 may be formed on the upper surface of the substrate 31.

Each of the plurality of the driving electrodes COML2 is extended in the Y-axis direction and is also arranged in the X-axis direction when seen in a plan view. Each of the plurality of the driving electrodes COML2 includes a plurality of electrode portions CP2 and a plurality of connection portions CN2. In the present first modified example, as different from the example shown in FIG. 32 and FIG. 33, each of the plurality of the electrode portions CP2 and each of the plurality of the connection portions CN2 are formed on the lower surface of the barrier film 64, that is, on the upper surface of the substrate 31, at the display region Ad or the touch detection region At. The plurality of the electrode portions CP2 are arranged in the Y-axis direction when seen in a plan view. Moreover, the two electrode portions CP2 that are adjacent to each other in the Y-axis direction are electrically connected to each other by the connection portion CN2.

In the present first modified example, the plurality of the driving electrodes COML1 and the plurality of the driving electrodes COML2 are formed on different layers from each other. Therefore, the connection portions CN2 are formed on the same layer as that of the electrode portions CP2.

As similar to the first modified example of the first embodiment, also in the present first modified example, the distance between the upper surface of the pixel electrode 22 and the lower surface of the driving electrode COML2 is not different so much from the distance between the upper surface of the pixel electrode 22 and the lower surface of the driving electrode COML1. Therefore, by such adjustment that the display driving signal Vcomd to be supplied to each of the plurality of the driving electrodes COML2 is made larger than the display driving signal Vcomd to be supplied to each of the plurality of the driving electrodes COML1, the same display driving process as that in the case of formation of the plurality of the driving electrodes COML1 and the plurality of the driving electrodes COML2 on the same layer can be performed.

Meanwhile, in the present first modified example, an auxiliary electrode AE2 is formed to be opposite to the substrate 21 through the plurality of the driving electrodes COML1 and the plurality of the driving electrodes COML2. In performing the touch detection operation, to the auxiliary electrode AE2, the scan driving unit 50 (see FIG. 29) supplies an active shield driving signal Vas formed of an alternate-current signal having the same phase as that of the alternate-current signal contained in the touch detection driving signal Vtd supplied to the detection electrodes TDL formed of the driving electrodes COML1. Thus, a parasitic capacitance generated between the detection electrode TDL and each part of the periphery of the detection electrode TDL can be removed, so that the detection sensitivity of the touch detection can be reliably improved.

More preferably, the auxiliary electrode AE2 is disposed so as to overlap with the substrate 31 at portions located between the two driving electrodes COML1 adjacent to each other in the Y-axis direction of the plurality among the driving electrodes COML1 and between the two driving electrodes COML2 adjacent to each other in the X-axis direction among the plurality of the driving electrodes COML2 when seen in a plan view.

More specifically, the auxiliary electrode AE2 includes: a plurality conductor lines ML5 that are arranged while being spaced from each other when seen in a plan view; and a plurality of conductor lines ML6 that are arranged while being spaced from each other and intersecting with the plurality of the respective conductor lines ML5 when seen in a plan view. Moreover, the auxiliary electrode AE2 includes a plurality of openings OP1 each of which is partitioned by the plurality of the conductor lines ML5 and the plurality of the conductor lines ML6 and which has a square shape, when seen in a plan view. At this time, the X-axis direction corresponds to one of diagonal directions of each of the plurality of the openings OP1, and the Y-axis direction corresponds to the other diagonal direction of each of the plurality of the openings OP1, which is different from the X-axis direction.

In the present first modified example, the driving electrodes COML1 are operated as the driving electrodes for the electrophoresis display device, and also operated as the detection electrodes TDL for the touch detection device. Moreover, the driving electrodes COML2 are operated as the driving electrodes for the electrophoresis display device, and also operated as the detection electrodes TDL for the touch detection device.

As shown in FIG. 34, note that the auxiliary electrode AE2 can be formed on, for example, the same layer as the color filter layer 62. Thus, the thickness of the display apparatus can be made thinner.

As similar to the example shown in FIG. 32 and FIG. 33, the present first modified example may be also provided with the auxiliary electrode AE1. Moreover, in performing the touch detection operation, the active shield driving signal Vas (see FIG. 29) formed of an alternate-current signal having the same phase as that of the alternate-current signal contained in the touch detection driving signal Vtd (see FIG. 29) to be supplied to the detection electrodes TDL formed of the driving electrodes COML1 may be supplied to the auxiliary electrode AE1. Thus, a parasitic capacitance generated between the detection electrode TDL and each of wirings included in the array substrate 2 can be eliminated, so that the detection sensitivity of the touch detection can be enhanced. However, the auxiliary electrodes AE1 may not be formed.

Figure 35:
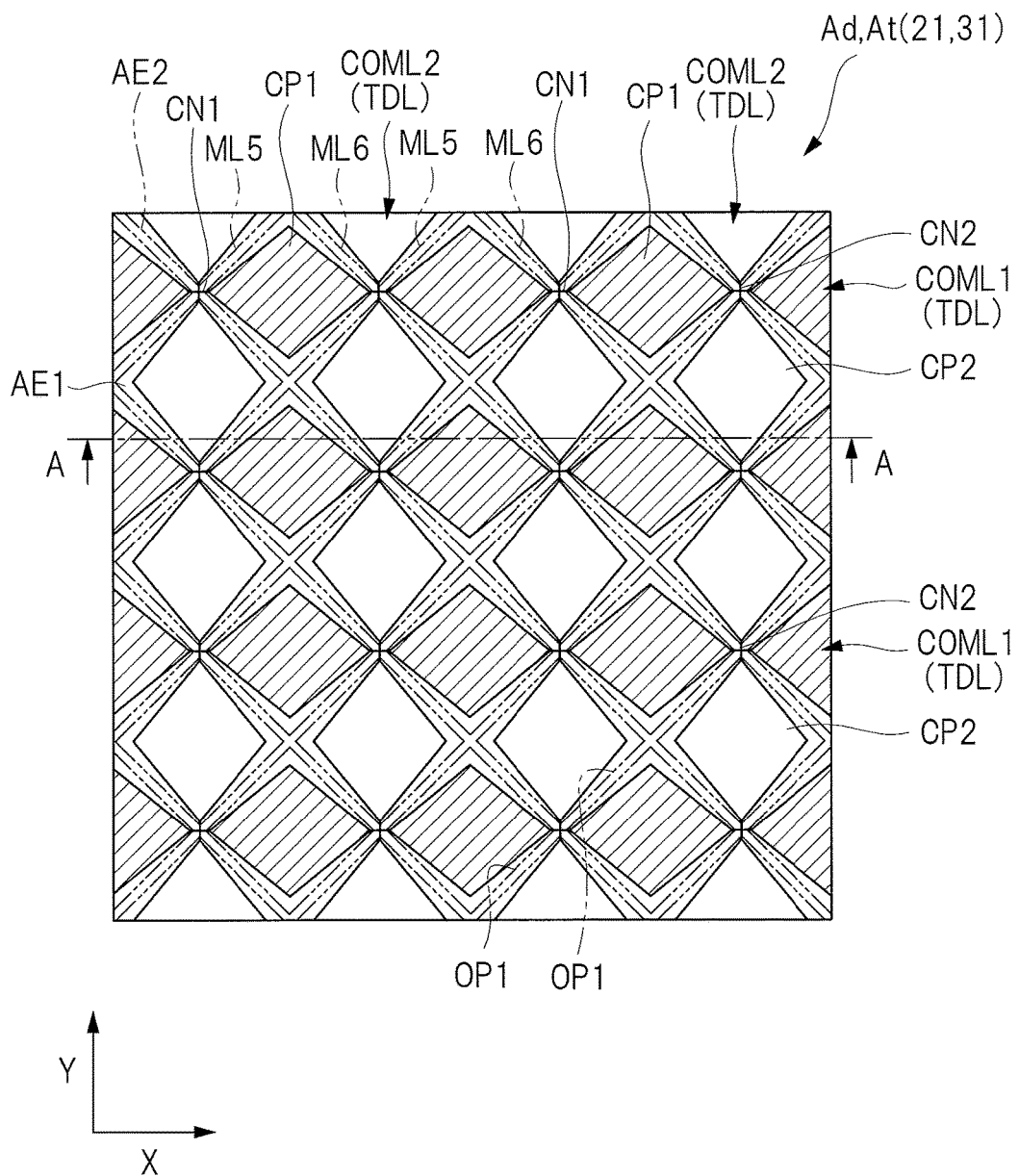
FIG. 35 is a plan view schematically showing configurations of a driving electrode and an auxiliary electrode in the first modified example of the second embodiment.

As shown in FIG. 34 and FIG. 35, in the present first modified example, the auxiliary electrode AE2 is formed on the substrate 31 on a portion disposed between the driving electrodes COML1 and the driving electrodes COML2 when seen in a plan view. Moreover, in performing the touch detection operation, the active shield driving signal Vas formed of an alternate-current signal having the same phase as that of the alternate-current signal contained in the touch detection driving signal Vtd to be supplied to the detection electrodes TDL formed of the driving electrodes COML1 is supplied to the auxiliary electrode AE2. That is, when the scan driving unit 50 (see FIG. 29) supplies a touch detection driving signal Vtd to the plurality of the detection electrodes TDL and also supplies the active shield driving signal Vas to the auxiliary electrode AE2, the touch detection unit 40a (see FIG. 29) detects an input position based on each electrostatic capacitance of the plurality of the detection electrodes TDL. Thus, in comparison with a case without the auxiliary electrode AE2, a parasitic capacitance generated between the detection electrode TDL and each part on the periphery of the detection electrode TDL that is located on the upper portion can be eliminated, so that the detection sensitivity of the touch detection can be enhanced.

Other parts than that can be set as the same as those of the example shown in FIG. 32 and FIG. 33.

Note that, by using a connection method that is the same as the connection method to be explained with reference to FIG. 36 and FIG. 37 to be described later, both of the plurality of the electrode portions CP1 and the plurality of the electrode portions CP2 can be individually connected to the touch driving and sensing signal amplifying unit 42a without forming the plurality of the connection portions CN1 and the plurality of the connection portions CN2. Thus, the input position can be detected with high positional accuracy.

<Second Modified Example of Display Device Having Touch Detection Function>

Next, with reference to FIG. 36 and FIG. 37, the second modified example of the display device having a touch detection function will be described. In the present second modified example, the plurality of the driving electrodes COM1 are arranged in a matrix form.

Figure 36:
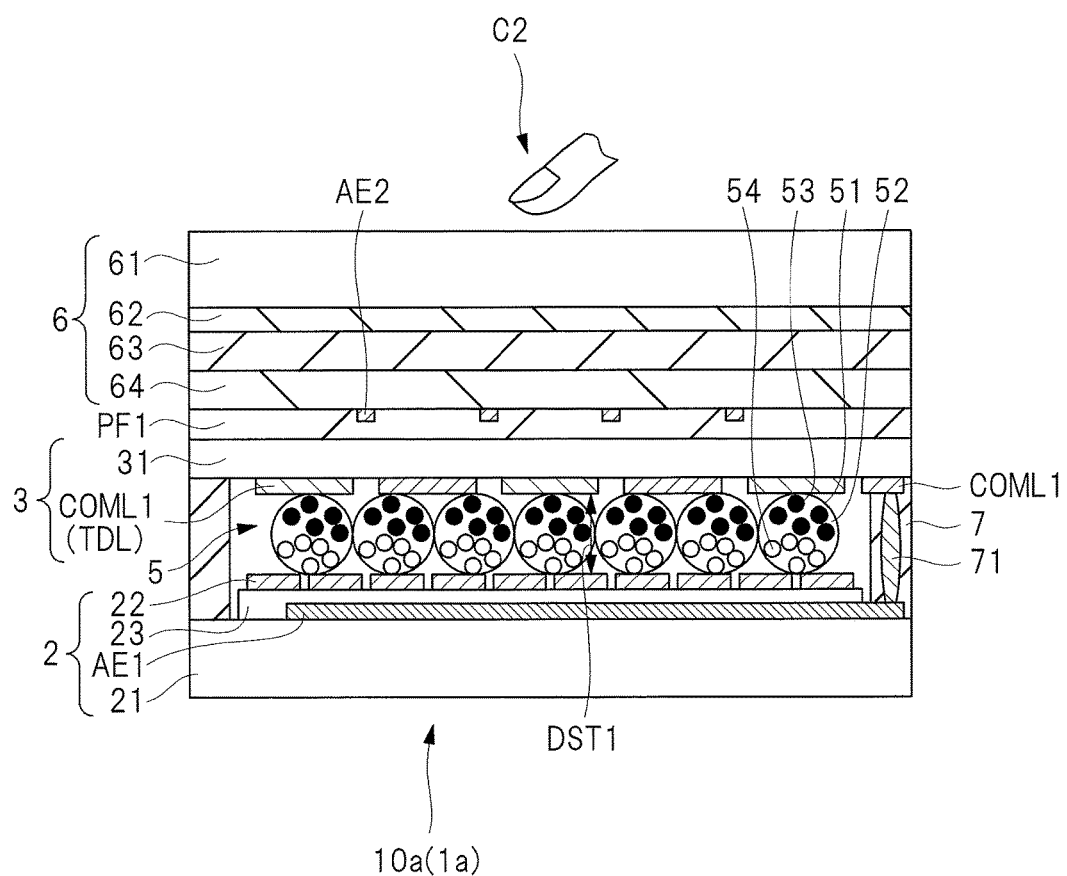
FIG. 36 is a cross-sectional view showing a display device with a touch detection function of a second modified example of the second embodiment.

FIG. 36 is a cross-sectional view showing a display device having a touch detection function of the second modified example of the second embodiment. FIG. 37 is a plan view schematically showing configurations of driving electrodes and auxiliary electrodes in the second modified example of the second embodiment. Moreover, FIG. 36 is a cross-sectional view taken along a line A-A of FIG. 37.

In the present second modified example, the facing substrate 3 has the substrate 31 and the plurality of the driving electrodes COML1. The plurality of the driving electrodes COML1 are formed on the lower surface of the substrate 31 at the display region Ad or the touch detection region At when seen in a plan view. Note that the plurality of the driving electrodes COML1 may be formed on the upper surface of the substrate 31.

In the present second modified example, the plurality of the driving electrodes COML1 are disposed in the X-axis direction and Y-axis direction into a matrix form when seen in a plan view. Moreover, a plurality of routing wirings WR1 are electrically connected to the driving electrodes COML1, respectively. Therefore, each driving electrode COML1 of the plurality of the driving electrodes COML1 is electrically connected to the driving electrode driver 14 (see FIG. 5) through the routing wiring WR1 corresponding to this driving electrode COML1. By using such a connection method, each of the plurality of the detection electrodes TDL can be individually connected to the touch driving and sensing signal amplifying unit 42a, and therefore, the input position can be detected with high positional accuracy.

Moreover, in the present second modified example, the auxiliary electrode AE2 is formed to be opposite to the substrate 21 through the plurality of the driving electrodes COML1. During a touch detection operation period, to the auxiliary electrode AE2, the touch detection unit 40a supplies an active shield driving signal Vas formed of an alternate-current signal having the same phase as that of the alternate-current signal contained in the touch detection driving signal Vtd supplied to the detection electrodes TDL formed of the driving electrodes COML1. Thus, a parasitic capacitance generated between the detection electrode TDL and each part on the periphery of the detection electrode TDL can be eliminated, so that the detection sensitivity of the touch detection can be enhanced.

More preferably, the auxiliary electrode AE2 is disposed so as to be overlapped with the substrate 31 at a portion located between two adjacent driving electrodes COML1 among the plurality of the driving electrodes COML1 when seen in a plan view.

More specifically, the auxiliary electrode AE2 includes: a plurality of conductor lines ML7 each of which is extended in the X-axis direction and which is arranged while being spaced from each other in the Y-axis direction when seen in a plan view; and a plurality of conductor lines ML8 each of which is extended in the Y-axis direction and which is arranged while being spaced from each other in the X-axis direction when seen in a plan view. Each of the plurality of the conductor lines ML7 is disposed so as to be overlapped with the substrate 31 at a portion located between two driving electrodes COML1 that are adjacent to each other in the Y-axis direction among the plurality of the driving electrodes COML1. The plurality of the conductor lines ML8 are disposed so as to be overlapped with the substrate 31 at a portion located between two driving electrodes COML1 that are adjacent to each other in the X-axis direction of the plurality of the driving electrodes COML1. Moreover, the auxiliary electrode AE2 includes a plurality of openings OP2 that are partitioned by the plurality of the conductor lines ML7 and the plurality of the conductor lines ML8 and that have a square shape when seen in a plan view. The plurality of the openings OP2 are arranged into a matrix form in the X-axis direction and the Y-axis direction.

In the present second modified example, the plurality of the driving electrodes COML1 are operated as the driving electrodes for the electrophoresis display device, and also operated as the detection electrodes TDL for the touch detection device.

As shown in FIG. 36, note that the auxiliary electrode AE2 can be formed on, for example, the lower surface of the barrier film 64.

Also in the present second modified example, as similar to the example shown in FIG. 32 and FIG. 33, the auxiliary electrode AE1 may be formed. Moreover, in performing the touch detection operation, the active shield driving signal Vas, formed of an alternate-current signal having the same phase as that of the alternate-current signal contained in the touch detection driving signal Vtd supplied to the detection electrodes TDL formed of the driving electrodes COML1, may be applied to the auxiliary electrode AE1. Thus, a parasitic capacitance generated between the detection electrode TDL and each of wirings included in the array substrate 2 can be eliminated, so that the sensitivity of the touch detection can be enhanced. However, the auxiliary electrode AE1 may not be formed.

Figure 37:
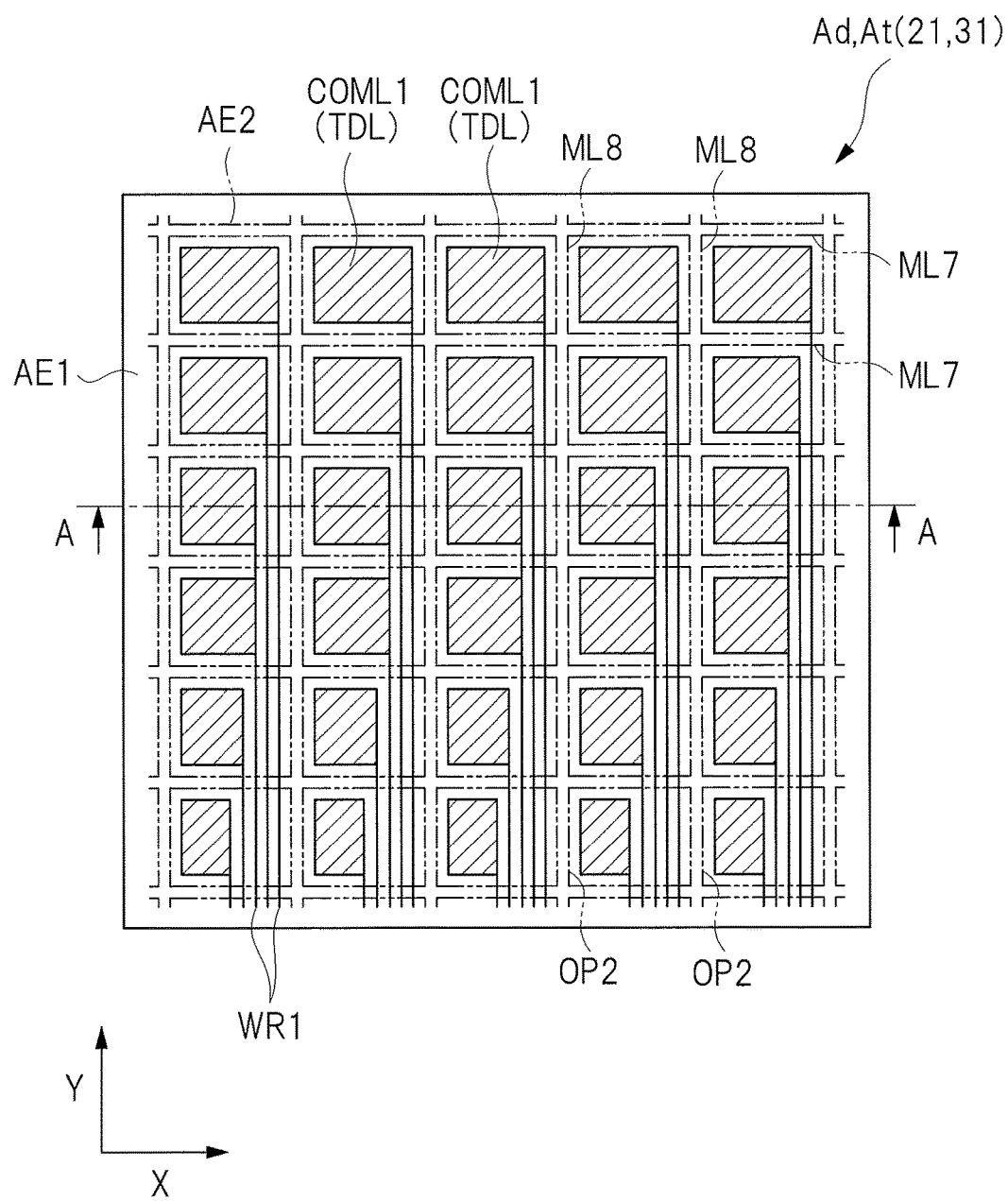
FIG. 37 is a plan view schematically showing configurations of a driving electrode and an auxiliary electrode in the second modified example of the second embodiment.

Moreover, in the present second modified example, as shown in FIG. 36 and FIG. 37, the auxiliary electrode AE2 is formed on the auxiliary electrode AE1 at a portion located between the driving electrode COML1 and the driving electrode COML2 when seen in a plan view. Moreover, in performing the touch detection operation, the active shield driving signal Vas, formed of an alternate-current signal having the same phase as that of the alternate-current signal contained in the touch detection driving signal Vtd supplied to the detection electrodes TDL formed of the driving electrodes COML1, is supplied to the auxiliary electrode AE2. Thus, in comparison with the case without the auxiliary electrode AE2, a parasitic capacitance generated between the detection electrode TDL and each of portions on the periphery of the detection electrode TDL, that is, the upper portion thereof can be eliminated, so that the detection sensitivity of the touch detection can be reliably increased.

Other parts than that can be set as the same as those of the example shown in FIG. 32 and FIG. 33.

<Third Modified Example of Display Device Having Touch Detection Function>

Next, with reference to FIG. 38 and FIG. 39, the third modified example of the display device having a touch detection function will be described. In the present third modified example, the display device having a touch detection function is a display device in which a touch detection device is attached onto the display device. Moreover, in the present third modified example, the plurality of the driving electrodes COM1 are formed as not the detection electrodes for the touch detection device but electrodes to which the active shield driving signal Vas (see FIG. 29) is supplied.

Figure 38:
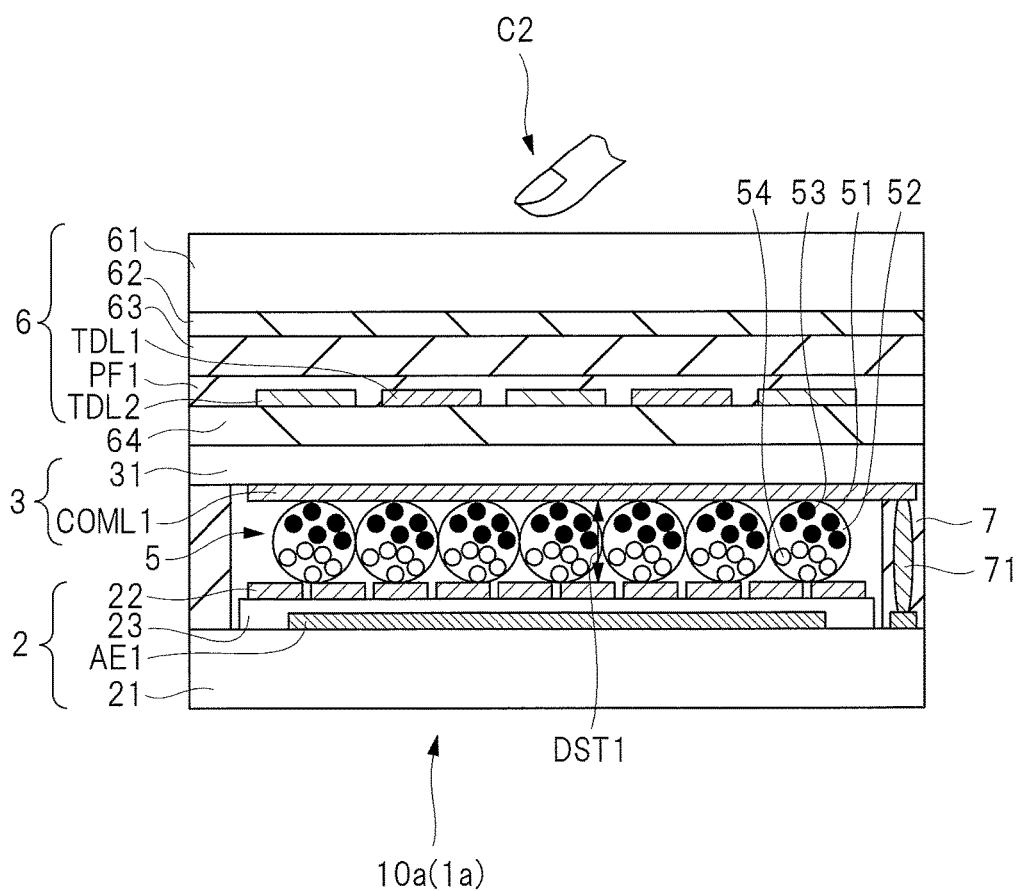
FIG. 38 is a cross-sectional view showing a display device with a touch detection function of a third modified example of the second embodiment.

FIG. 38 is a cross-sectional view showing a display device having a touch detection function of the third modified example of the second embodiment. FIG. 39 is a plan view schematically showing configurations of driving electrodes and auxiliary electrodes in the third modified example of the second embodiment. Moreover, FIG. 38 is a cross-sectional view taken along a line A-A of FIG. 39.

In the present third modified example, the facing substrate 3 has the substrate 31 and the plurality of the driving electrodes COML1. The plurality of the driving electrodes COML1 are formed on the lower surface of the substrate 31 at the display region Ad or the touch detection region At when seen in a plan view. Note that the plurality of the driving electrodes COML1 may be formed on the upper surface of the substrate 31.

In the present third modified example, the protective substrate 6 has a plurality of detection electrodes TDL1 and a plurality of detection electrodes TDL2. The plurality of the detection electrodes TDL1 and the plurality of the detection electrodes TDL2 are formed on the upper surface of the barrier film 64 included in the protective substrate 6 at the display region Ad or the touch detection region At when seen in a plan view. Moreover, the protective film PF1 is formed on the upper surface of the barrier film 64 so as to cover the plurality of the detection electrodes TDL1 and the plurality of the detection electrodes TDL2.

Each of the plurality of the detection electrodes TDL1 is extended in the X-axis direction and is also arranged in the Y-axis direction when seen in a plan view. Each of the plurality of the detection electrodes TDL1 includes a plurality of electrode portions CP1 and a plurality of connection portions CN1. Each of the plurality of the electrode portions CP1 and each of the plurality of the connection portions CN1 are formed on the upper surface of the barrier film 64 at the display region Ad or the touch detection region At. The plurality of the electrode portions CP1 are arranged in the X-axis direction when seen in a plan view. Moreover, the two electrode portions CP1 that are adjacent to each other in the X-axis direction are electrically connected to each other by the connection portion CN1.

Each of the plurality of the detection electrodes TDL2 is extended in the Y-axis direction and is also arranged in the X-axis direction when seen in a plan view. Each of the plurality of the detection electrodes TDL2 includes a plurality of electrode portions CP2 and a plurality of connection portions CN2. Each of the plurality of the electrode portions CP2 is formed on the upper surface of the barrier film 64 at the display region Ad or the touch detection region At. The plurality of the electrode portions CP2 are arranged in the Y-axis direction when seen in a plan view. Moreover, the two electrode portions CP2 that are adjacent to each other in the Y-axis direction are electrically connected to each other by the connection portion CN2.

Figure 39:
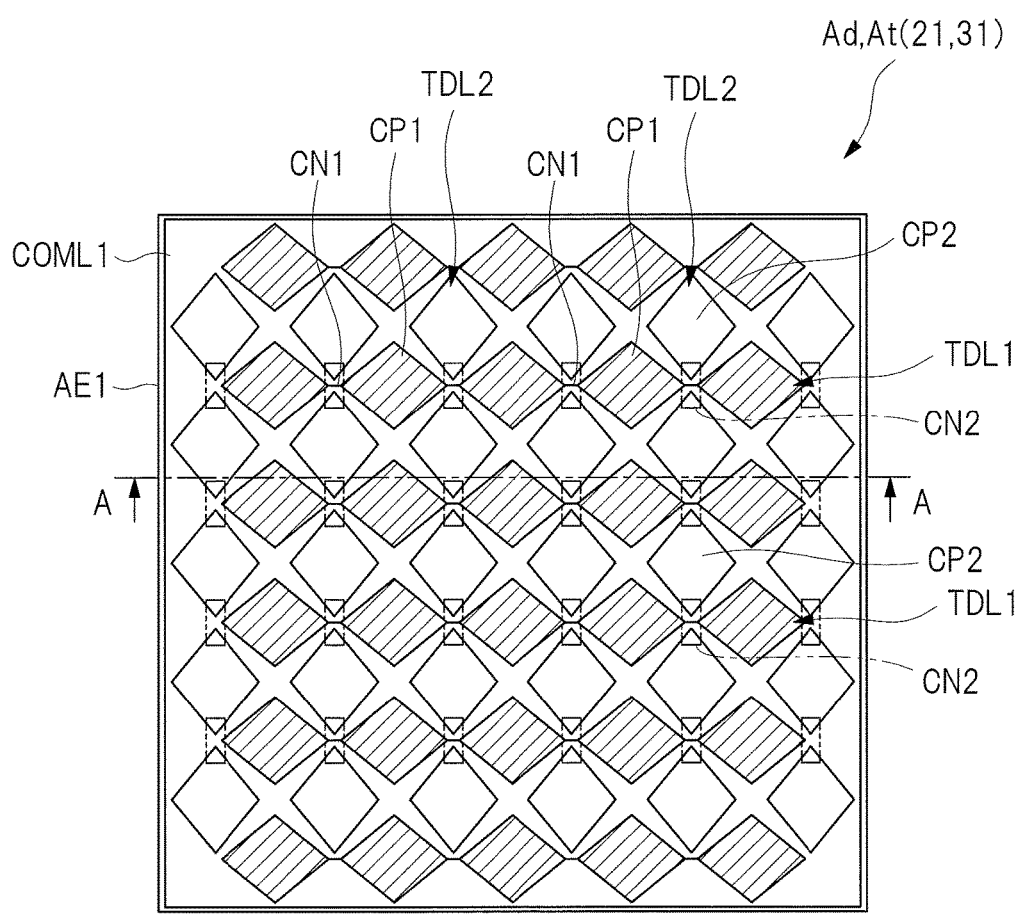
FIG. 39 is a plan view schematically showing configurations of a driving electrode and an auxiliary electrode in the second modified example of the third embodiment.

In the example as shown in FIG. 38 and FIG. 39, the plurality of the detection electrodes TDL1 and the plurality of the detection electrodes TDL2 are formed on the same layer. For this reason, the connection portions CN2 are formed on a layer different from that of the electrode portions CP2, and each of them is formed so as to bridge over each of the connection portions CN1 through an insulating film not shown.

Also in the present third modified example, the display driving signal Vcomd (see FIG. 29) is supplied to the driving electrodes COML1 by the driving electrode driver 14, and the pixel signal Vpix (see FIG. 29) is supplied by the source driver 13 to the pixel electrode 22 included in each of the sub-pixels SPix belonging to the selected one horizontal line in the selected partial display region Adp (see FIG. 13). In this manner, in the selected partial display region Adp, an electric field is formed between each of the plurality of the pixel electrodes 22 and each of the plurality of the driving electrodes COML1, so that an image is displayed in each horizontal line in the selected partial display region Adp.

However, in the present third modified example, since the driving electrodes COML1 are formed in the display region Ad as integral members, the display driving signal Vcomd is supplied to the integrally-formed driving electrodes COML1 also in each of the display operating period Pd in the one frame period 1F.

In the present third modified example, the driving electrodes COML1 are operated as the driving electrodes for the electrophoresis display device. On the other hand, in the present third modified example, the detection electrodes TDL1 and the detection electrodes TDL2 are operated as the detection electrodes for the touch detection device. That is, in the present third modified example, the driving electrodes COML1 included in the facing substrate 3 are not operated as the detection electrodes for the touch detection device.

In the present third modified example, in performing the touch detection operation, an active shield driving signal Vas (see FIG. 29), formed of an alternate-current signal having the same phase as that of the alternate-current signal contained in the touch detection driving signal Vtd (see FIG. 29) supplied to the detection electrodes TDL1 and the detection electrodes TDL2, is supplied to the driving electrodes COML1. That is, in the present third modified example, in performing the touch detection operation, the driving electrodes COML1 are operated as the active shield electrodes.

More specifically, the scan driving unit 50 (see FIG. 29) supplies the touch detection driving signal Vtd to the plurality of the detection electrodes TDL1 or the plurality of the detection electrodes TDL2, and also supplies the active shield driving signal Vas to the driving electrodes COML1. Moreover, at this time, the touch detection unit 40a (see FIG. 29) detects the input position based on an electrostatic capacitance of each of the plurality of the detection electrodes TDL1 and the plurality of the detection electrodes TDL2.

In this manner, a parasitic capacitance, which is generated between the detection electrodes TDL1 or the detection electrodes TDL2 and each of wirings included in the array substrate 2 or between the detection electrodes TDL1 or the detection electrodes TDL2 and each of peripheral portions thereof, can be eliminated, so that the detection sensitivity of the touch detection can be enhanced.

Other parts than that can be set as the same as those of the example shown in FIG. 32 and FIG. 33.

Note that each of the plurality of the electrode portions CP1 and the plurality of the electrode portions CP2 can be individually connected to the touch driving and sensing signal amplifying unit 42a without forming the plurality of the connection portions CN1 and the plurality of the connection portions CN2 by using the same connection method as the connection method explained with reference to FIG. 36 and FIG. 37. Thus, the input position can be detected with high accuracy.

(Main Characteristics and Effects in Each Embodiment)

In the first embodiment and each modified example thereof, the second embodiment, and the first modified example and second modified example of the second embodiment, the display apparatus has the substrate 21, the substrate 31 disposed so as to face the substrate 21, the electrophoresis layer 5 sandwiched between the substrate 21 and the substrate 31, the plurality of the pixel electrodes 22 formed on the substrate 21 and the plurality of the driving electrodes COML1 formed on the substrate 31. The electric field is formed between each of the plurality of the pixel electrodes 22 and each of the plurality of the driving electrodes COML1, so that the image is displayed, and the input position is detected based on the electrostatic capacitance of each of the plurality of the driving electrodes COML1.

In this manner, in the display apparatus provided with the electrophoresis layer, the driving electrodes for use in displaying the image can also be operated as electrodes for detecting the input position.

Also, in the first embodiment and each modified example thereof, the second embodiment, and the first modified example and second modified example of the second embodiment, the display driving unit 50 repeats the display driving process DP and the detection driving process TP alternately, while successively cyclically changing the partial display region Adp and also successively cyclically changing the partial detection region Atp. Moreover, in the detection driving process TP, the touch detection unit formed in the display apparatus detects the input position at the selected partial detection region Atp based on the electrostatic capacitance of the driving electrodes COML1 disposed on the selected partial detection region Atp.

Thus, the display apparatus provided with the electrophoresis layer has a slower display rewriting speed and a larger ratio of the frequency for repeating the touch detection with respect to the frequency for rewriting the display than those of the liquid crystal display apparatus. However, in the display apparatus provided with the electrophoresis layer, the response performance of the touch detection can be improved as the same as that of the liquid crystal display apparatus.

In the first embodiment and each modified example thereof, the second embodiment, and the first modified example and second modified example of the second embodiment, the input device can be formed as an integral device with the display apparatus, and therefore, the thickness of the display apparatus can be easily thinner. Moreover, since the thickness of the overall display apparatus including the input device can be made thinner, the visibility of the image displayed on the display apparatus can be improved.

In the foregoing, the invention made by the present inventors has been concretely described based on the embodiments. However, it is needless to say that the present invention is not limited to the foregoing embodiments and various modifications and alterations can be made within the scope of the present invention.

In the scope of the concept of the present invention, various modified examples and alteration examples could have been easily thought up by those who skilled in the art, and it could be acknowledged that these various modified examples and alteration examples belong to the scope of the present invention.

For example, the ones obtained by appropriately adding, removing, or changing in designs the components to/from/into above-described each embodiment by those who skilled in the art or adding, omitting, or changing in conditions the step to/from/into the above-described each embodiment are also within the scope of the present invention as long as they include the scope of the present invention.

The present invention is effectively applied to a display device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display apparatus comprising:
   a first substrate;
   a second substrate that is disposed so as to face the first substrate;
   an electrophoresis layer sandwiched between the first substrate and the second substrate;
   a plurality of lower electrodes formed on the first substrate;

a plurality of upper electrodes formed on the second substrate, the upper electrodes including first electrodes and second electrodes;

a driving unit forming a first driving signal and a second driving signal; and a switch selectively connecting the driving unit with the second electrodes wherein when the switch is in an on state to connect the second electrodes with the driving unit, the first driving signal is supplied to the lower electrodes and the upper electrodes to display images, and when the switch is in an off state not to connect the second electrodes with the driving unit, the second driving signal is supplied to the lower electrodes to generate the electric field between the lower electrodes and the first electrodes of the upper electrodes, a detection unit connected to the first electrodes and detecting an input position based on electrostatic capacitance between the lower electrodes and the first electrodes.

2. A display apparatus according to claim 1, comprising a plurality of pixel electrodes disposed between the electrophoresis layer and the lower electrodes, wherein the electric field is generated between the pixel electrodes and the electrodes supplied with the first driving signal, to display the images.

3. A display apparatus according to claim 2, wherein the lower electrodes are disposed so as to face the pixel electrodes, and function as electrodes of capacitances for holding capacitor to be provided to electrophoretic particles.

4. A display apparatus according to claim 3, wherein the first driving signal has a constant voltage and is commonly supplied to the upper electrodes and the lower electrodes to generate the electric field in accordance with the voltage differences between the constant voltage and the voltages on the pixel electrodes to display the images.

5. A display apparatus according to claim 4, wherein the voltage of the second driving signal changes in cyclic to generate the electric field.

6. A display apparatus according to claim 5, wherein the plurality of lower electrodes include lower electrodes each of which is extended in a first direction and is arranged in a second direction intersecting with the first direction, and the plurality of upper electrodes include upper electrodes each of which is extended in the second direction and is arranged in the first direction.

7. A display apparatus according to claim 6, wherein the sizes of the lower electrodes in the second direction are larger than that of the upper electrodes in the first direction.

8. A display apparatus according to claim 7, wherein each of the upper electrodes includes conductor lines with a zig-zag shape.

9. A display apparatus according to claim 7, wherein the upper electrodes corresponding the first electrodes and the upper electrodes corresponding to the second electrodes are formed on a different layer in each other.

* * * * *